United States Patent
Crowder

(10) Patent No.: US 7,991,672 B2
(45) Date of Patent: Aug. 2, 2011

(54) SYSTEM AND METHOD OF VISUAL ILLUSTRATION OF STOCK MARKET PERFORMANCE

(76) Inventor: William Rory Crowder, Malibu, CA (US)

(*) Notice: Subject to any disclaimer, the term of this patent is extended or adjusted under 35 U.S.C. 154(b) by 364 days.

(21) Appl. No.: 12/080,679

(22) Filed: Apr. 4, 2008

(65) Prior Publication Data

US 2009/0006271 A1    Jan. 1, 2009

Related U.S. Application Data

(60) Provisional application No. 60/937,663, filed on Jun. 29, 2007.

(51) Int. Cl.
*G06Q 40/00* (2006.01)
(52) U.S. Cl. .......................................... 705/36
(58) Field of Classification Search .................. 705/36
See application file for complete search history.

(56) References Cited

U.S. PATENT DOCUMENTS

2002/0055899 A1 * 5/2002 Williams ..................... 705/37
2007/0299787 A1 * 12/2007 Shelor et al. ............... 705/36 R

* cited by examiner

*Primary Examiner* — Charles R Kyle
*Assistant Examiner* — Clifford Madamba

(57) ABSTRACT

The present invention provides a system and method for calculating and arraying an entirely universe of publicly traded stock performance data, technical and dynamic range of movement stock price data, underlying operating corporate balance sheet plus income statement fundamental data and ratios, and derived corporate operating and stock analysis data in such a manner as to enable the data for any selected single company to be phased, combined and superimposed within a series of graphical illustrations, which enable investors to easily visualize and compare the relationship of stock price movement and the underlying progression of fundamental operating variables of companies listed on exchanges around the world. The system includes a server computer, one or more client computer coupled to the server computer via the Internet, a database for storing, identifying and extrapolating stocks data, one module for calculating a set of selected performance parameters pursuant to a set of preset standards, a module for transforming calculation results of said calculation module into graphical illustrations; and a graphical user interface from which a user may send an inquiry to the server computer and be returned with a set of graphical illustrations on the inquired stock performance.

15 Claims, 45 Drawing Sheets

A Stockalizer™ Pattern Recognition Visualization Example

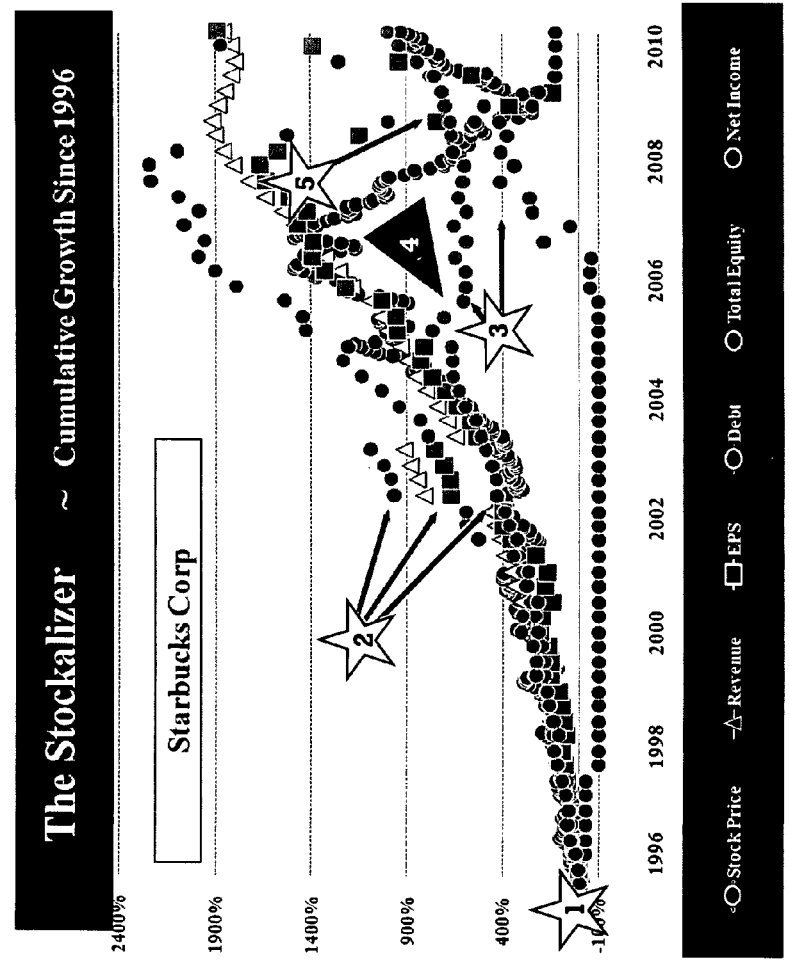

The Starbucks Co. grew exponentially with very little variation during the 1995-2000 time period. Beginning at Star 1, EPS, Revenue, Total Equity, Net Income and Stock Prices grew in tandem until the cumulative effects of the maturing size and scale of the company, the dilution of insider incentive stock options, rising business complexities and financial accounting strategies began to skew management reporting results. By 2003, (Star 2) the spread between the growth rates of Total Equity, EPS and Net Income had begun to widen to statistically significant differences.

By 2005 a profoundly striking new pattern began to emerge with clarity: Total Equity declined for 4 consecutive quarters (Star 3) and then uncharacteristically continued sideways while the trend of EPS and Net Income continued upward. Storm clouds were clearly gathering ~ this divergence is a classic Stockalizer "tell" ~ an advance warning signal that otherwise unreported rising liabilities are forming a fundamental operating version of a "Triangle of Doom" (Triangle 4) which is symptomatic of a business slowdown, diminishing profit margins, a declining PE multiple and an eventual stock decline of size. (Star 5). As an additional information note, beginning at Star 2, the increasing spread between EPS and Net Income, indicates cumulative dilution is taking place as a result of incentive stock option awards issued to Insiders.

FIG. 45

SYSTEM AND METHOD OF VISUAL ILLUSTRATION OF STOCK MARKET PERFORMANCE

REFERENCE TO RELATED APPLICATION

The present application claims benefit of prior filed provisional Appl. Ser. No. 60/937,663 filed on Jun. 29, 2007, the entire content of which is hereby incorporated by reference.

COPYRIGHT NOTICE

Contained herein is material that is subject to copyright protection. The copyright owner has no objection to the facsimile reproduction of the patent disclosure by any person as it appears in the U.S. Patent and Trademark Office patent files or records, but otherwise reserves all rights to the copyright whatsoever.

FIELD OF THE INVENTION

The present invention relates in general to a phased array securities analysis graphic visualization system, and more particularly, to a computer application and method of creation of a new genre of pattern recognition stock market performance analysis graphs.

BACKGROUND OF THE INVENTION

The ability to visualize and correlate stock price movement, fundamental fair market value characteristics and emerging business operating trends for individual companies, indexes, and mutual funds is of profound interest to investors.

As a result of the meteoric rise in popularity of online trading for as little as $10.00 per transaction, investors are increasingly acting on their own in the investment decision making process.

Increased technology offerings by discount online brokerage firms, the emergence of media investment channels, and improving online access to news, investment tools, stock graphics and research opinion all over the Internet, offer the retail public a more complete fundamental evaluation approach to investing by introducing, explaining and reporting an increasing number of investment variables.

However, the unmet desires of retail investors as they experience the chatter of media coverage and explore virtual database sources of largely academic information reveals the limitations and deficiencies of what is currently being offered.

The unexplored terrain of opportunity is that experienced and inexperienced investors desire new and profoundly better sources of information. More specifically, without getting lost in detail they want to get a more comprehensive and intuitive view of the inner workings of whatever companies, core and emerging products, evolving technologies and developing industry trends they have an interest in.

In short, investors seek independence in the investment decision making process.

Quite obviously, there is a lot going on behind the scenes that investors want to know about. So what is it that investors want to know?

It is common knowledge in investment banking circles and as any business owner can tell you, the visible footprint of the vibrancy and health of a business begins with a review of the balance sheet and income statements.

In the case of publicly held companies, an exhaustive level of balance sheet and fundamental operating data is available to the public via company issued quarterly and annual 10K and 10 Q reports, much of which is also illustrated in summary form all over the Internet.

However, as a carry-over influence from the previous dominance of large Wall Street Brokerage firms, the continuing industry wide protocol of formatting balance and income sheet information in "Database-Table Formats" accompanied by simple graphic representations of a few basic investment variables has made the task of evaluating raw data difficult and time consuming.

Most people's brains simply don't work that way. Even if they understood how to do it, it is a tedious and daunting challenge to manually sift through tabular data and identify emerging trends and cause and effect relationships within the context of evolving market change.

To make sense of the data, what investors actually need is an effective representation of a far more comprehensive data package, such as the major elements, ratios and interrelationships of the balance sheet and income statements, which are arrayed in intuitive graphic formats in such a way as to enable the user to superimpose and compare the progression of combinations of fundamental data (i.e. net income, revenue, debt and debt coverage levels, earnings per share, cash flow, profit margins, total equity, and various forms of capitalization and operating ratios, etc), and also be able to superimpose and easily compare these factors with stock price movement and a variety of stock performance analytics over the same time period within the same graph.

They desire a dramatically increased level of content which is displayed in graphic formats they can make sense of in the process of educating themselves and formulating their own decisions.

The object of the present invention is to provide a new genre of a phased array securities analysis illustration system in the form of a new universe of profoundly higher level expression pattern recognition stock performance analysis graphs, which enable investors to easily visualize and compare the relationship of stock price movement and the underlying progression of fundamental variables, for individual companies as well as the blend of companies which are the component pieces of indexes and mutual funds listed around the world.

SUMMARY OF THE INVENTION

The invention provides a system and method which enable investors to easily visualize and compare the relationship of stock price movement and the underlying progression of fundamental operating variables, ratios, and derived performance data of companies listed on exchanges around the world. The system includes a central application, called Stockalizer Engine, for illustration and securities analysis, at least one database, and various applications which enable on-line implementations.

The system includes a server computer, one or more client computers coupled to the server computer via the Internet, a database for storing, identifying and extrapolating stocks data, one module for calculating a set of selected performance parameters pursuant to a set of preset standards, a module for transforming calculation results of the calculation module into graphical illustrations, and a graphical user interface from which a user may send an inquiry to the server computer and be returned with a set of graphical illustrations on the inquired stock performance.

The database can be updated either by the user or by an automated script that periodically updates the at least one database. The stock data includes, but is not limited to, historical and current stock price movement, categorized data of the balance sheet, categorized data of the income sheet, financial ratios, performance statistics and the derived data. The preset standards include stock performance and analysis of underlying fundamentals and ratios of an individual company, comparison of stock performances and analysis of underlying fundamentals of a number of selected companies, and analytics and comparison of component pieces of stock performance and analysis of underlying fundamentals and ratios of an individual portfolio, selected industry grouping, index, or mutual fund/collection of stocks.

The selected performance parameters include cumulative growth comparison, continuous and quarterly rate of change, variable period continuous rates of change, 50 year since inception or shorter term continuous market or index change, continuous compound rate of growth, continuous dynamic range of movement, single stock summary report, stock universe spreadsheet summary, company specific snapshot summary, single company scatter gram of key variables, and preselected or custom combinations of variables of any collection of two or more companies stored in the at least one database.

The graphical illustrations that the system can provide include: (1) a progression of discrete data points and/or a continuous line representation of data which superimposes combinations of key variables within a single vertical unified cumulative percentage scale and a horizontal time scale (Stockalizer Cumulative Rates of Change Comparison); (2) a progression of discrete data points and/or a continuous line representation of data which superimposes key year over year quarterly and continuous measurement of change for variables within a single unified vertical percentage scale and a horizontal time scale graph (CycleGraph YOY Quarterly Rates of Change); (3) a series of discreet data points or a continuous line which superimposes key annualized quarterly and continuous measurement of key historical data for variables which can be stated and phased variously pursuant to the user selected data series (CycleAnalytics Evolving Trend Analysis); (4) a series of discreet data points or a continuous line of data multiple color coded custom horizontal line graph which plots a continuous year over year annual price performance % change comparison of an individual stock mutual fund or index market movement over intermediate to long time periods (Market Cyclegraph); (5) a series of discreet data points or a continuous line of data points custom compounded rate of growth horizontal line graph which superimposes continuous and quarter end compounded values of key variables (Compound Datatron Compounding Rates Of Growth); (6) a continuous line of data points custom dynamic range of movement variable period rate of change horizontal line graph which superimposes key year over year continuous and quarterly expression of variables (Momentum Matrix Dynamic Range of Movement); (7) color coded price performance horizontal line graph chart which indicates moving averages and short or intermediate term price movement (Daily Price Graph); (8) a continuous line of data points which displays superimposed dynamic range of movement of stock price for combinations of time periods combined with variable period rate of change horizontal line graph which juxtaposes continuous line representations of continuous measurement of operating and, performance ratio analytics for evaluating individual stocks or portfolios when viewed as a whole (Stockalizer Portfolio—Trend Analysis); and (9) company specific multiple page composite reports containing preformatted elements of text, data tables and graphs in preselected combinations (Stockalizer Multiple Page Reports).

The system also produces spreadsheet format visual outputs, called Stockatron Universe Summary Spreadsheets, and a series of preformatted custom scatter gram-stock analysis comparison charts which enable the user to visualize combinations of key variables expressed in table form as well as charted on two X/Y scales at once in support of a relative value assessment for a single company, called Stockatron Analytics Company Snapshots and Stockatron Constellation Universe Comparison Charts.

The system also provides a Stockalizer Portfolio Analysis system of reports which include a horizontal line graph series which superimposes and compares the % Cumulative Growth (performance) for an investor's portfolio versus major market indexes as measured on a daily, weekly, monthly, quarterly, semi annual, annual etc. time periods, called Stockalizer Portfolio Performance Graphs, as well as the entire array of previously mentioned formats, such as Stockalizer, CycleGraph, CycleAnalytics, Compound Datatron, Momentum Matrix, Stockalizer Portfolio Trend Analysis, Stockatron Snapshot, and Stockatron Constellation Universe Comparison Charts, which are employed to visualize and compare the combinations of, or the collective composite values of, an entire portfolio, industry groups, major market indexes and mutual funds.

BRIEF DESCRIPTION OF DRAWINGS AND CHARTS

For a more succinct understanding of the nature and objects of the present invention, reference should be directed to the following detailed description taken in connection with the accompanying drawings in which:

FIG. 24 is typical graph of the "Stockatron Universe Summary" illustrating labeled spreadsheet functions of the Stockatron Universe sorting and data analysis spreadsheet summary report;

FIG. 25 is a typical graph of the "Stockatron Universe Summary" functions illustrating the Stockatron Universe sorting and data analysis spreadsheet summary report;

Figure 38:
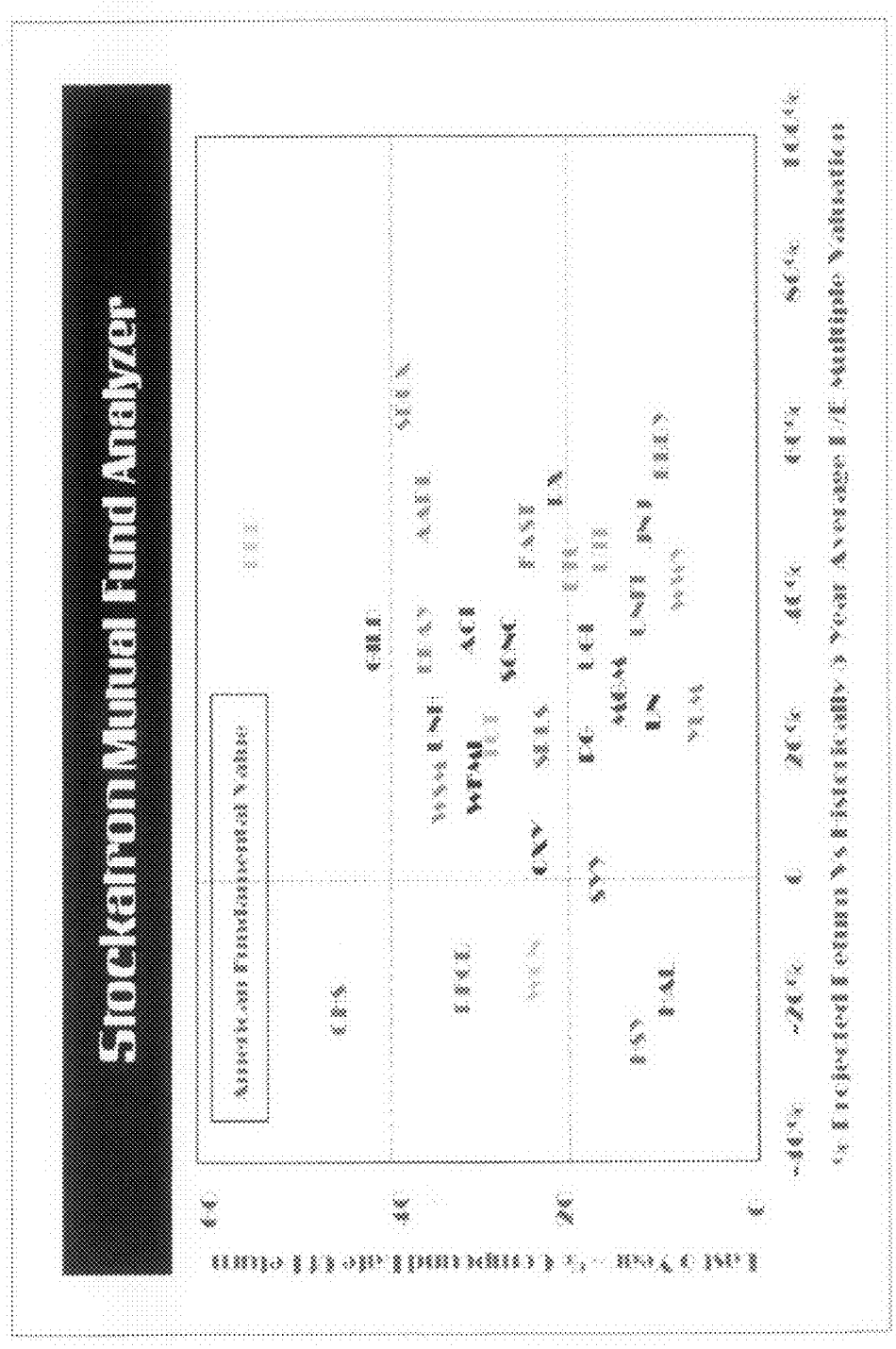
Figure 39:
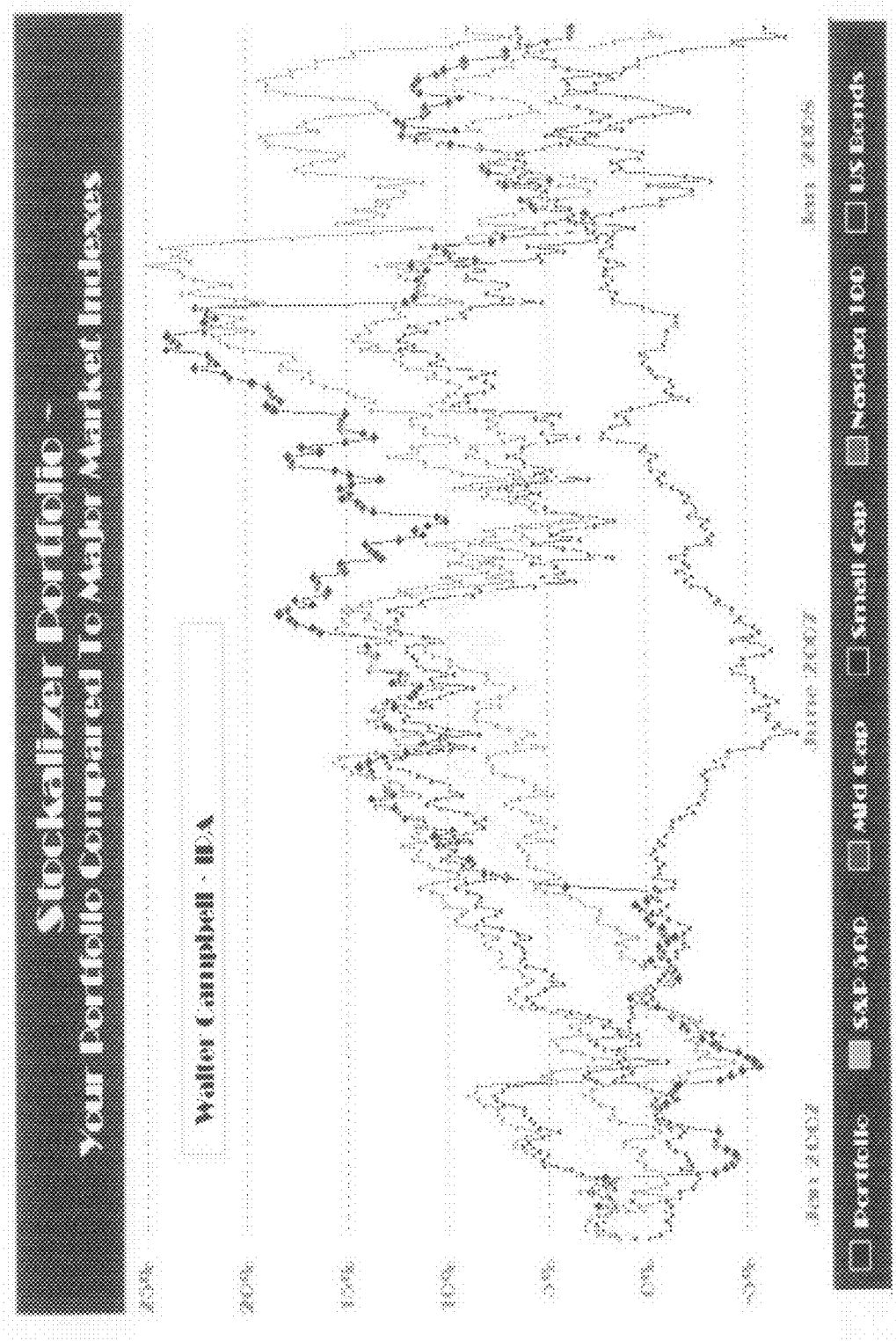
Figure 40:
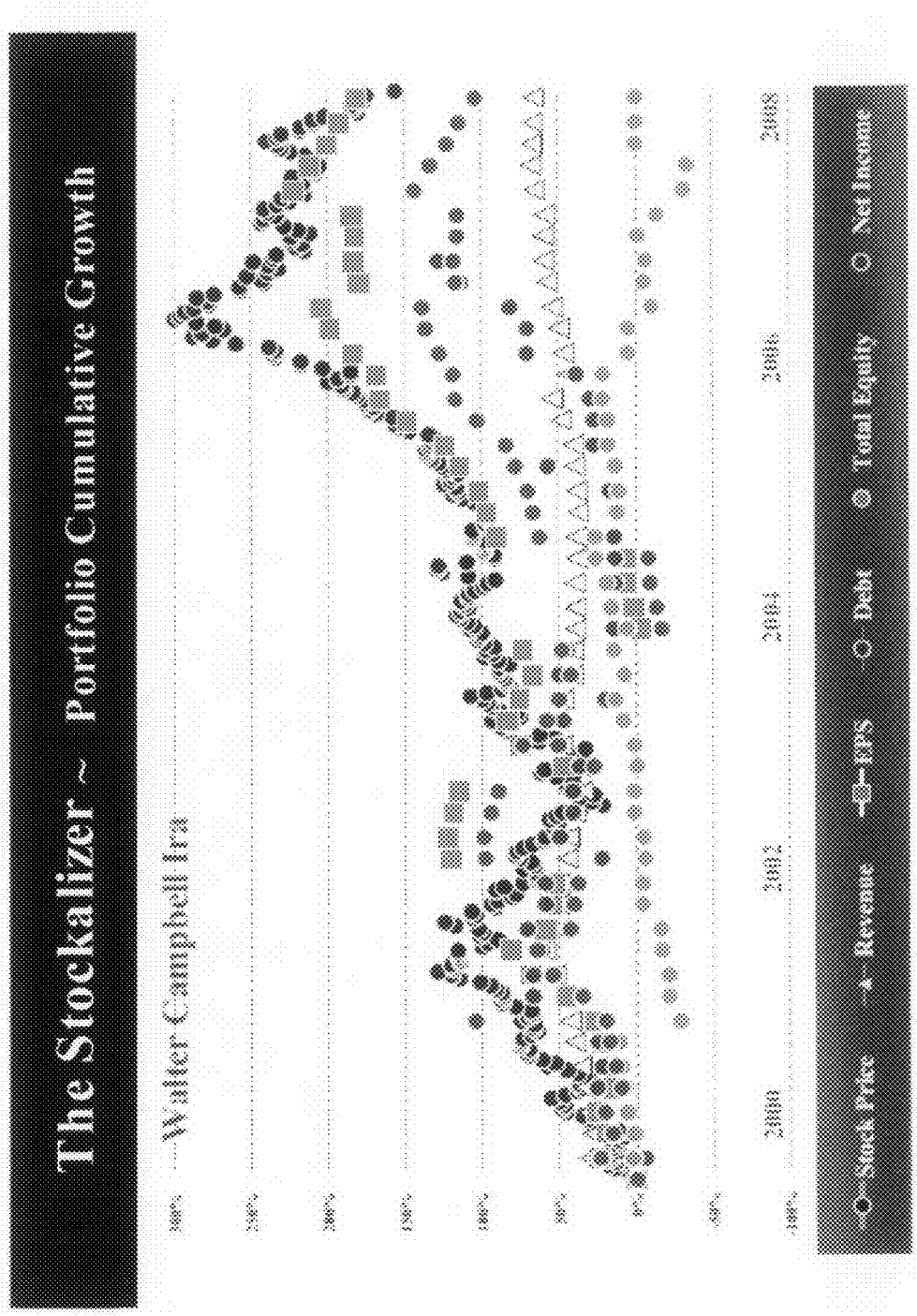
Figure 41:
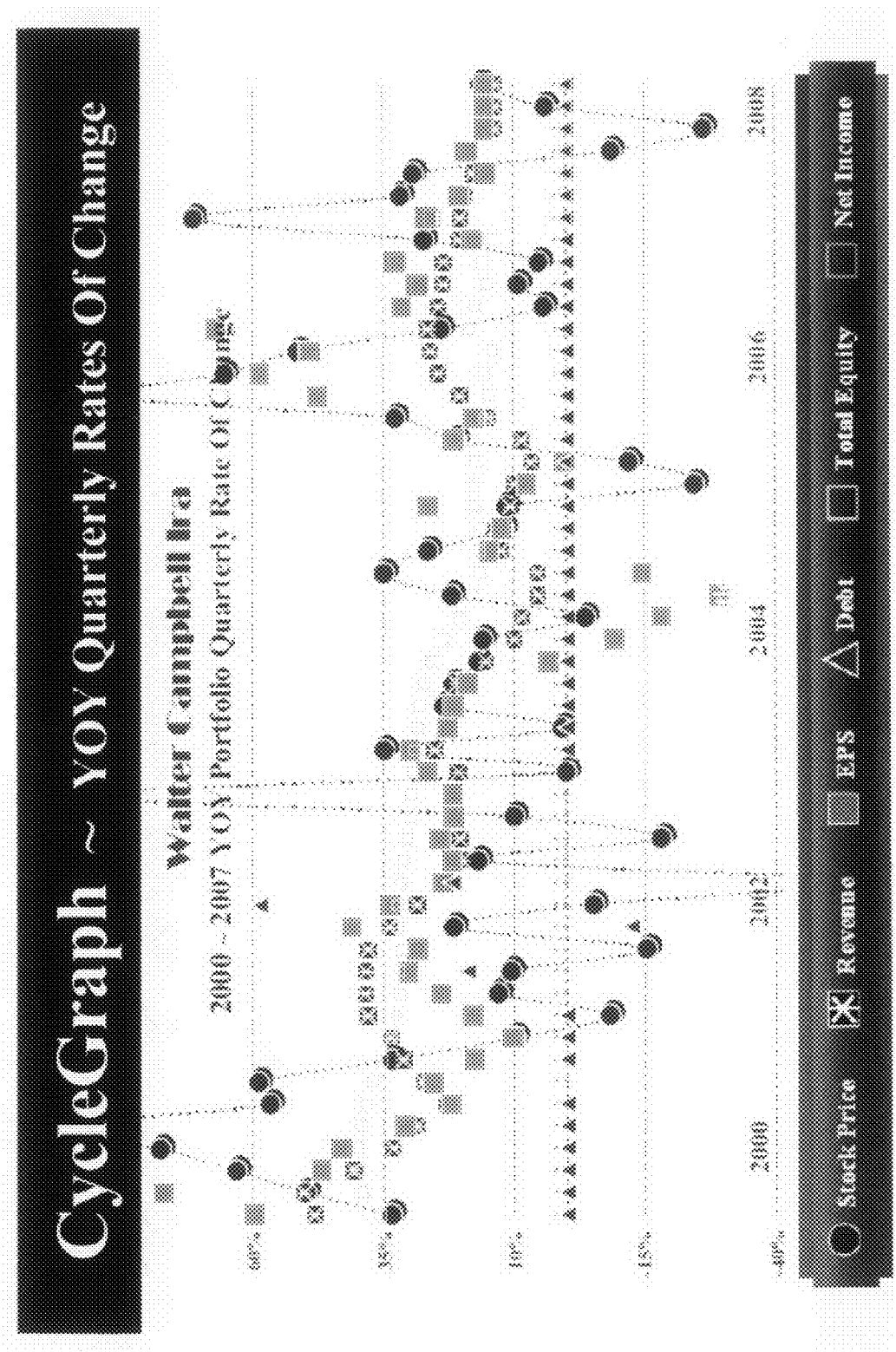
Figure 42:
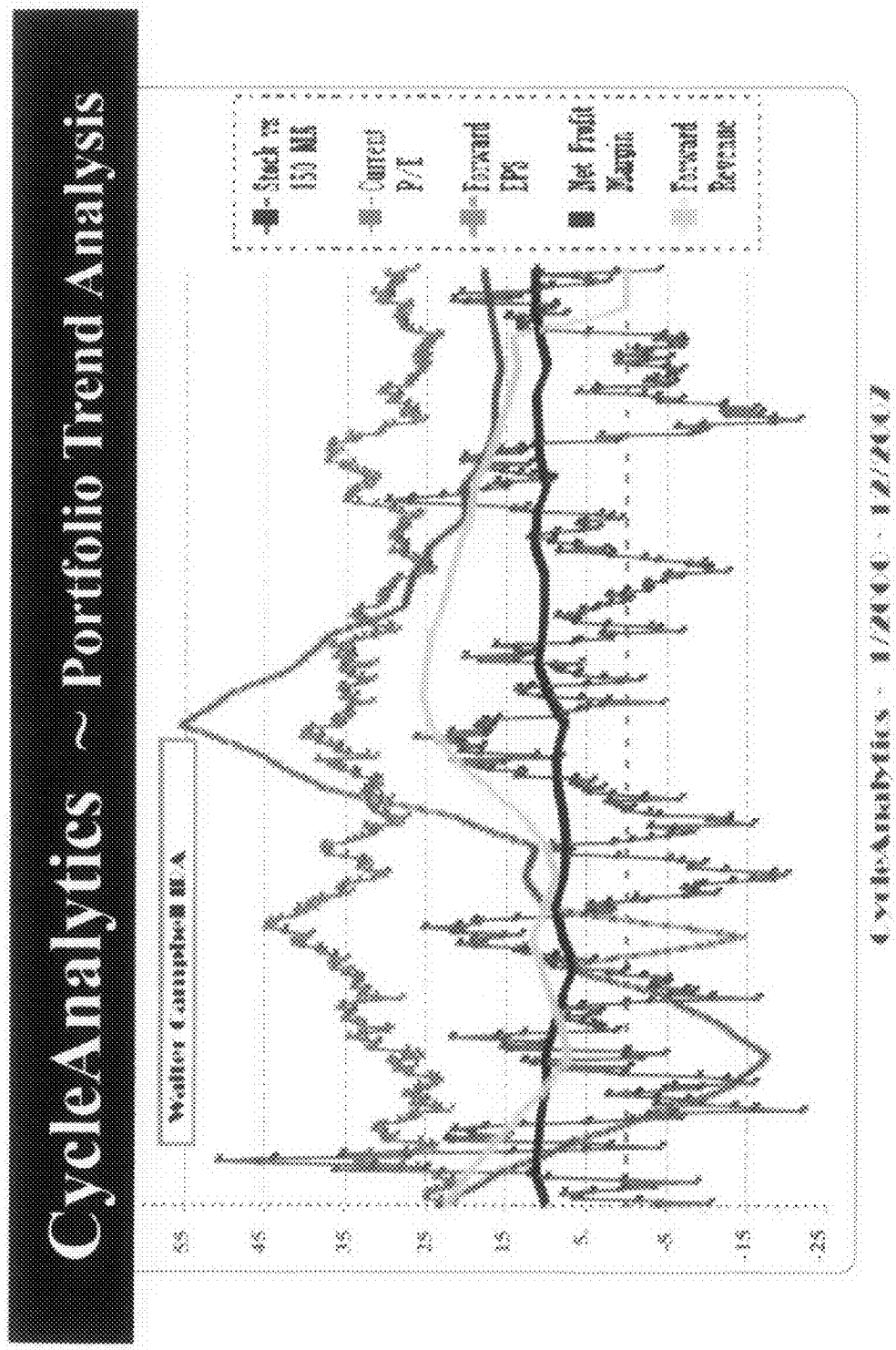
Figure 43:
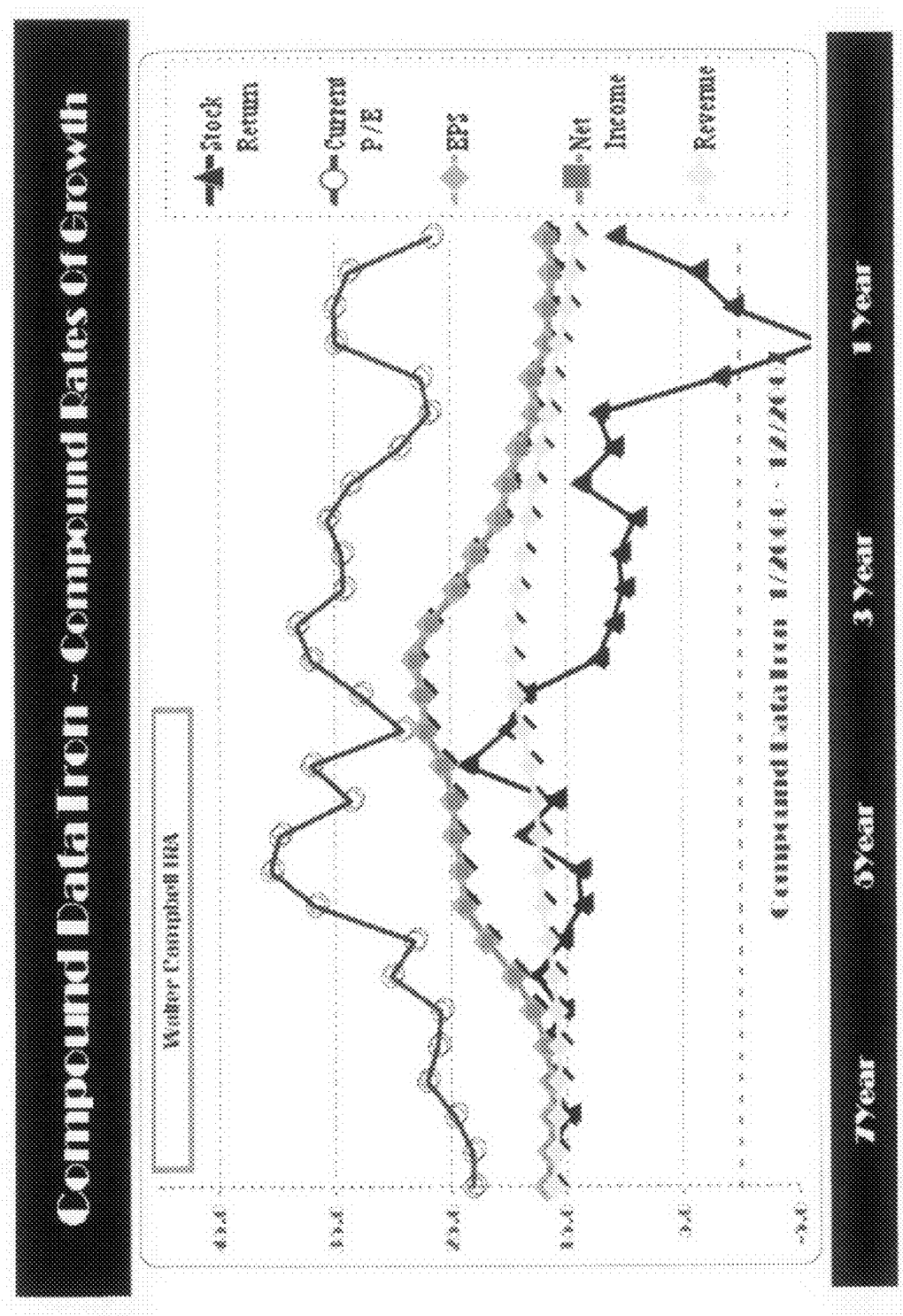
Figure 44:
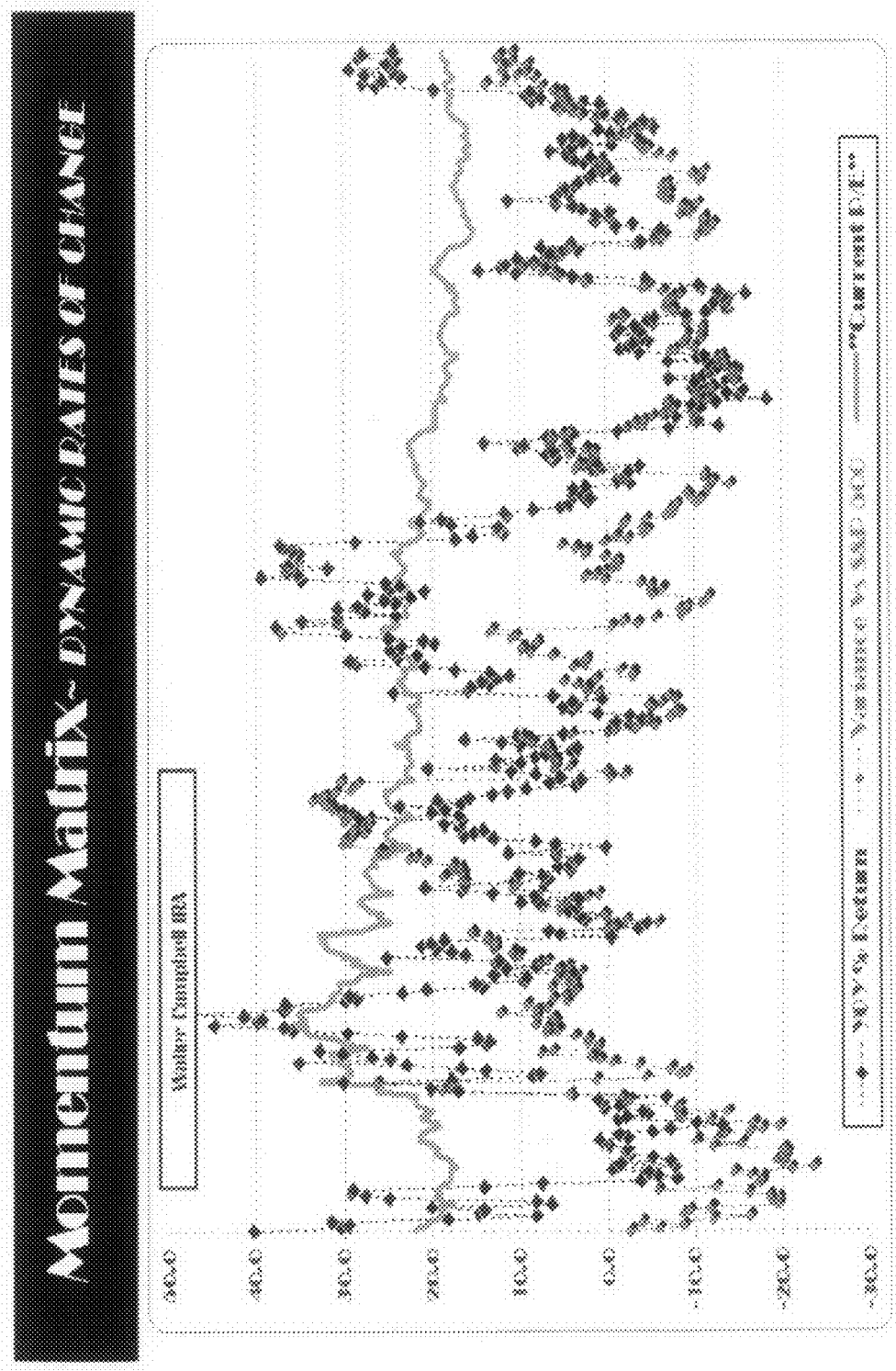

FIG. 38 is a typical graph of "Stockatron Index and Mutual Fund Analyzer" illustrating the already described "Stockatron Universe Constellation" series of formatted data graphs which are also available illustrate the relationship and correlation of the individual component pieces of which collectively comprise a specific mutual fund and index, exchange traded fund or individual portfolio to be illustrated within the "Stockatron Constellation Universe" comparison chart format series;

FIG. 39 is a typical graph of "Stockalizer Portfolio Comparison to Major Market Indexes" illustrating the net cumulative performance of the composite valuation of a portfolio when compared to major market indexes, industry groups, etc., wherein the "Stockalizer Portfolio Comparisons" vs. the market can be viewed for daily, weekly, monthly, quarterly, semiannual, annual, 3 year, 5 year, and other variable time periods;

FIG. 40 is a typical graph of "The Stockalizer"—Cumulative Growth from 1995 to 2007" illustrating the composite cumulative growth of the prorata percentage mix of companies contained within an investor's portfolio when measured over time superimposed with the cumulative growth of a variety of operating and balance sheet variables over the same time period;

FIG. 41 is a typical graph of the "CycleGraph—YOY Quarterly Rates of Change" illustrating the quarterly rates of change for the composite prorata percentage mix of companies currently held in an investor's portfolio when superimposed with a variety of operating and balance sheet variables on a Year over Year comparison basis;

FIG. 42 is a typical graph of the "CycleAnalytics—Evolving Trend Analysis" illustrating the stock performance of the composite prorata percentage mix of companies currently held in an investor's portfolio when superimposed with a variety of current, trailing and forward looking performance, operating and balance sheet variables—evolving trend analysis from 2000-2007;

FIG. 43 is a typical graph of the "Compound DataTron—Compound Rates of Growth" illustrating the composite prorata percentage mix of companies currently held in an investor's portfolio when measured for continuous compound rate of growth comparison of price movement, valuation and operating variables—a compound rate of growth graph for 2000-2007;

FIG. 44 is a typical graph of the "Momentum Matrix—2000-2007" illustrating the composite prorata percentage mix of companies currently held in an investor's portfolio, when measured for continuous dynamic range of movement of stock performance, and price movement correlations to industry groups and market indexes, valuation measures and operating variables.

FIG. 45 is an example which illustrates the intuitive higher level visualization language which is available as a result of the precision positive pattern recognition imaging construct produced by the Stockalizer Series™ System.

Figure 46:
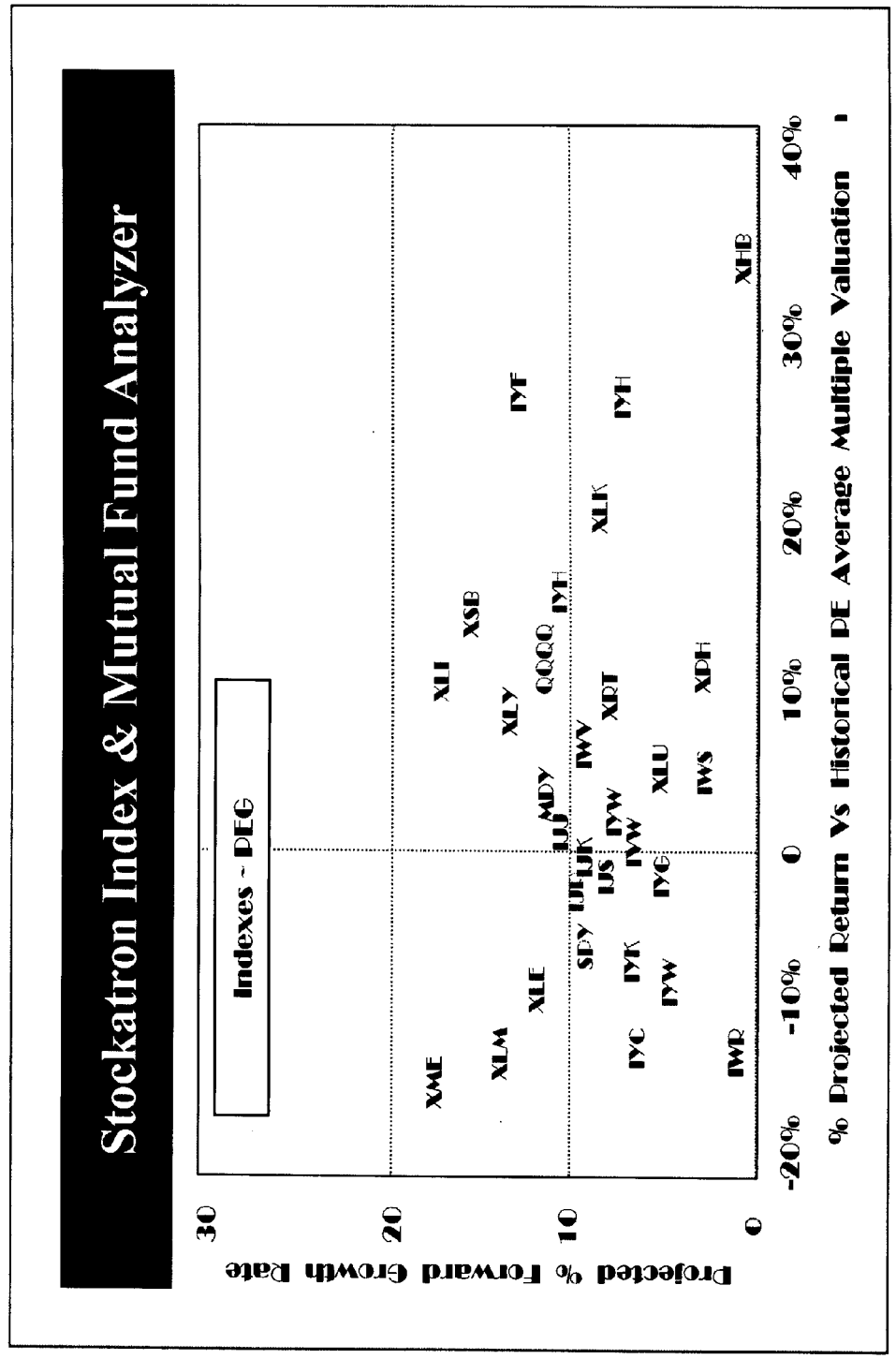

FIG. 46 is a typical graph of the "Stockatron Index and Mutual Fund Analyzer" illustrating the already described "Stockatron Constellation Universe" series of formatted data graphs which is available to measure and correlate the performance and valuation measures of any combination of stocks, indexes, exchange traded funds, mutual funds, and composite portfolios.

DESCRIPTION OF THE INVENTION

This invention provides a system and method of illustration which enable investors to easily visualize and compare the relationship of stock price movement and the underlying progression of fundamental operating variables of companies listed on exchanges around the world. For the purpose of the invention, a software system has been developed using new algorithms to derive custom data and phased array of financial database information, to calculate and solve financial data phasing and scaling issues, and to present pattern recognition graphic illustration formats which are specifically designed to create a new level of intuitive securities analysis. The central application of the software system, called the Change Point Analytics Stockalizer Program (herein after as Stockalizer Engine), is designed to assist investors in their self-education at much higher information levels and substantially faster recognition times than has been previously possible. The Stockalizer Engine allows the user to easily view the new higher level of expression of information that they need to evaluate the ongoing evolution of companies, industry groups, and different styles and strategies of decision making in their investment portfolio. The program is interactive and is easy and fun to use. By simply typing in the stock symbol from the graphical user interface (GUI), within seconds the user can produce a suite of custom visualizations and reports for virtually any company or combination of companies that he may have an interest in.

The Computer Environment

Figure 1:
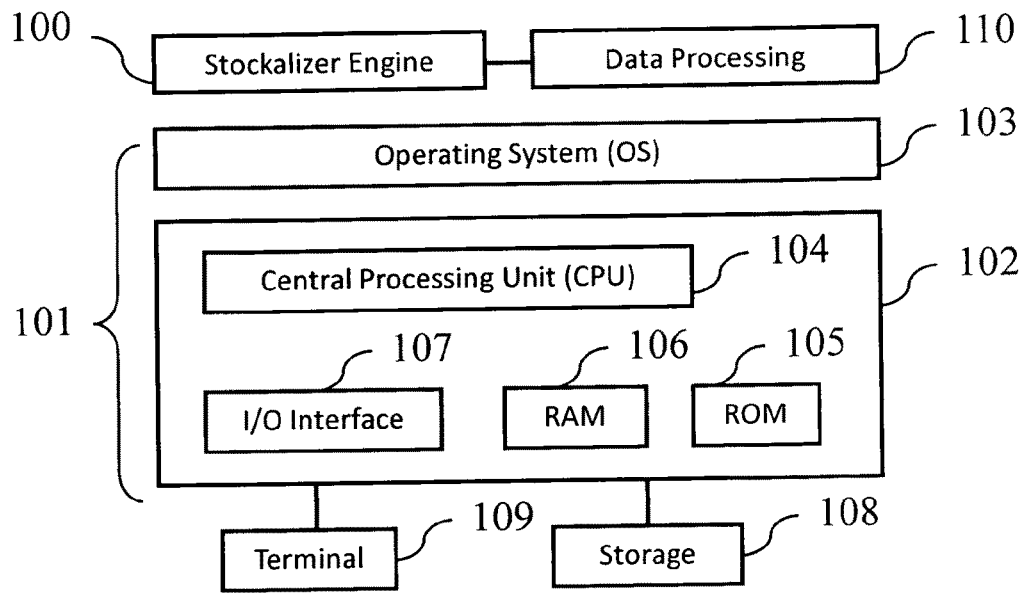
FIG. 1 is a schematic diagram illustrating a computer environment wherein the preferred embodiment of this invention operates.

FIG. 1 is a schematic diagram illustrating a computer environment wherein the preferred embodiment of this invention operates. The computer environment includes a computer platform 101 which includes a hardware unit 102 and an operating system 103. The hardware unit 102 includes at least one central processing unit (CPU) 104, a read only random access memory (usually called ROM) 105 for storing application programs, a write/read random access memory (usually called RAM) 106 available for the application programs' operations, and an input/output (IO) interface 107. Various peripheral components are connected to the computer platform 101, such as a data storage device 108 and a terminal 109. A stock performance analysis application 100, i.e. the Stockalizer Engine, adapted to a data processing application 110, such as an off the shelf spreadsheet application such as Microsoft Excel or a custom stand alone application specific database engine program, runs on the computer platform 101. Those skilled in the art will readily understand that the invention may be implemented within other systems without fundamental changes.

Figure 2:
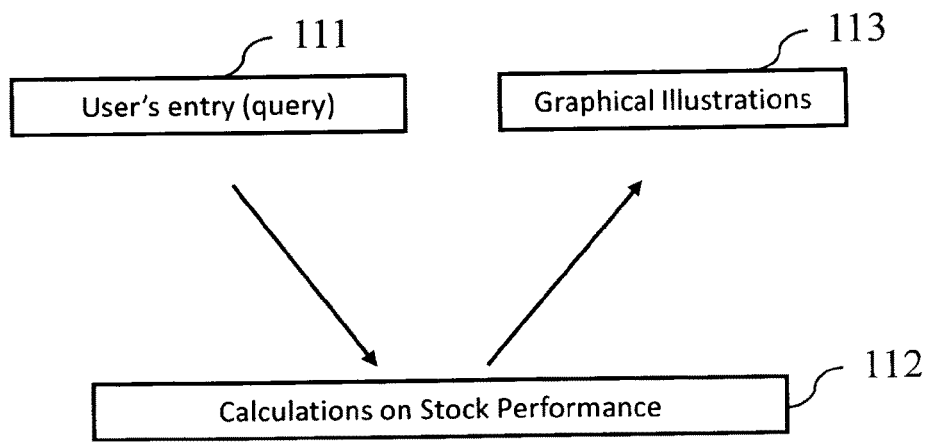
FIG. 2 is a block diagram illustrating the basic steps of the process according to the invention.

FIG. 2 is a block flow diagram illustrating the basic steps of the process according to the invention. The system and method take place in three stages: user's entry 111, calculation and analysis on stock performance in response to user's entry 112, and visual presentation of the response with graphical illustrations 113.

Figure 3:
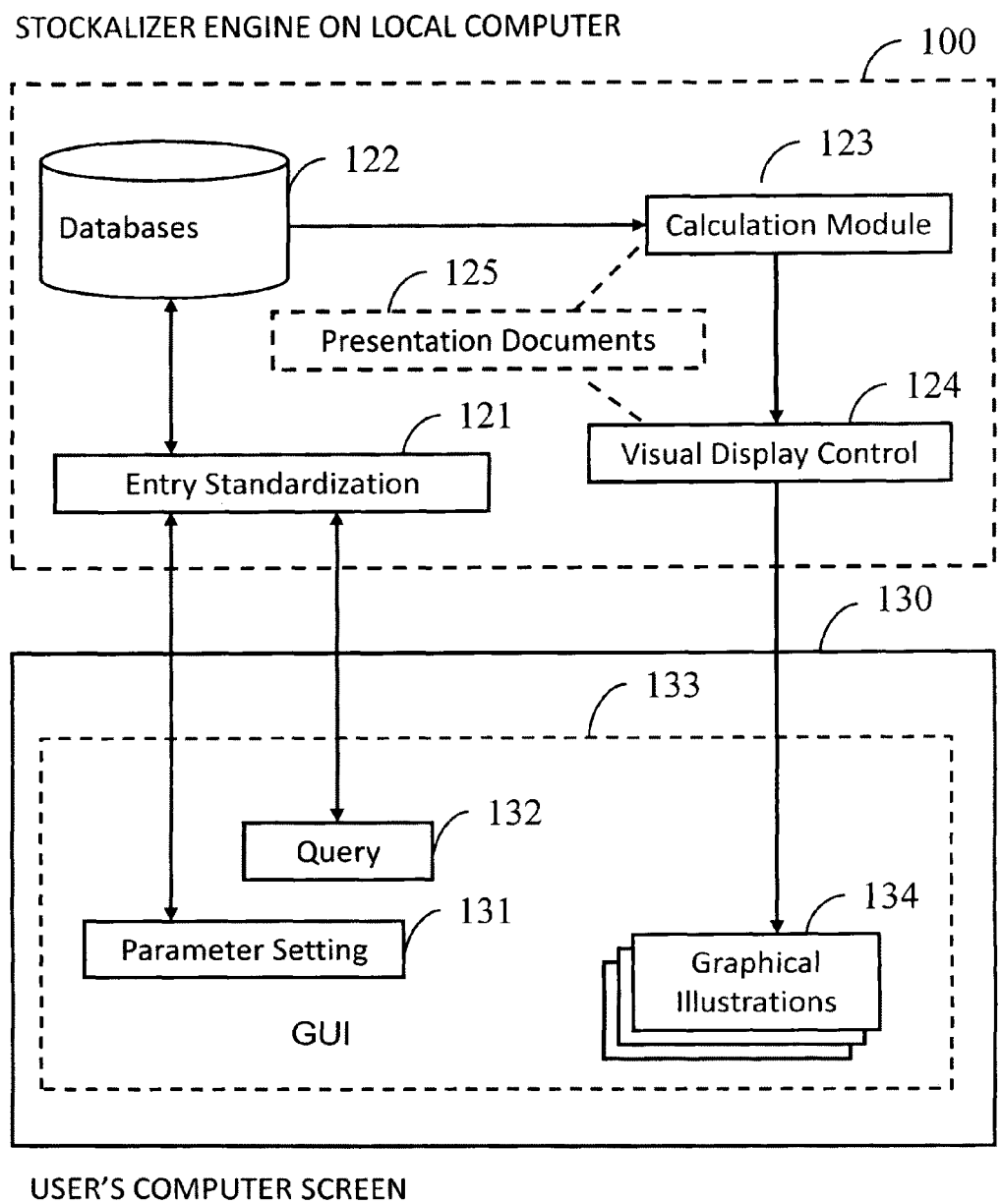
FIG. 3 is a schematic block diagram illustrating the stock performance analysis application running on a local computer according to one preferred embodiment of this invention.

FIG. 3 is a schematic block diagram illustrating one preferred embodiment of the present invention. The Stockalizer Engine 100 is incorporated with one or more data processing applications which support graphical presentation documents such as Microsoft Excel, or a custom developed standalone application specific graphic visualization program. A user who opens a document 125 may conduct an analysis via a user graphical interface (GUI) 133 displayed on the user's screen 130. The user uses a parameter setting means 131, such as a pulling-down list or a number of click-to-select virtual buttons or icons or a scaling bar or a number of hyperlinked icons, to set a number of parameters from a number of choices such as income and balance sheet data, forward estimates, historical price movement and the like. The parameter setting means 131 can be a pulling-down list or a number of click-to-select virtual buttons or icons or a scaling bar or a number of hyperlinked icons, each of which represents a setting option or a factor thereof. The system can be configured to enable the user to choose several options at the same time. The default parameters can be preset but they can be re-set by the user. The default parameter settings can be configured as the parameter settings that the user used last time. In that case, the user does not need to set parameters every time when he activates the Stockalizer Engine. The entry standardization module 121 is a program which is powerful enough to screen, analyze, and transform a non-common use query, such as a company's full name etc., into a standardized query, i.e. an official symbol for a company's stocks. After a standardized entry is determined, the standardization module 121 looks up to the databases 122 which include a number of rules of saving, indexing and extracting data. The calculation module 123 makes calculations and organizes the calculation results according to the format requirements of the presentation document 125. Via the visual display control 124, the presentation document 125 is returned to the user and displayed as graphical illustrations 134. Note that the entry standardization module 121 is optional in various implementations.

Figure 4:
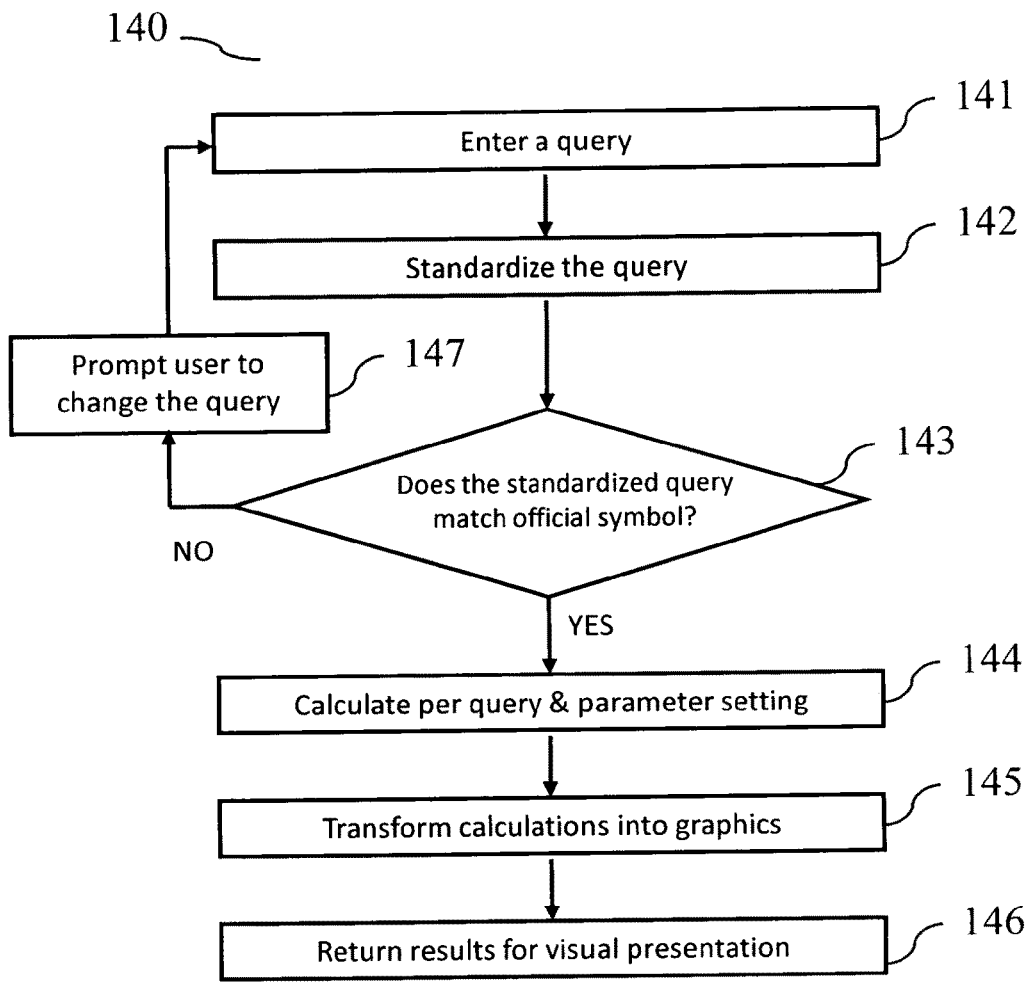
FIG. 4 is a schematic flow diagram illustrating the basic steps for the operations according to FIG. 3.

FIG. 4 is a schematic flow diagram illustrating a method 140 according the preferred embodiment of FIG. 3. The method includes the steps of:

Step 141: Enter a query, such as a company's name or a stock symbol, by the user.

Step 142: The system conducts a primary standardization on the query, i.e. standardize the query in accordance with the official list of stock symbols.

Step 143: The system tries to match the standardized query to a categorically unique symbol in the databases.

Step 147: If the standardized query fails to match a symbol in the databases, the user will be prompted to change the query.

Step 144: If the standardized query does match a symbol in the databases, the system performs calculations and analysis on the stock performance in accordance with the parameters set and the entered query.

Step 145: Transform the calculation results into a document for graphical presentation.

Step 146: Return the results for visual presentation on the user's computer screen via a user's graphical interface (GUI).

The Stockalizer Engine application can be implemented and installed in a computer network, such as the Internet, which includes a server computer and one or more client computers which are operably coupled to the server computer. In a typical implementation, the user may log-in the server's website and enter his query via a GUI.

Figure 5:
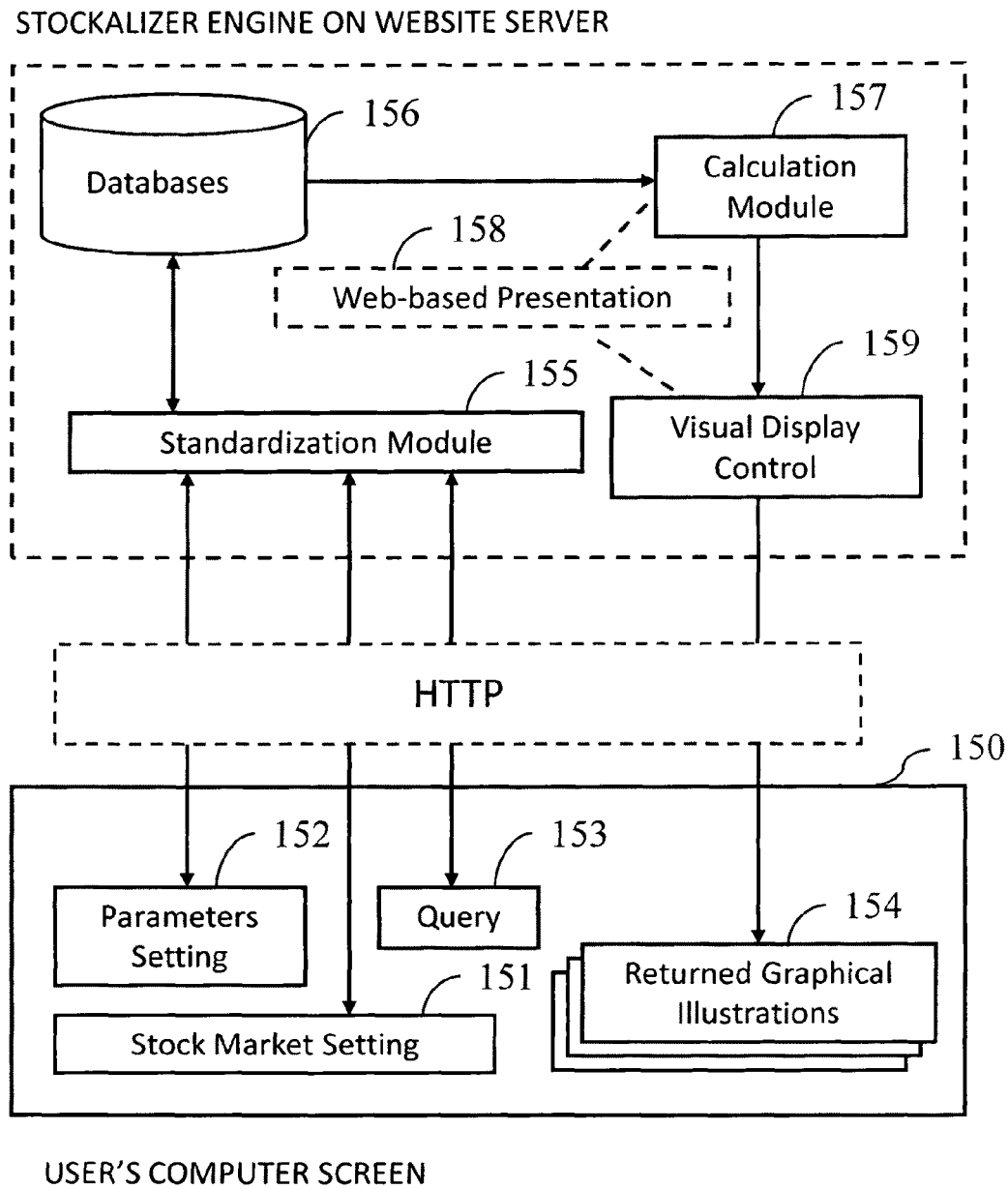
FIG. 5 is a schematic block diagram illustrating the operations for visual presentation of stock analysis via a service provider's website according to one preferred embodiment of this invention.

FIG. 5 is a schematic block diagram illustrating the operations for graphical illustrations of stock analysis via the service provider's website. Before the user initiates a task, he may set the stock market 151 and set the presentation parameters 152 through the user's graphical interface 150. The user enters a keyword, a company's name or a stock symbol as a query. When he starts the task by clicking the "GO" button or similar icon with the same function, the query is sent to the standardization module 155 which standardizes the query based on a number of rules in connection with the selected stock market and then looks up the databases 156 to match the standardized query to an officially listed stock symbol. Then, in accordance with the selected parameters, the standardization module 155, together with the database 156, reports all or some relevant data to the calculation module 157. The system then generates a web-based presentation file 158 based on the calculation results. The web-based presentation file 158, via the visual display control 159 and the interface 150, is then returned to the user, and is transformed as graphical illustrations 154.

The Graphical Presentations

The visual presentation system according to the present invention includes a set of Stockalizer visualization charts, which represent a substantial first in the financial industry, an important advancement of the art new array of financial market data specific, highly intuitive graphic formats which allow the user for the first time to superimpose and compare the progression of combinations of key fundamental, technical and relative value data right along with stock price movement and performance analytics over the same time period.

FIGS. 10, 11, 24, 27, 29 & 45 briefly illustrate some of the key advancement of the art features and advantages of the new technology as expressed in logarithmic levels of revolutionary new financial market applications, and advancement of the logical structure of the computing power data array required to drive the powerfully intuitive application and industry specific advancement of the art—pattern recognition proprietary illustration formatting, which results in a quantum leap in data visualization technology available in the global financial marketplace.

Figure 6:
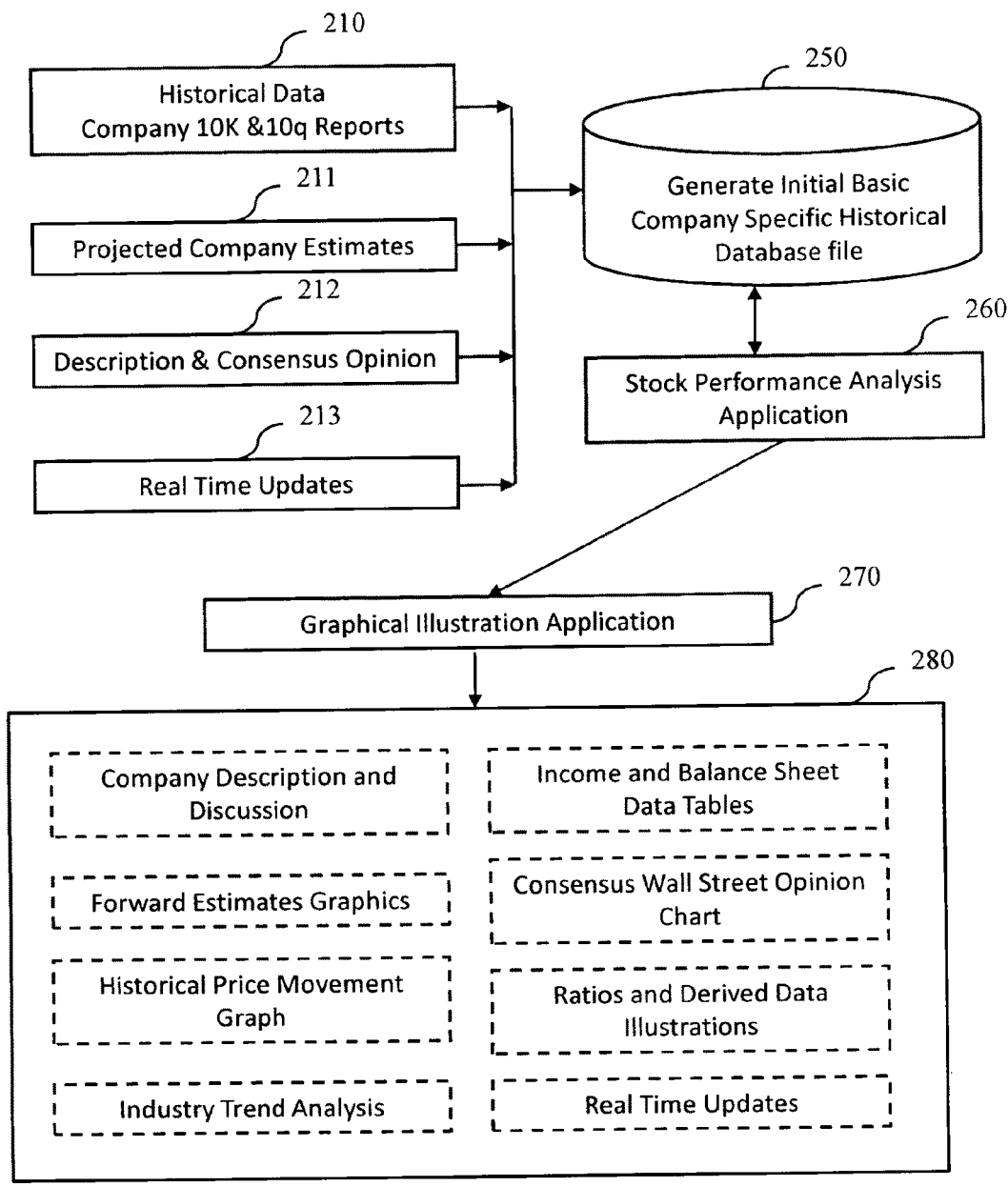
FIG. 6 is a block diagram illustrating the system for presenting the pattern recognition graphs of stock performance analysis for company specific historical data according to the invention.

FIG. 6 is a block diagram illustrating the system for presenting the pattern recognition graphs of stock performance analysis for company specific historical data. The system integrates the historical data company 10K & 10 q reports 210, the projected company estimates 211, the description and consensus opinion 212 and the real time updates 213 into the databases which generate initial basic company specific historical database file 250. The stock performance analysis application 260, together with the graphical illustration application 270, transforms the generated file 250 into graphical illustrations 280. The graphical illustrations 280 include, but not limited to textual information of company description and discussion, forward estimates graphics, historical price movement graph, industry trend analysis graph, income and balance sheet data tables, consensus Wall Street opinion charts, ratios and derived data illustrations, and real time updates.

Figure 7:
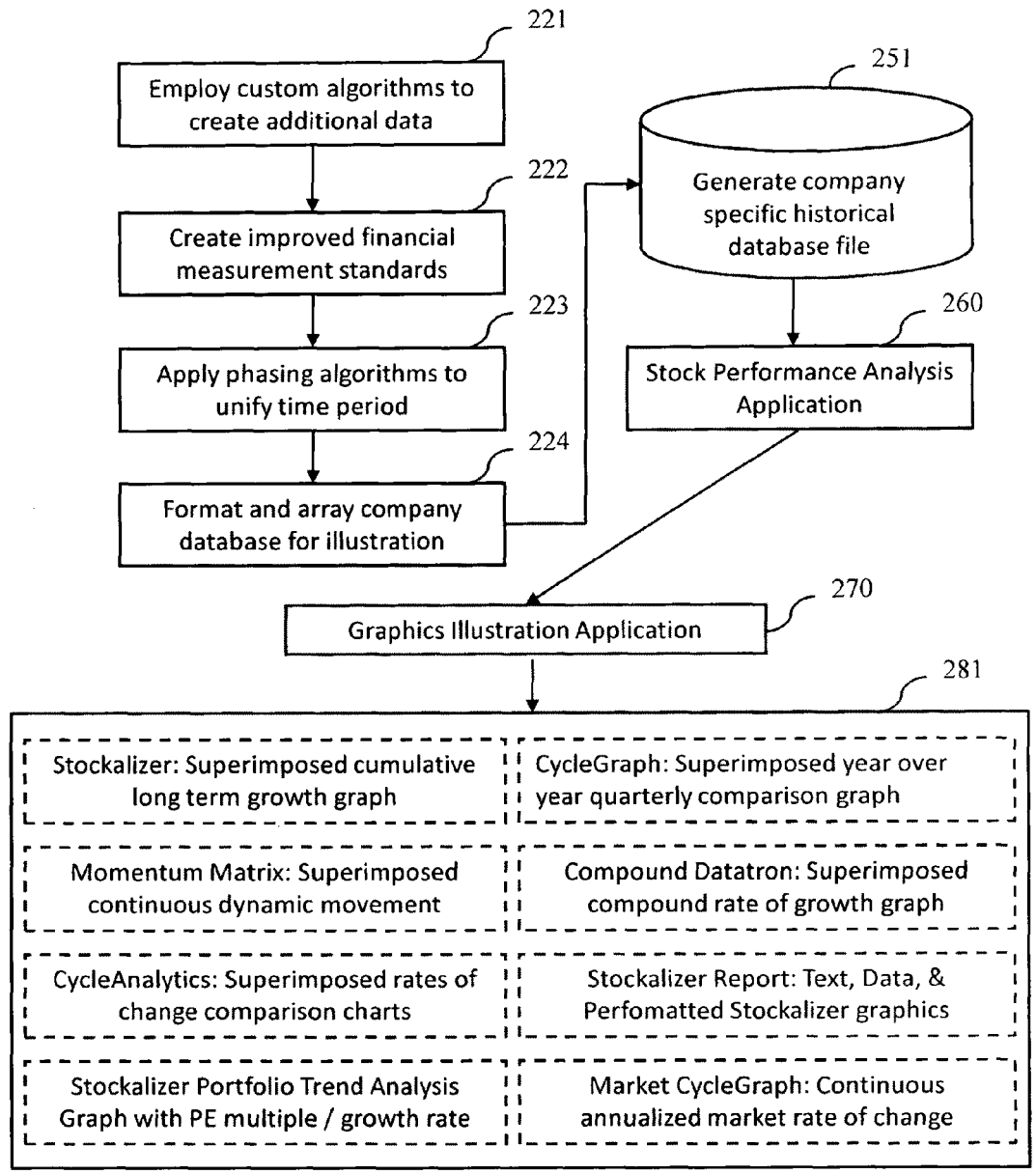
FIG. 7 is a flow diagram illustrating the method for presenting the pattern recognition graphs of stock performance analysis on company specific historical data according to the invention.

FIG. 7 is a flow diagram illustrating the method for presenting the pattern recognition graphs of stock performance analysis on company specific historical data according to the invention. The method includes the steps of:

Step 221: Employ custom algorithms to create additional data;

Step 222: Create improved financial measurement standards;

Step 223: Apply phasing algorithms to unify time period;

Step 224: Format and array company database for illustration;

Step 251: Generate company specific historical database file;

Step 260: Perform calculations and analysis on company and stock performance analytics;

Step 270: Transform the results into graphical illustrations.

The graphical illustrations include, but are not limited to, composite superimposed cumulative long term growth graphs, composite superimposed year over year quarterly comparison graph, composite superimposed rates of change comparison charts, composite continuous annualized market rate of change, composite superimposed compound rate of growth graph, composite dynamic rates of change graphs, composite evolving trend analysis graphs, and multiple page composite graphical reports.

Figure 8:
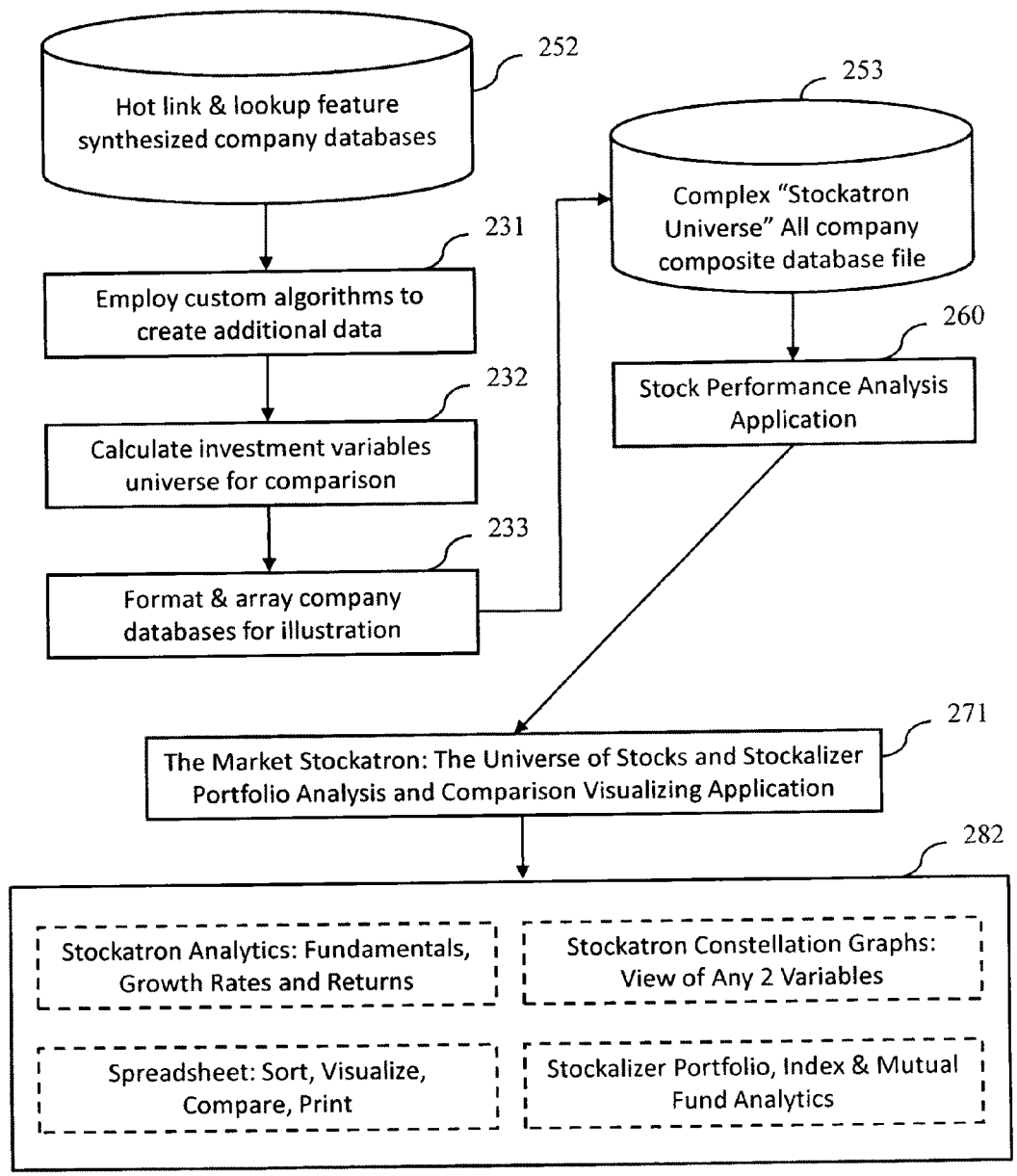
FIG. 8 is a flow diagram illustrating the method for presenting the pattern recognition graphs of stock performance analysis on historical data of all companies according to the invention.

FIG. 8 is a flow diagram illustrating the method for presenting the pattern recognition graphs of stock performance analysis on historical data of all companies according to the invention. The method includes the steps of:

Step 252: Synthesize all company database files;

Step 231: Employ custom algorithms to create additional data;

Step 232: Calculate investment variables universe for comparison;

Step 233: Format and array company databases for illustration;

Step 253: Generate all company composite database file;

Step 260: Perform calculations and analysis of stock performance comparison;

Step 270: Transform the results into graphical illustrations of the comparison.

The graphical illustrations on the comparison include, but not limited to, (1) fundamentals, growth rates and returns (Stockatron Analytics), (2) view of any two variables (Stockatron comparison graphs), (3) functional keys to sort, visualize, compare and print (Stockatron Spreadsheet), and (4) portfolio, index and mutual fund analytics and illustration (Stockalizer Portfolio Series).

Figure 9:
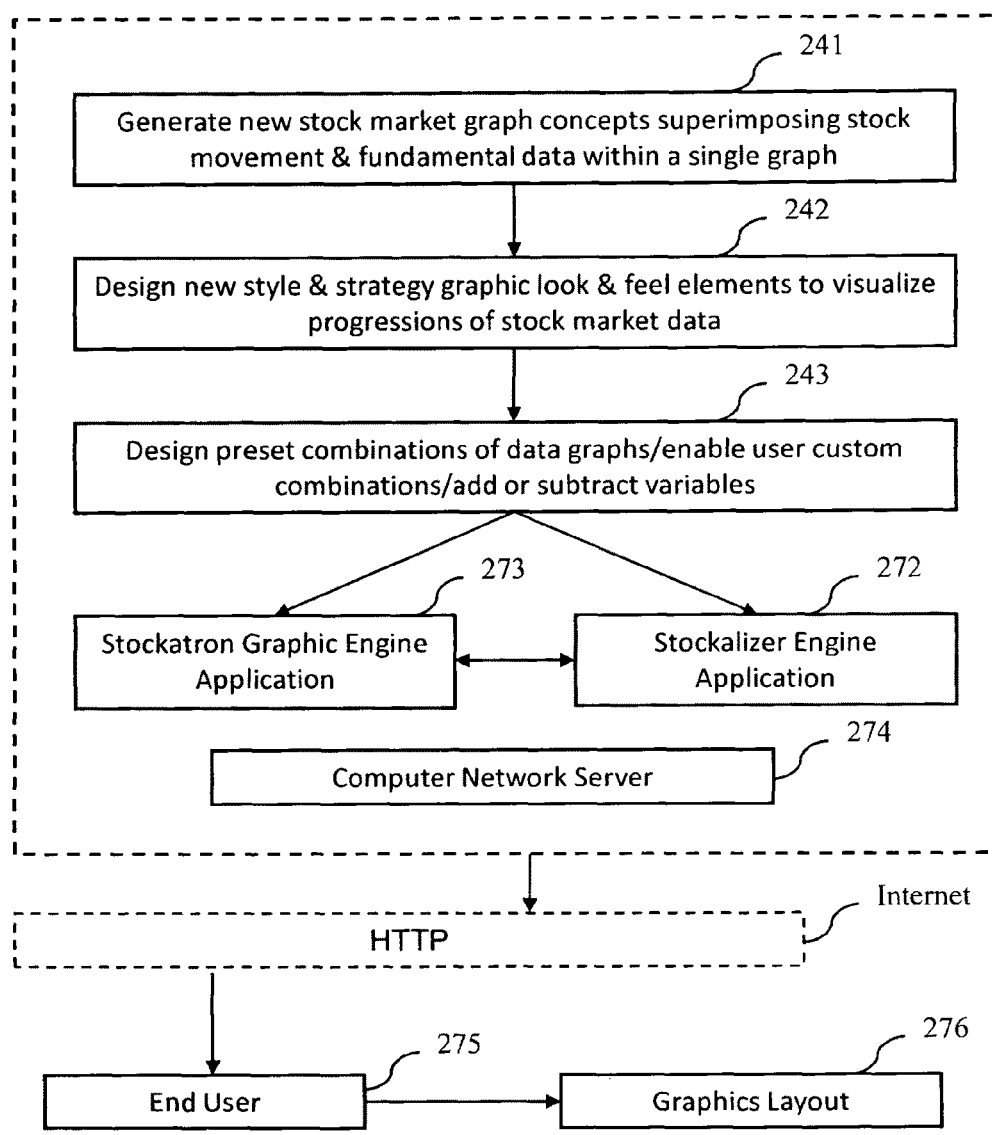
FIG. 9 is a flow diagram illustrating the method for presenting the pattern recognition graphs of stock performance analysis via a computer network such as the Internet according to the invention.

FIG. 9 is a flow diagram illustrating the method for presenting the pattern recognition graphs of stock performance analysis via a computer network such as the Internet according to the invention. The method includes the steps of:

Step 241: Generate new stock market graph concepts superimposing stock movement and fundamental data within in a single graph;

Step 242: Design new style and strategy graphic look and feel elements to visualize progressions of stock market data;

Step 243: Design preset combinations of data graphs;

Step 272: Perform calculations;

Step 273: Generate graphical illustrations;

Step 274: Transfer data from server computer to client computer;

Step 275: Adapt the transferred data to the client application;

Step 276: Present graphical illustrations via GUI.

Figure 12:
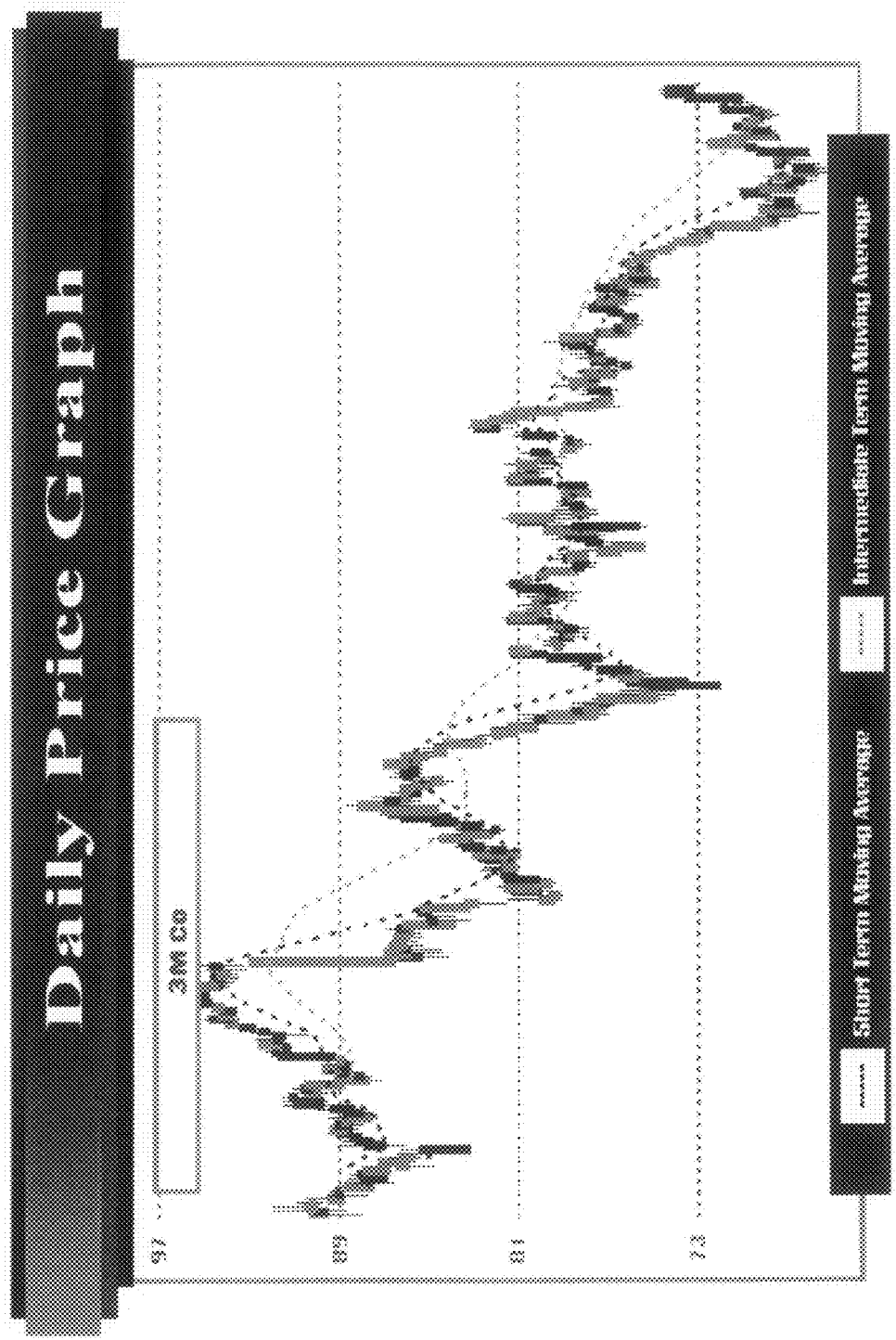
FIG. 12 is a typical graph for the "daily price graph" illustration, using open, high, low, close color coded boxes with two moving averages.

There are 9 proprietary new pattern recognition graphic formats included in the Stockalizer visualization charts array package:

1. Daily Price Graph, a price movement chart, presents a Custom Open/High/Low/Close color coded box horizontal line graph chart which indicates short or intermediate term price movement and indicates close above or below the open by color coding, and also includes color coded preset or variable moving averages. FIG. 12 is a typical graphical presentation of Historical Price—Open, High, Low, Close Color Coded Box Graph, and two moving averages.

Figure 13:
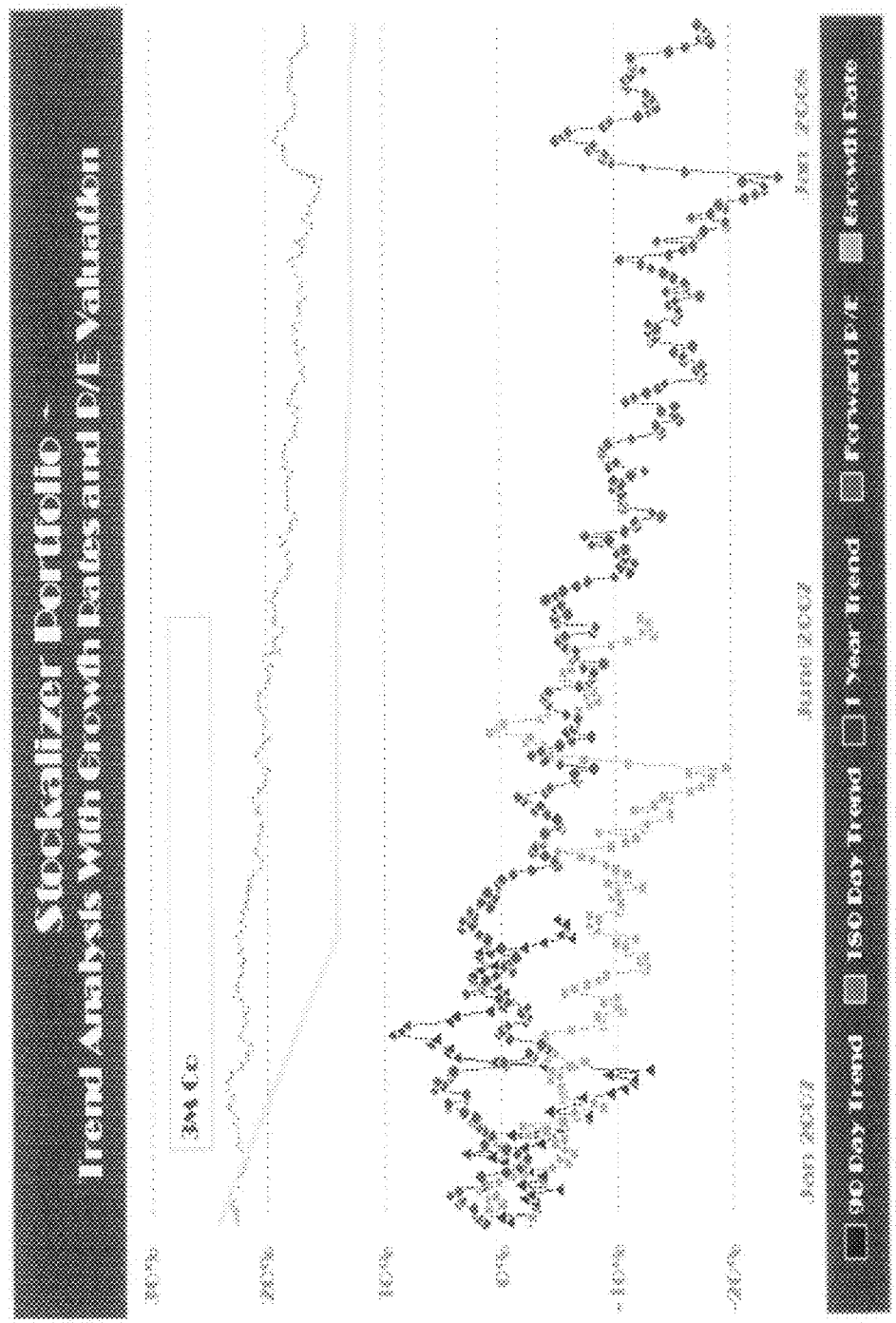
FIG. 13 is a typical graph of the "Stockalizer Portfolio—Trend Analysis" illustration showing a 90 day, 180 day and 365 day historical price performance, juxtaposed with the progression of the price earnings multiple (PE) and growth rate (EPS+Revenue) as illustrated within a single graph over a one year period.

2. Stockalizer Portfolio Trend Analysis, a price movement chart, presents three or more time period representations of price performance within the same graph and superimpose variable time period price movement trend analysis with a horizontal line graph presentation summary of growth variables (EPS, Revenue, Cash Flow, ERBITDA etc., blends), and other operating performance or valuation measures such as PE Multiple (Trailing, Current or Forward), operating performance measures such as ROE, ROA, Profit Margins, ETC. FIG. 13 is a typical graphical presentation of a 90, 180 and 365 day historical price graph superimposed with two "quick snapshot" variables to provide a short to intermediate term trend analysis of an individual company, industry group or composite portfolio summary.

Figure 14:
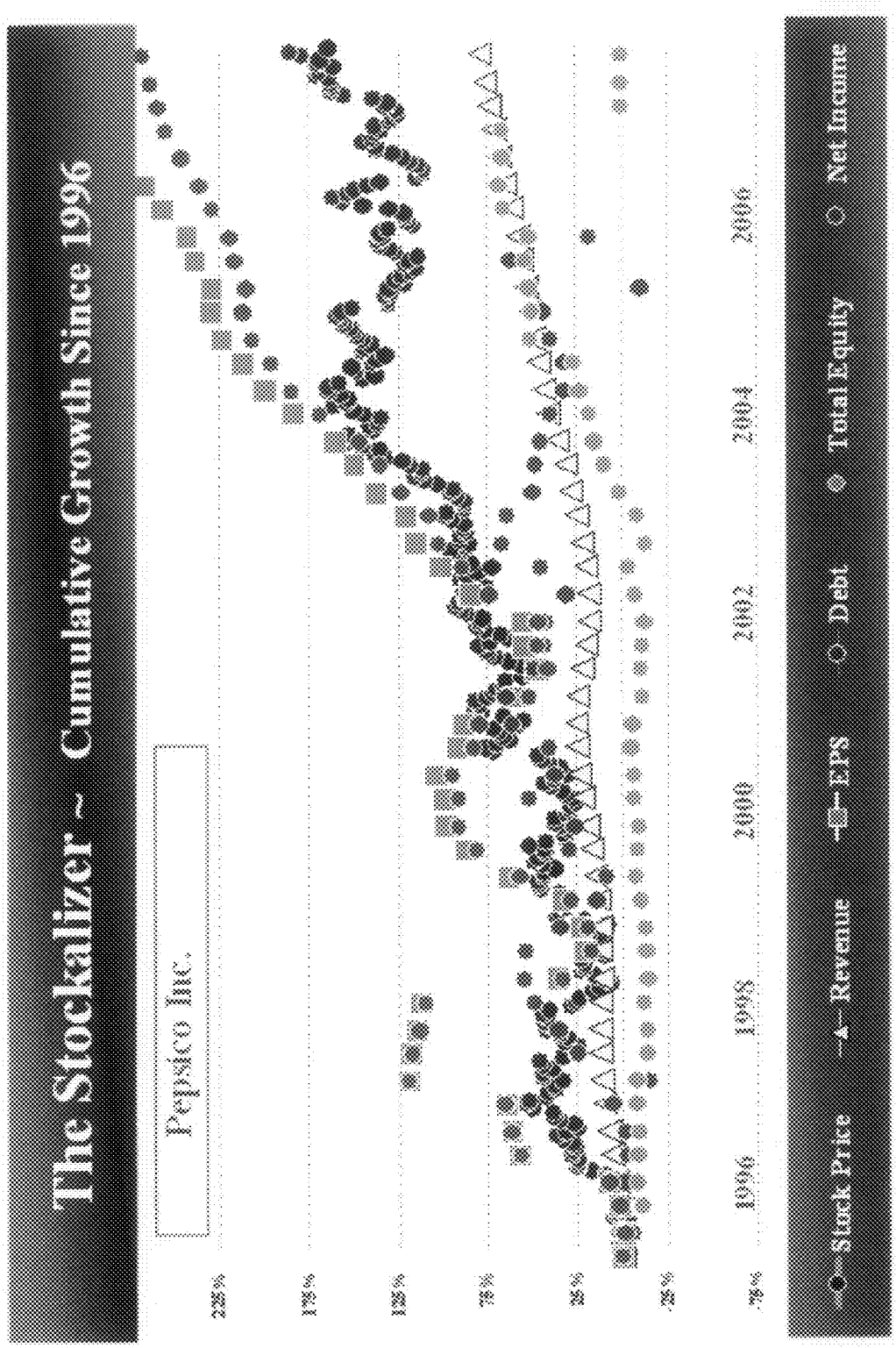
FIG. 14 is a typical graph of "The Stockalizer" illustrating the cumulative growth of a company's stock performance over time superimposed with a variety of operating and balance sheet variables.

3. The Stockalizer Graph presents a progression of data points or a continuous line custom cumulative change horizontal line graph which superimposes combinations of key variables such as Cumulative Change of Earnings Per Share (EPS), Revenue, Cash Flow, Net Income, Debt, Total Equity, ERBITDA, and Stock Price Movement, and a host of other financial variables that can be expressed over a single vertical data cumulative % measurement scale, and a horizontal time scale. The user can elect the pre-selected data series, or add or subtract other key variables to view. FIG. 14 is a typical graphical presentation of a company's stock performance—cumulative growth from 1995 to 2007. Additional commonly desired preset time periods are also available, or the user can custom select the time period they wish to view.

Figure 15:
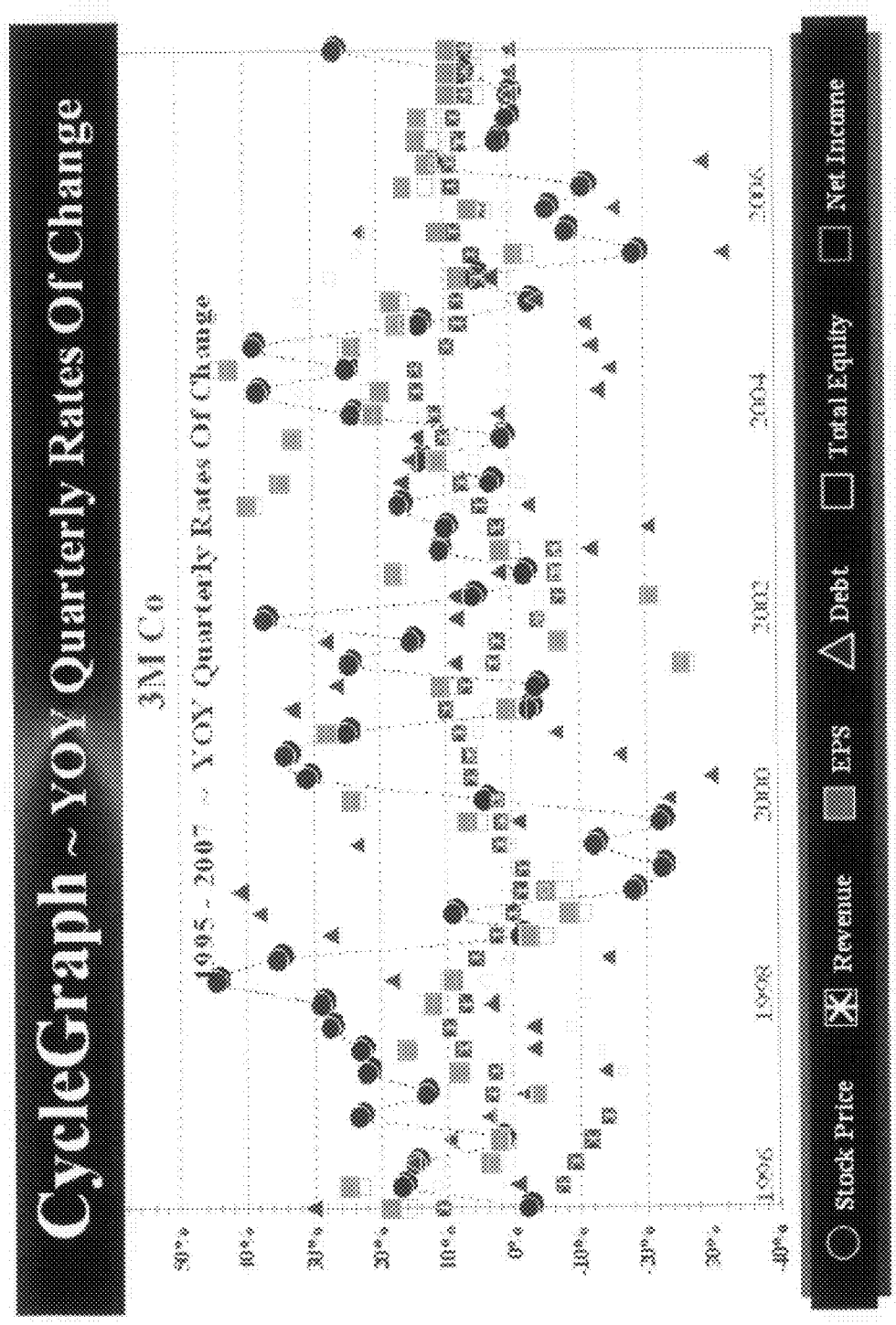
FIG. 15 is typical graph of the "CycleGraph—YOY Quarterly Rates of Change" illustrating a company's stock performance superimposed with a variety of operating and balance sheet variables on a Year over Year comparison basis.

4. The CycleGraph presents a progression of data points or a continuous line "custom annual rate of change" graph which superimposes key year over year quarterly and more frequently reported time frames of expression of variables such as EPS, Revenue, Net income, Debt, Cash Flow, Total Equity, ERBITDA, Price Earnings Multiple, Stock Price Movement, etc., over a single vertical data % measurement scale, and a horizontal time scale. The user can elect the pre-selected data series, or add or subtract from a wide selection of other key variables to view. FIG. 15 is a typical graphical presentation of a company's stock performance—year-over-year quarterly rates of change from 1995 to 2007.

Figure 16:
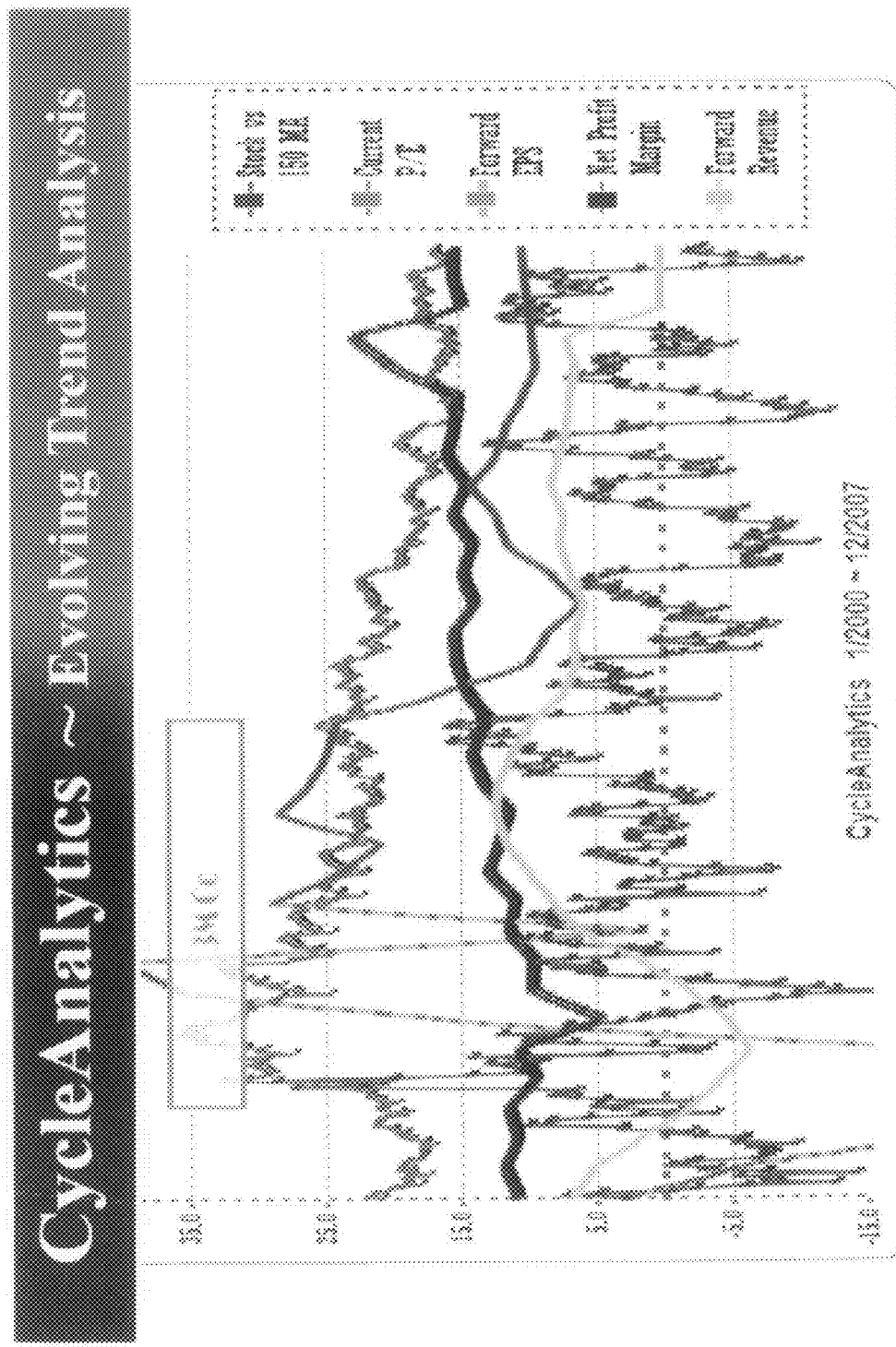
FIG. 16 is typical graph of the "CycleAnalytics—Evolving Trend Analysis" illustrating a company's stock performance superimposed with a variety of current, trailing and forward looking performance, operating and balance sheet variables—evolving trend analysis for a period of time.

5. CycleAnalytics presents a series of data points or a continuous line of data points "custom variable period rate of change horizontal line graph" which superimposes key year over year quarterly expression (and more frequently reported time frames) of variables which can be stated variously as Trailing, Current or Forward EPS, Revenue, ERBITDA, Profit Margins, Price Earnings Multiple, and Stock Price Movement vs. the 50, 150, annual or variable timeframe. The user can elect the pre-selected data series, or add or subtract from a wide selection of other key variables to view. FIG. 16 is a typical graphical presentation of a company's stock performance—evolving tread analysis from 2000-2007. Additional preset time periods are also available, or the user can custom select the time period they wish to view.

Figure 17:
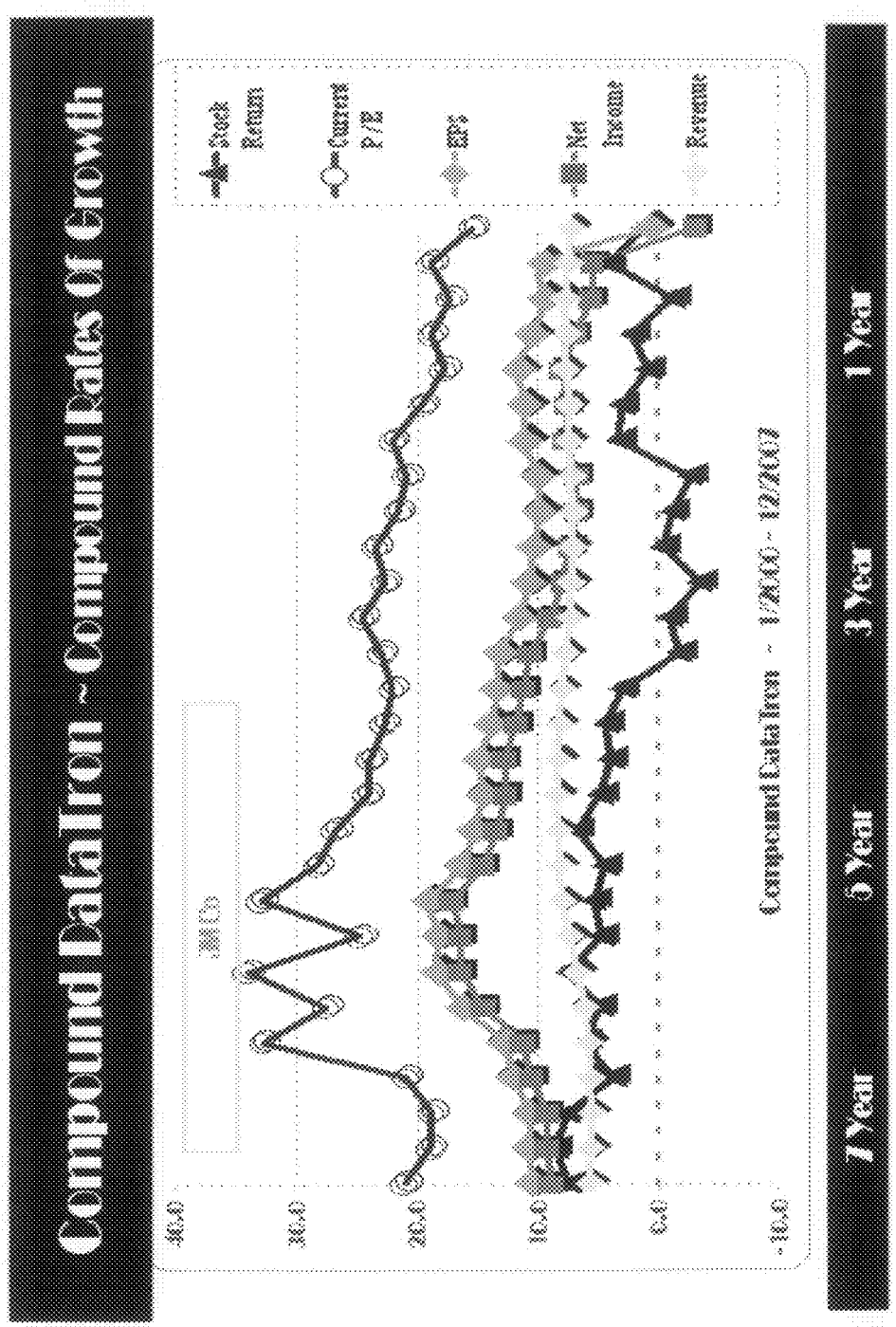
FIG. 17 is typical graph of the "Compound DataTron—Compound Rates of Growth" illustrating continuous compound rate of growth comparison of price movement, valuation and operating variables—a compound rate of growth graph.

6. Compound DataTron presents a continuous line of data points "custom compounded rate of growth horizontal line graph" which superimposes quarter end and more frequently reported time frames compounded values of key variables such as EPS, Revenue, ERBITDA, Net Income, Total Equity, Debt, Book Value, ROE, ROA, and Stock Price Movement going back over time. The user can elect various time periods to illustrate, can view pre-selected data series illustrations, or add or subtract from a wide selection of other key variables to view. FIG. 17 is a typical graphical presentation for continuous compound rate of growth graph 2000-2007.

Figure 18:
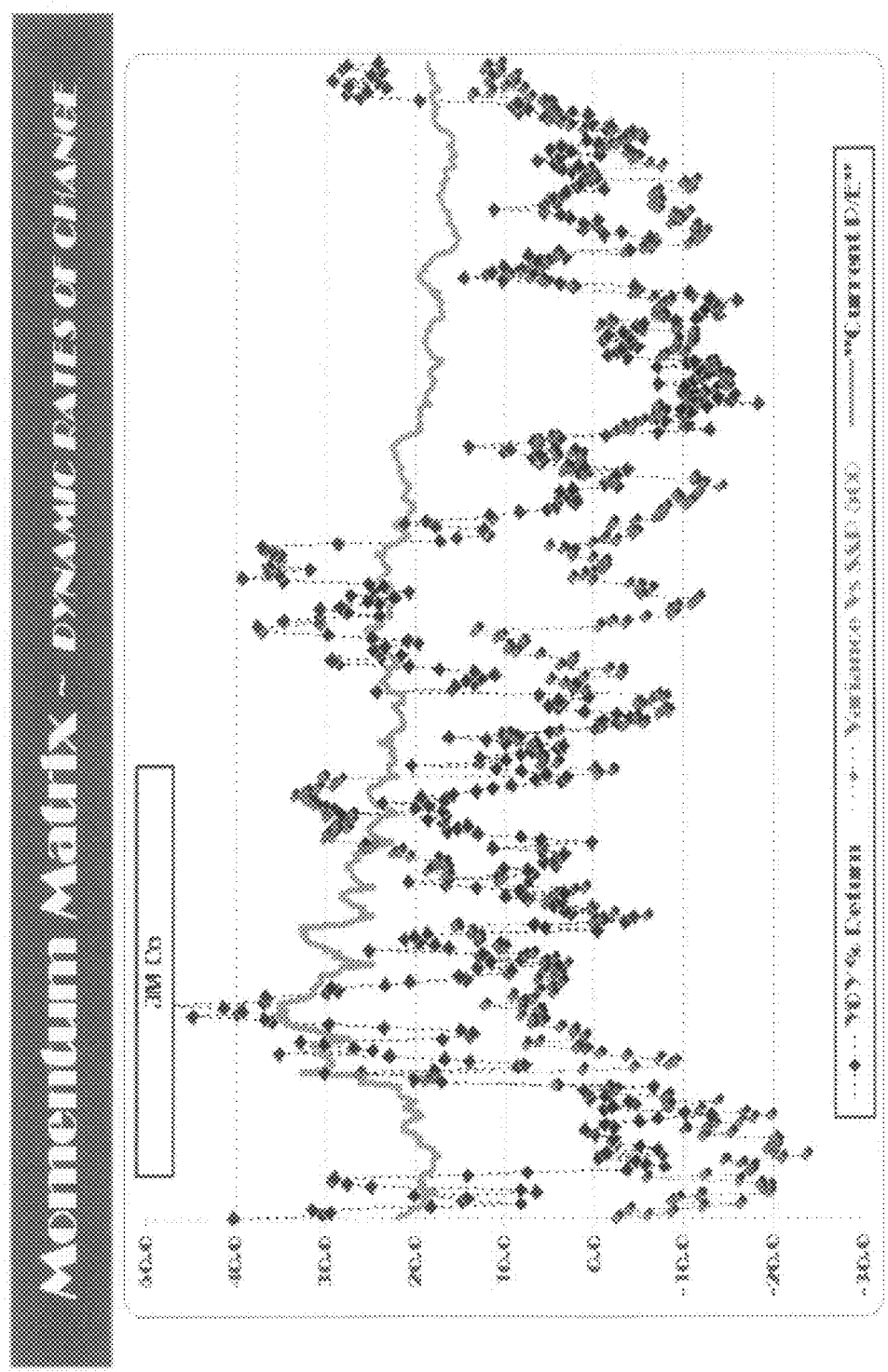
FIG. 18 is typical graph of the "Momentum Matrix" illustrating continuous dynamic range of movement of stock performance, and price movement correlations to industry groups and market indexes, valuation measures and operating variables.

7. Momentum Matrix presents a continuous line of data points "custom dynamic range of movement variable period rate of change horizontal line graph" which superimposes key year over year, quarterly and periodic expression of more frequently reported time frames of variables which can be stated variously as Trailing, Current or Forward Growth Rate (individual expressions of/or combinations of Income, cash flow, ERBITDA, Earnings, Revenue), ROE, ROA, Beta, Alpha, Stock Price Movement characteristic expression vs. the 50 and 150 day or other moving averages, annual year over year, year to date and or other variable timeframe price movement, and or daily, weekly, monthly or quarterly Open, High, Low, Close dynamic range of price movement and or other Stock Price Movement Volatility or other measurement such as +/− return vs. the S&P 500, Nasdaq or other index or measure. The user can elect the pre-selected data series, or add or subtract from a wide selection of other key variables to view. FIG. 18 is a typical graphical presentation for continuous dynamic range of movement.

Figure 19:
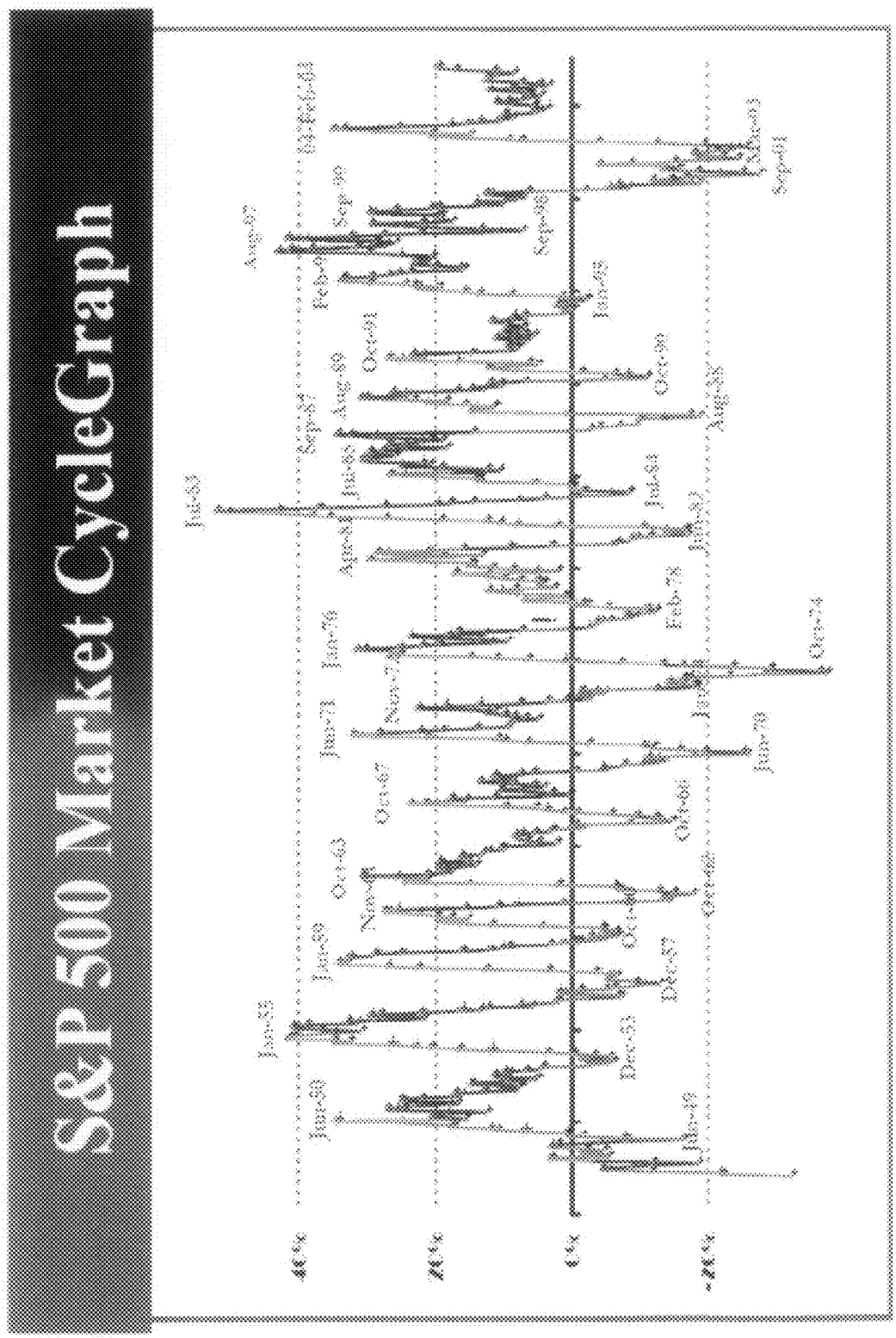
FIG. 19 is typical graph of the "Market Cyclegraph—S&P" illustrating long term daily year over year patterns of price performance for individual stocks and major market indexes (this example of the S&P 500 market cycle also illustrates the color coded three market phases which characterize the cyclically repeating long term full market cycle for the S&P 500)
Figure 20:
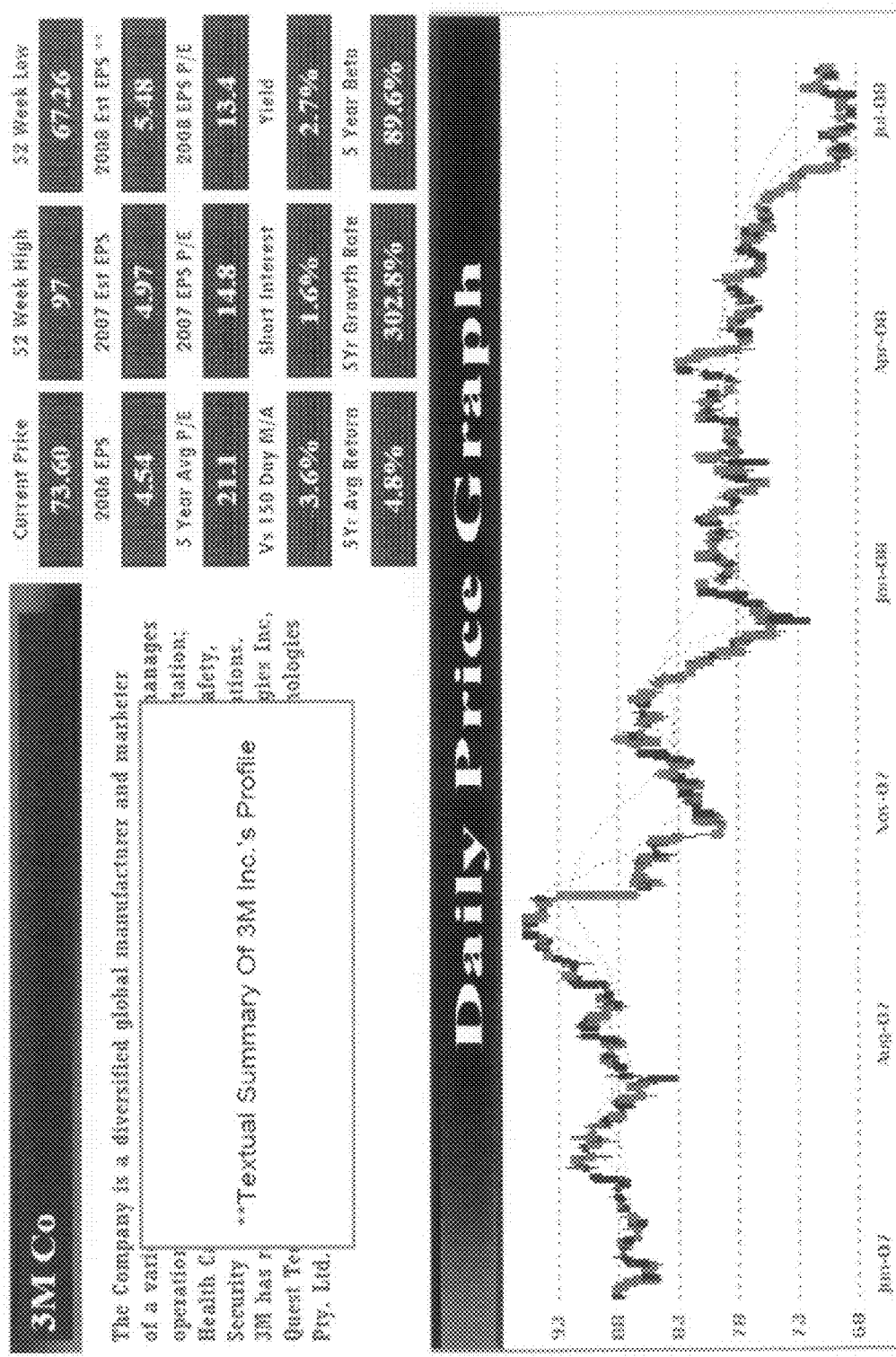
FIGS. 20-23 are typical graphs of the "The 4-Page Stockalizer Report" illustrating an automated composite 4-page summary report including text boxes, proprietary data tables and combinations of "Stockalizer Series" illustrations arranged in a preformatted company specific multi-page summary report format.
Figure 21:
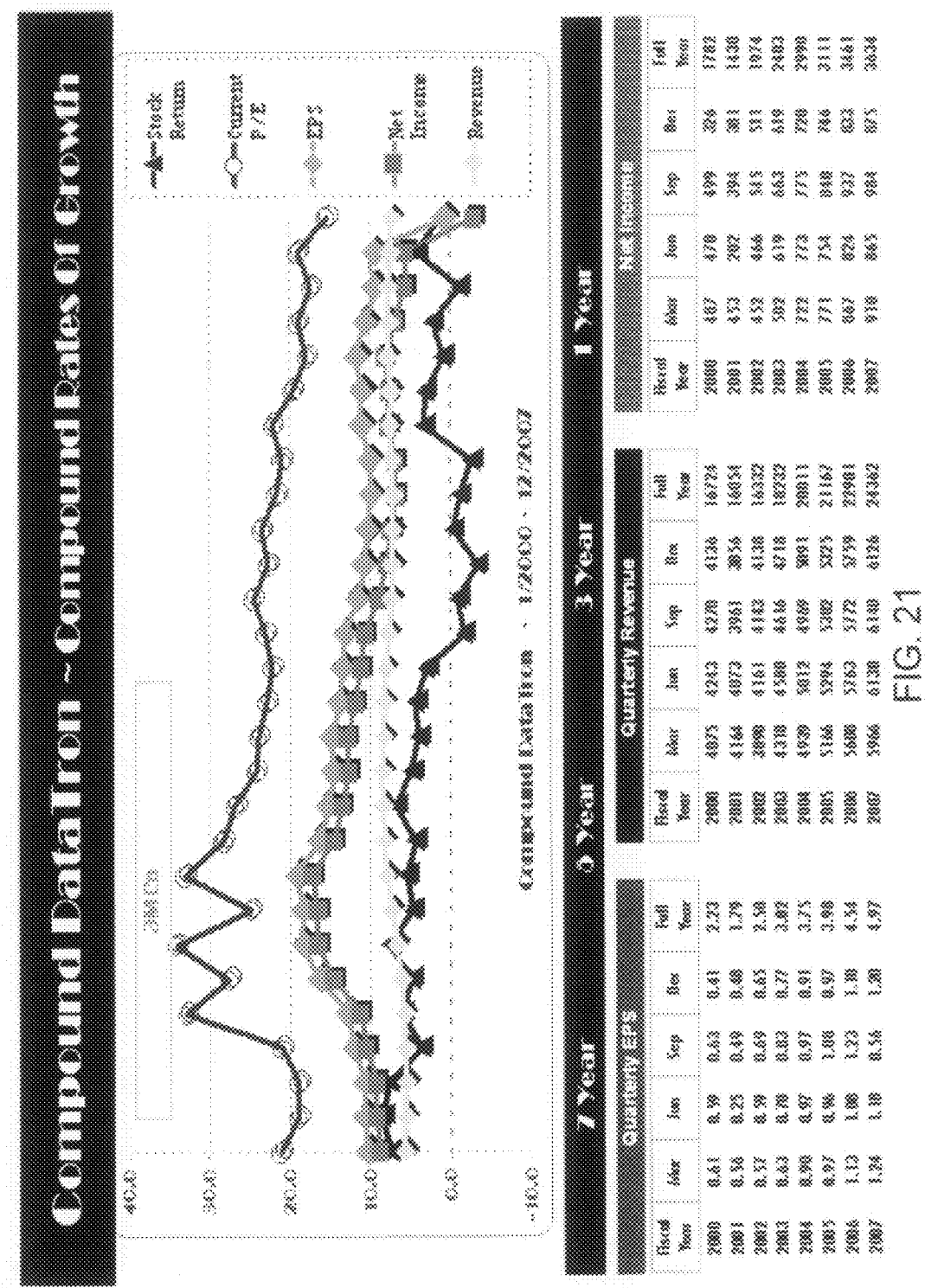
Figure 22:
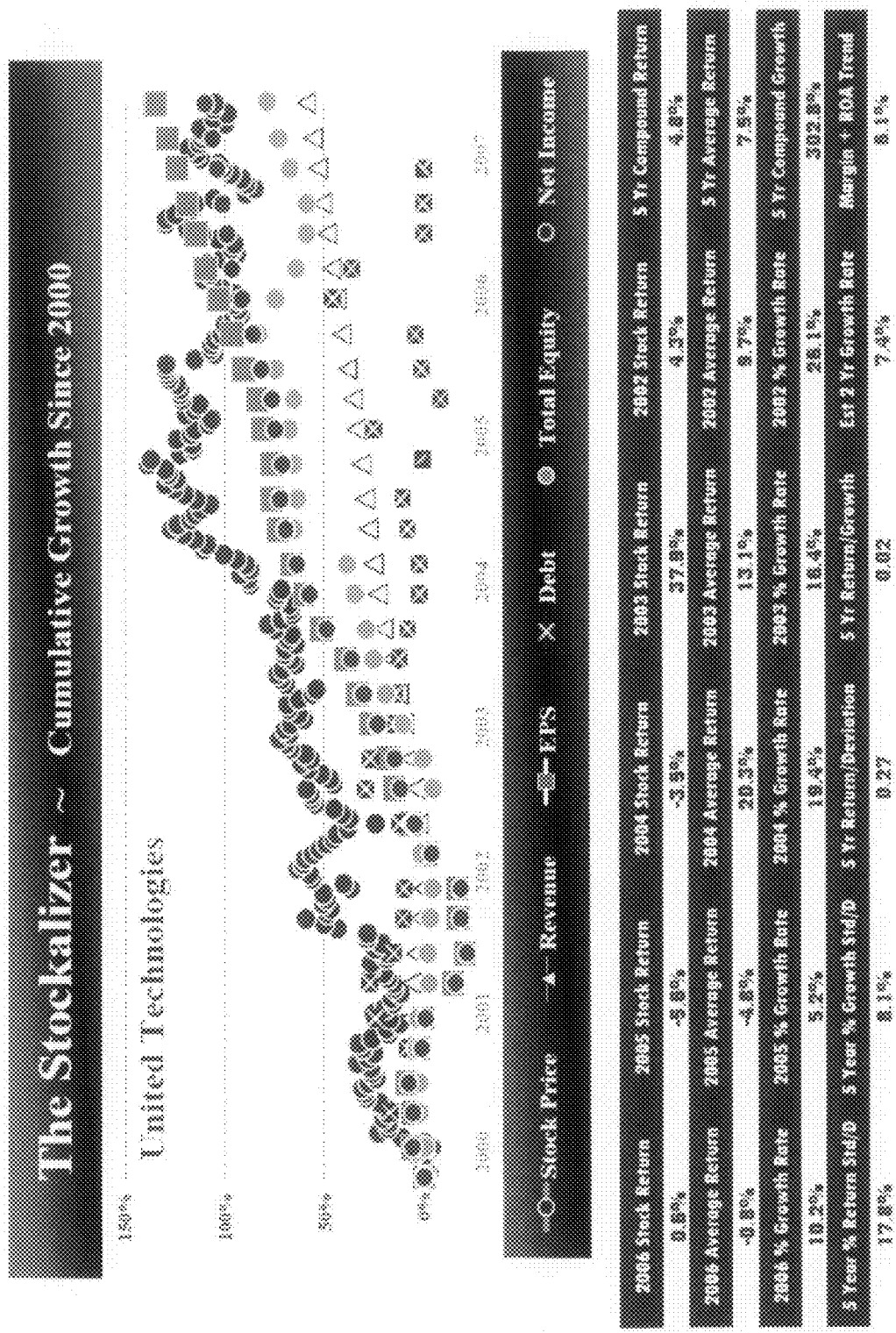
Figure 23:
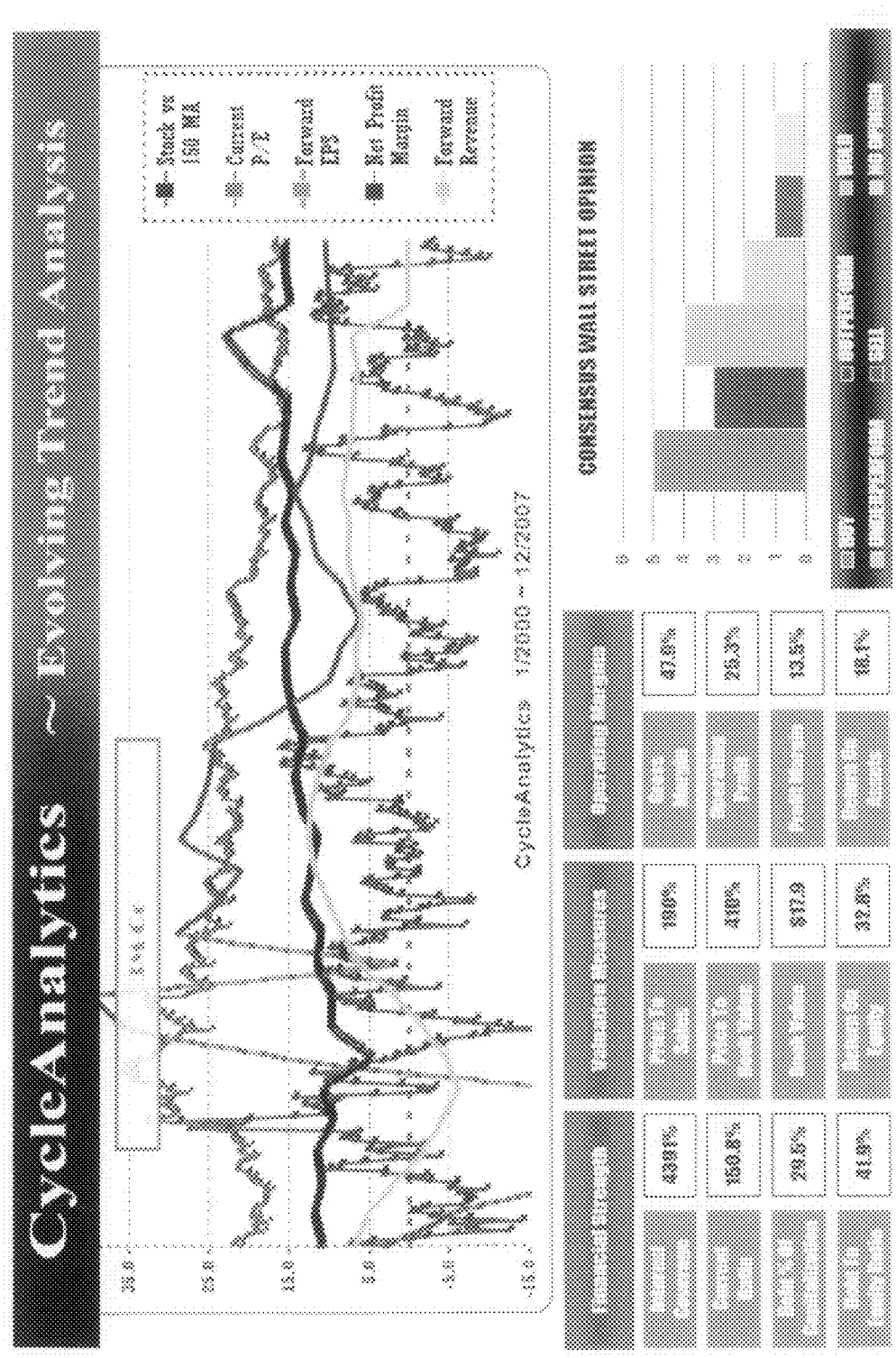

8. Market Cyclegraph presents a series of data points or a continuous line of data points "custom horizontal line graph" which plots Index Year over Year price comparisons of market movement over longer time periods. The sample shown is the S&P 500 since 1949, which is also color coded to illustrate the 3 distinct phases of the classically repeating historical full market cycle (Burst Period, Consolidation Phase & Drawdown Periods) which are characteristic of traditional market movement. Market CycleGraph can be used to illustrate other variable time periods (since inception, or custom time period) or superimposed combinations of indexes or common stocks over variable time periods.) FIG. 19 is a typical graphical presentation of 1947-2007 S&P 500 market cycle.

9. The Stockalizer Report presents a company specific proprietary multiple page composite report containing pre-formatted elements of text, data tables and proprietary graphs in pre-selected combinations. FIGS. 20-23 are typical graphical presentations of a four page company specific automated composite summary report.

The Stockalizer database is arrayed and formatted in such a way as to apply proprietary algorithms to extrapolate additional data required to synchronize variably expressed time periods, such that data can be juxtaposed, manipulated, and viewed within a single scale graph for evaluation and illustration purposes.

Database data is available to be juxtaposed and graphed via discreet progressions of dot points, or by continuous line representation via custom algorithms for creating synchronized streams of data—a first of its kind innovation which is required as an add-in to allow the Stockalizer graphics engine to operate as a front end to computer generated graphics applications, or distribute content via development of a custom graphics package.

Graphics employed depend on the use of advancement of the art proprietary maximum density distribution automatic scaling algorithms, high contrast color combinations, and distinctive graphic symbol shapes and lines to depict a much larger universe of data within a single graph.

The proprietary illustration formats employed to visualize the database array of financial information represent a new and substantial advancement of the art of displaying financial data and the interrelated progression of ongoing change of published corporate financial results.

The custom database array and proprietary new illustration formats solve previously perceived obstacles to allow the viewer for the first time to juxtapose (overlay and superimpose) stock movement, corporate operating fundamentals and performance statistics within the same single unified scale graph.

The Stockalizer specific combinations of unique database array, custom variable control choices of scaling and phasing of data, and the characteristic qualities of proprietary illustration graphic format design employed, are linked and preformatted to create a new genre of high level pattern recognition stock market graphs.

It is specifically the invention of an entirely new genre of data expression—the Stockalizer pattern recognition stock graph series, which enables the viewer for the first time to directly superimpose, correlate and observe the interrelated progression of stock movement, performance characteristics and ongoing change of corporate operating results.

Figure 10:
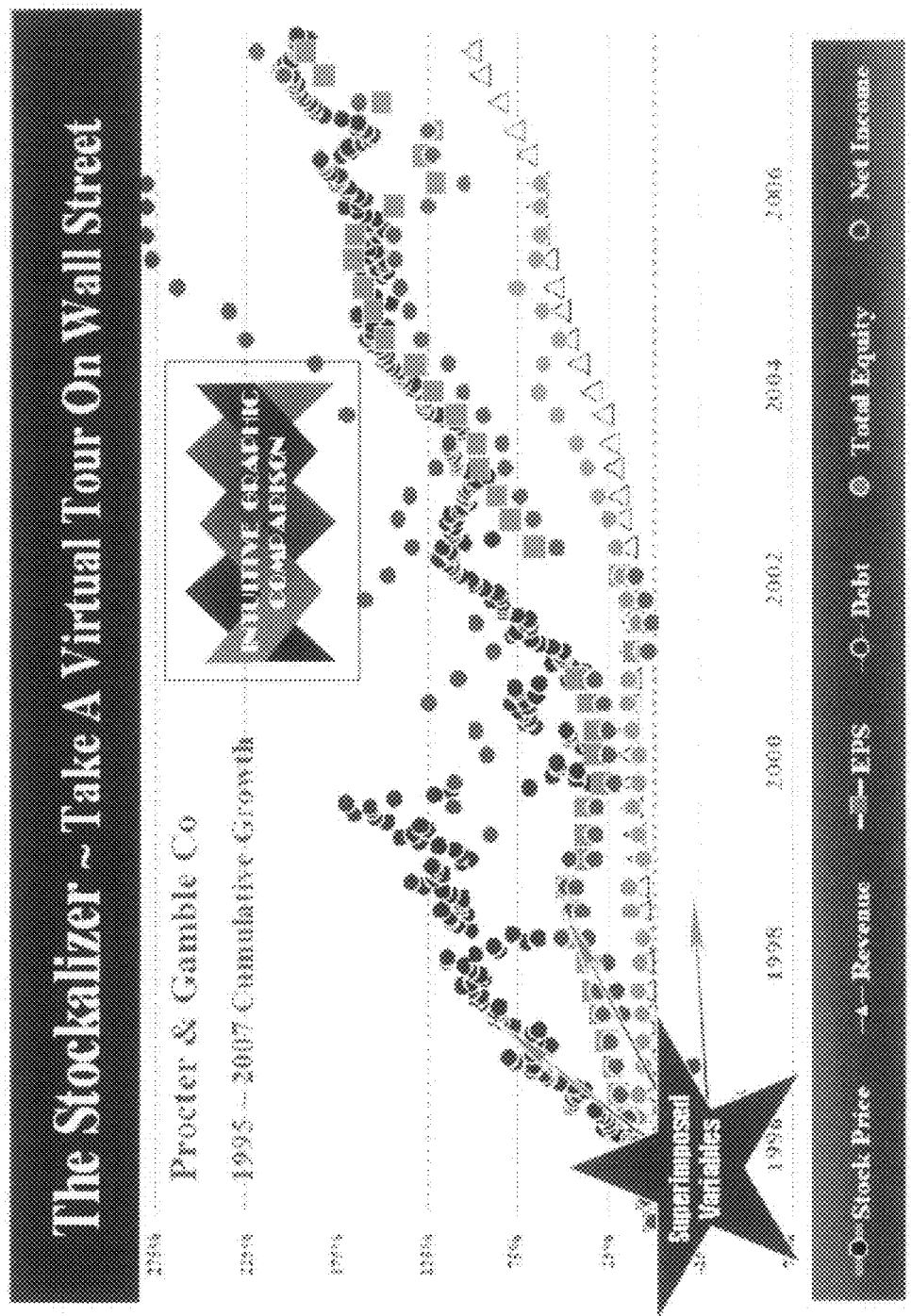
FIG. 10 is a typical graph for the superimposed variables and intuitive graphic formats illustration, which shows the dramatic effect of superimposing key operating variables juxtaposed with stock price movement within the same graph for a highly intuitive view of inter-relationships between operating fundamentals and eventual stock price movement.
Figure 11:
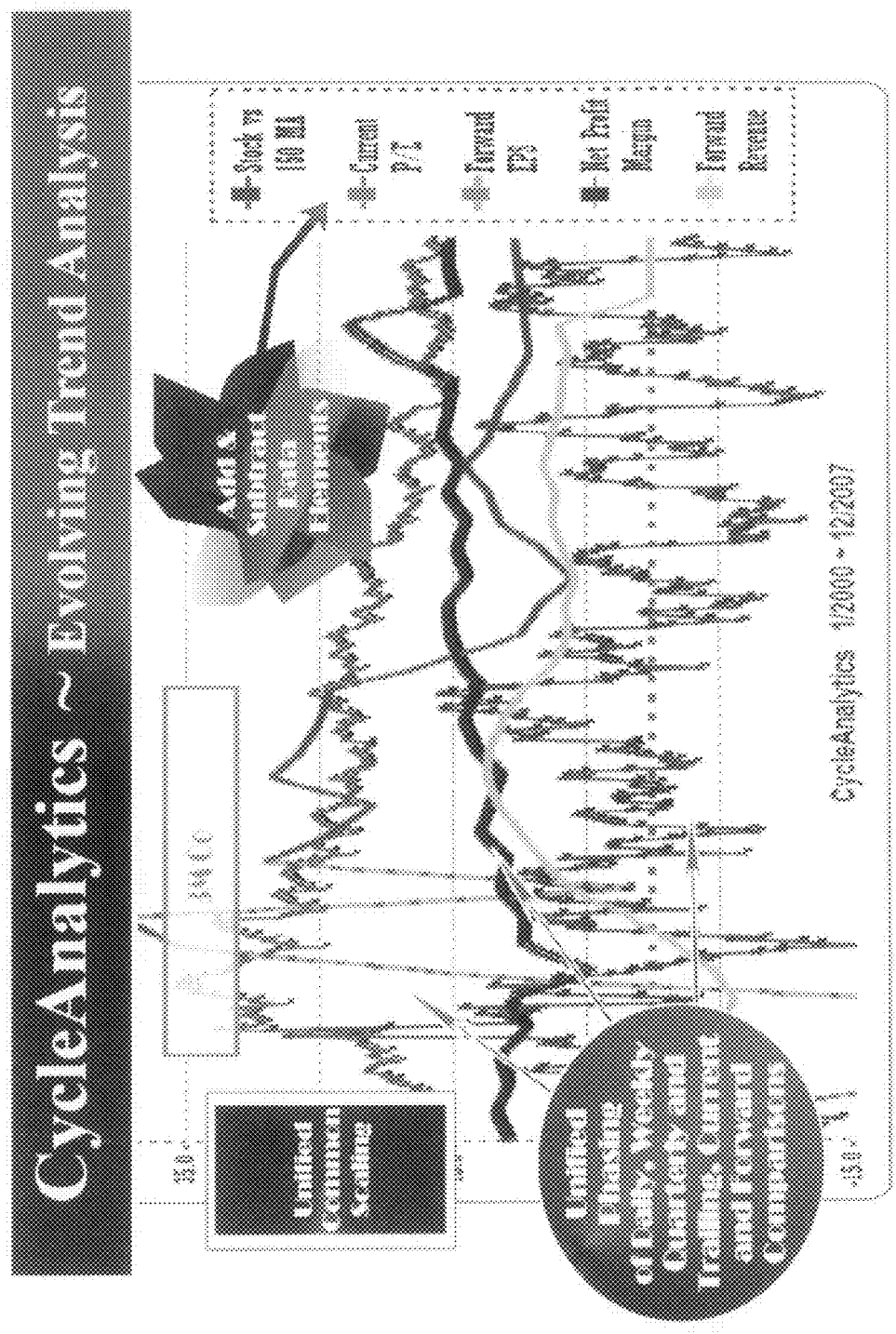
FIG. 11 is a typical graph for the "unified phasing and scaling plus the ability to add and subtract data elements" illustration.

This has not been successfully done before in documented single stock evaluation stock market financial market graphs. Because of perceived, stated and presumed difficulties in population density automatic scaling issues, synchronizing and unifying data to a common scale and time period, combined with perceived limitations of usefulness and presumed deficiencies in the potential of current state of the art graphic design formats applicable to illustrating stock graphs, current and previous state of the art financial stock market graphs are limited to superimposing text boxes over a graph and arranging or stacking several separate graphs on a single page to assist the viewer with being able to view and consider one or more fundamental variables at a time when comparing fundamentals with stock price movement characteristics over the same time period. FIGS. 10 and 11 are examples which illustrate the advantages of the new technology as compared to previous state of the art illustrations.

Further significance of this invention of new genre Stockalizer pattern recognition stock graphs is that pattern recognition is an intuitive tool—a learnable skill which is immediately realized, easily assimilated and logarithmically enlarged over short time periods.

The Scope and Implications of the Stockalizer™ Invention:
The public is clearly interested in the essential elements of the income and balance sheet information ~ and yet, an overwhelming percentage of people are disoriented, unzipped and bewildered trying to evaluate the operating trend analysis, balance sheet and income statement information which is expressed as "Database Table" formats of columns of data in table form ~ they need the information to be wrapped in a fast recognition and easily consumable package.

Investors understand that the stock market is in a continuously fluid state of dynamic change. What they want is to be able to identify and observe inherent cause and effect relationships in the marketplace, and visualize the underlying reasons and basis of change. Investors want to lift the veil of mysticism and understand the physics of the interrelationship between measureable operating fundamentals, fair market valuation, performance metrics and stock market movement.

To make sense of market movement, they need the ability to clearly visualize and correlate stock price movement with historical and emerging underlying fundamental business operating trends and performance measurements using an entirely new visualization approach and method of expression, as they pursue hoped for discounts to perceived fair market value for newly acquired assets, and to intelligently make buy, hold and sell decisions regarding the companies, indexes, and mutual funds they have an interest in.

To help answer these needs we have developed new tools, and in the process have in fact, invented a new higher level language of visual expression to satisfy the demand.

Stockalizer™ Stock Analytics Metrics: A Higher Level Language of Visual Expression Simply put, we have developed an entirely new concept language of visual expression designed to communicate unheard of levels of comprehension high level financial data employing new genre defining ultra-fast pattern recognition graphic formats and in order to do so, we also needed to developed a powerful new database array concept, loaded with specialized database algorithms and a custom multiply layered phased structural design in support of and to achieve the specific requirements of our new genre defining functions and solutions.

Development Concept and Challenges:

The original creative concept which led to the successful development of the advancement of the art methodology we have pioneered was predicated on the opportunity to design an entirely new custom database array platform series of functions and structure, and also depended on the successful creation of an innovative new series of application specific new genre illustration formats.

For the purpose of invention, the Stockalizer™ system has been developed featuring a new database structure and design, using new algorithms to derive custom data and a phased array of financial database information, to calculate and solve financial data phasing and scaling issues, and to present a series of new genre defining pattern recognition graphic illustration formats which are specifically designed to create a new level of intuitive securities analysis.

Platform One Summary: The Development of the Stockalizer™ Series

Phase one, the "Stockalizer Series" ™ serves to establish the style and strategy of database and application development required to create the construct of spontaneous Pattern Recognition of financial database information and functions; and in the process to create a new vision of an integrated platform ~ a fast recognition form of expression that comes alive visually to unify fundamental, analytic and technical disciplines into a powerful new intuitive method of evaluation.

The basis of the developed intelligence required for the new vision of an integrated Stockalizer™ and Stockatron™ platform is a computerized system for calculating and multiply arraying a population universe of privately held and publicly traded database information which is composed of:
- current and historical stock price data; and
- current and historical stock performance analytics data, ratios and measures; and
- current and historical stock technical analysis data, ratios and measures; and
- current, historical and estimated future underlying operating corporate balance sheet and income statement fundamental data, ratios and measures; and
- current, historical and estimated future micro economic data, ratios and measures, and
- derived corporate fundamental, operating, technical, stock performance, and stock analysis data, ratios and measures;

Examples: Typical examples of information stored, developed and employed by the Stockalizer™ and Stockatron™ System, are the following types of standardized and custom derived data, measures and related sub-categories which are commonly expressed as Ratios, Synthetic Combinations of Any One Ratio or Combinations of Variables to Another Single Ratio or Combination of Variables, Growth Rates, Reporting Histories, Since Inception, Daily, Weekly, Monthly, Quarterly, Calendar Year Measurements, Annualized Rolling Averages, Moving Average, Compound, Totals, Year Over Year and variously stated time periods, Cost of, Pre Tax, After Tax, Accrued, Estimated, Adjusted, Current, Long Term, Short Term, Historical, Gross, Net, Pre Tax, After Tax, Per Share, Quarterly, Year Over Year and variously stated time periods, Record Dates, Including and Excluding Extraordinary Items, and other measures:

Cash and Equivalents; Assets; Loans; Depreciation; Inventory; Receivables; Book Value; Liabilities; Debt; Shareholder Equity; Total Debt to Capital; Free Cash Flow, Depreciation; Depreciation Expense; Dividends; Fiscal Quarterly Reporting Dates; Date for Preliminary Updates: Asset Turnover, Inventory Turnover, Net Income/Employee, Receivables Turnover, Revenue/Employee, Current Ratio, Debt Service to EPS, Interest coverage, LT Debt/Assets, LT Debt/Total Capital, Payout ratio; Quick ratio, Reinvestment Rate; Total debt/total assets; Total Debt/Total Capital; Total Debt/Total Equity; Working Capital, Enterprise Value (EV); Earnings Before Interest Taxes and Depreciation (EBITDA)/EV, EBITDA to EV Ratio, EV/EBITDA; EV/Revenue, Working Capital per share/Price; Dividends; EPS; Net Income; Revenue; Cash Flow, Capital Spending; Profit Margin, Operating Margin, Cash from Operating Activities; Cost of Goods Sold; Earnings Before Interest and Taxes (EBIT), and adding Depreciation (EBITD); Earnings before taxes, Earnings after taxes, Net Income available to common; Total Income; Net Income; excluding extraordinary items, business reinvestment, non-recurring and discontinued operations, Research and Development Expense, # of Stores or Retail Square Footage, Taxes paid, Tax Rate, Insider shares bought, Insider trades, Ownership percent; Institutional shares purchased, sold, number of shares owned, percent held; number of shareholders, Return on Assets, Return on Equity, Return on investment, Free Cash Flow, Capital Spending, Beta, Alpha, Price, Volume, Relative Strength, Price to Sales; Price to Book; Price to Cash Flow; Price to Equity; Price to Growth Rate, Historical P/E, Historical Relative PE; SG&A expenses, Float; Market capitalization; Shares outstanding; Short Interest; Property, Plant & Equipment, Fixed Assets, Goodwill, Intangibles, Investments, and other related forms and subcategories of financial statement, microeconomic, and performance measures and data.

So How Does The New Technology Work?

In order to understand and appreciate the uniqueness of the requirements of database design to construct new age design features and to make possible the new genre applications and functions, it is helpful to experience first-hand through actual use, the effectiveness and impact of the intuitive "Pattern Recognition" visualization expression strategy that lies at the heart of the Stockalizer™ experience for the user.

The precision wave form phasing and scaling imaging construct algorithms to solve vertical and horizontal scaling issues and automatically create optimal size and scale of data concentration, are custom tuned to best convey the highest level of graphic content and perspective for each company in the database.

As a result, investors can clearly visualize the relative coherence of interrelated key financial variables, evaluate the slope angles of growth rates and stock price movement to identify developing over or undervaluation mismatches in growth rates and valuation levels, and spot seemingly subtle yet classic wall street "tells" such as subtle accounting divergences which are often early warning signals of developing operating weakness, or the developing evidence of early cycle improvements in capitalization and profits margins for an emerging growth company, etc...

The Stockalizer™ Series isn't just a series of financial graphs ~ it's actually a carefully constructed wave form phasing and scaling imaging construct ~ the precision design of which originates a new genre defining higher level language of strategic dimension in visual expression of complex financial data.

Distinguishing Advancement of the Art Features and Functions of the Stockalizer Series™ system:

Now for the first time, investors can superimpose and visualize the correlated relationship between stock price movement, underlying fundamental operating variables, ratios and performance measures within the same single scale graph. This has never been done before, and the resulting new higher level of visual expression which is now available to investors adds a surprising new level of valuable information and perspective that investors would like to be able to make use of in the fundamental evaluation process; the visual expression of which is revealed by virtue of a series of unique system design constructs; and which are characterized by primary distinguishing advancement of the art features and functions:

A. By employing the Stockalizer Series™ system, investors can intuitively visualize a far more comprehensive operating / performance momentum based representation of the inherent interrelationships contained within a comprehensive fundamental data package of such variables as the PE Multiple, EPS, Revenue, Net Income, Debt, Cash Flow, Profit Margins, Total Equity, and large number of other forms of Capitalization, Operating Ratios and Performance Measures, and be able to superimpose and easily compare the progression of these factors with the corresponding stock price movement, over the same time period and within the same single scale Stockalizer Series™ graph B. Employing the Stockalizer Series™ system, investors can also intuitively visualize a far more comprehensive qualitatively based cause and effect expression of utilization and marginal theories of value as characterized within custom visualizations illustrating measures of capitalization, quality of earnings, revenue and related growth rates which are revealed by virtue of custom algorithms for calculation, phasing, unified scaling, and the ability to superimpose various combinations of micro economic components contained within the comprehensive fundamental data package, which includes variables and their related subcategories such as: EPS, Revenue, Net Income, Cash Flow, ERBITDA, Debt, Taxes, Liquid and Fixed Assets, Labor, Administrative Overhead, Cost of Sales, Inventory I Turnover, Accrued Expenses, Operating Margins, Capacity Utilization and other measures and categorized data.

Again, investors are now able to superimpose and easily compare the progression of combinations of these factors with or without the corresponding stock price movement, over the same time period and within the same single scale Stockalizer Series™ graph.

C. For the purpose of new invention, the Stockalizer Series™ system has been developed featuring a new database structure and design, using new algorithms to derive custom data and a phased array of financial database information, to calculate and solve financial data phasing and scaling issues, and to present a series of new genre defining pattern recognition graphic illustration formats which are specifically designed to create a new higher level of intuitive securities analysis.

The precision wave form phasing, spacing, scaling, data concentration and graphic perspective provides the basis for a positive pattern recognition imaging construct that enables investors to easily recognize developing overvaluation and undervaluation divergence patterns between stock price movement and key operating variables, and provides constructive advance notice of seemingly subtle yet classic wall street "tells" such as seemingly unrelated accounting divergences which are often early cycle signals of rapidly improving or deteriorating business conditions.

FIG. 45 is an example which illustrates the higher level visualization language available as a result of the precision positive pattern recognition imaging construct produced by the Stockalizer Series™ System.

Creation Steps of The Stockalizer™ Series Application Development:

The method of unique database and visual expression is achieved through the series of creation steps of a typical embodiment of phase one of the Stockalizer™ Series application development process:

A. Create a new database via manual entry or data mining for individual companies from independently developed GAAP information and filings with the SEC; and / or is hot linked to an existing database of financial information via outside data providers for step one of creating an initial company specific historical database:
  1. Design and standardize the template to manufacture and access the desired data
  2. Refresh with manual entry of data or real time updates via systemized data mining and hot linked data updates
  3. Process includes data mining historical 10k annual and 10g quarterly reports
  4. Include projected company specific forward looking estimates
  5. Include a company description
  6. Include a consensus Wall Street opinion summary B. Further refine the company specific database to create a new phased array higher level of database function:
  1. Apply custom algorithm formulas to derive new industry standard ratios and additional measurement function data
  2. Apply newly improved financial measurement standards C. Apply custom calculation and phasing algorithms to unify daily, weekly, monthly and quarterly time period data for illustration comparison purposes D. Apply custom algorithms to unify the scaling of data to enable the data to be superimposed within a single scale graph E. Multiply phase the company specific database to unify the database, and enlarge the usefulness of the data to allow for real time shifts of historical, current and forward looking stock perspectives for fair market value evaluation purposes F. Design the look and feel, and details of design for the relative size and scale, coloring, shading, textures, shapes and the relative positioning of planned design elements for a series of new genre high impact graphic formats designed to convey substantially more data within the confines of a single optimized graph for fundamental analysis visualization purposes.

G. Apply custom algorithms to solve vertical and horizontal scaling issues to automatically create optimal size and scale of element spacing and data concentration, and is custom tuned to convey a high level of content and graphic perspective for each company in the database.

H. Develop digital handshake to automatically import data into the proprietary vector graphics engine application program, which is pre-programmed as described above.

I. Define and locate each element within its own layer to enable independent animation effects. Program animation effects employing SWF vector graphics to enhance pattern recognition of complex tabular data when distributed over an ultrafast, small data packet size, high resolution custom developed vector graphics powered network applications.

J. Develop a graphic creation engine module to interpolate loaded template data and construct preformatted custom format charts and graphs per proprietary graphical standards to create pattern recognition higher level visual language of expression of images and print functions within a range of low to high level language, for print and network PC and network application outputs.

K. Create an interface module to provide user with interactive access and application controls.

L. Distribute over a local PC application, via a network computer or as an internet based application.

Platform Two Summary: The Development of the Stockatron Constellation Universe™ Series In phase two of database and application development, the Stockalizer™ individual company database array files are used as building blocks and combined into a second level database array to form the basis for a new and higher level expression of database management functioning—The "Stockatron Constellation Universe™ company profile and securities comparison platform series.

The user enters the symbol for a company that they wish to generate a company profile summary for; or enters a list of symbols of companies, indexes, exchange traded funds and mutual funds stored within the "all companies held within the database" Stockalizer™ Series database into the Stockatron Constellation Universe™ Series Comparison Analysis template, and the database array is accessed to form a new file which is a composite array of all of the Stockalizer™ information required to illustrate the individual stock profile series information; or the selected universe of information required to illustrate the Stockatron Constellation Universe graphic variable comparison series.

The Stockatron Constellation Universe Series™ of Stocks Visualizations

In phase two of database and application development, the Stockalizer™ individual company database array files are used as building blocks and combined into a second level database array to form the basis for a new and higher level expression of database management functioning—The "Stockatron Constellation Universe™ company profile and securities variable comparison platform series. The usefulness of the graphics engine tool set extends to a series of statistical analysis and portfolio decision making illustration tools which are updated each time any of the individual company files contained in the Stockalizer Series™ or Stockatron Constellation-Universe master database are opened either by the user, or by an automated script that periodically updates the database.

The user enters the symbol for a company that they wish to generate a company profile summary for; or enters a list of symbols of companies stored within the database into the Stockatron Constellation Universe™ Series Comparison Analysis template, and the user can access the master database for viewing, sorting, visualizing and producing a quantity of custom reports which are available to be visualized within the Stockatron Company Profile™ and Constellation Universe Series™ intellectual property graphic formats.

There are five new proprietary pattern recognition advancement of the art formats and advancements included in the Stockatron Universe visualization charts array package of new information:
  1. "Stockatron Universe Summary" ~ The Stockatron Universe sorting and data analysis spreadsheet summary report
  2. "Stockatron Analytics—Company Snapshot" illustrating an in-depth company specific snapshot summary page of a large number of investment and performance measures 3. "Stockatron Analytics—Company Profile" illustrating a company specific scatter gram illustration comparison of combinations of key variable measures
4. "Stockatron Constellation Universe Charts" illustrating pre-selected combinations of key variable comparisons contained in the Stockatron database for individual stock, indexes and mutual funds
5. The use of the stock symbol, variable criteria acronym or name as the data point indicator, which makes it easier to identify and measure the performance of a specific stock or variable in question within a two axis scale financial comparison graph.

Figure 24:
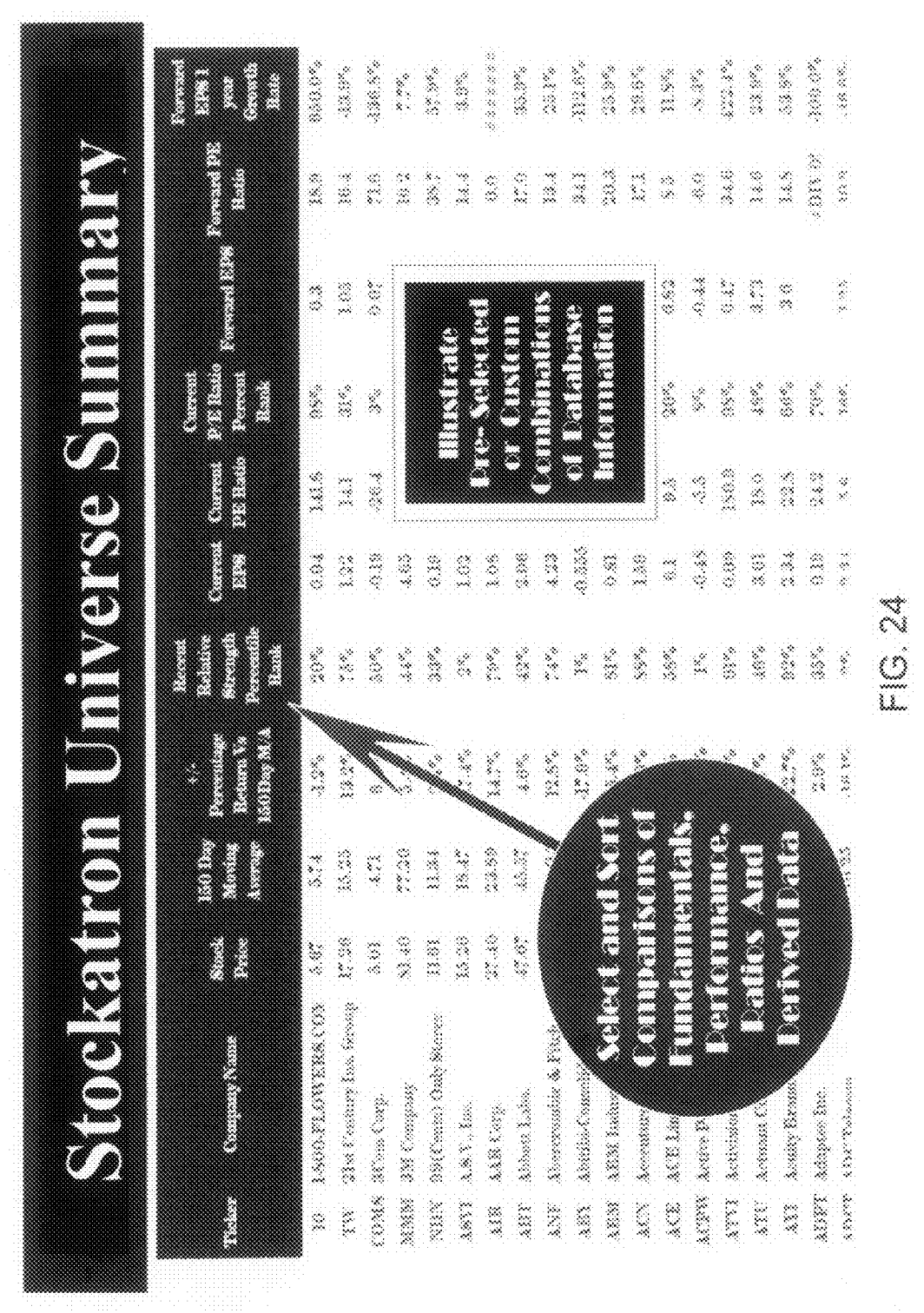
Figure 25:
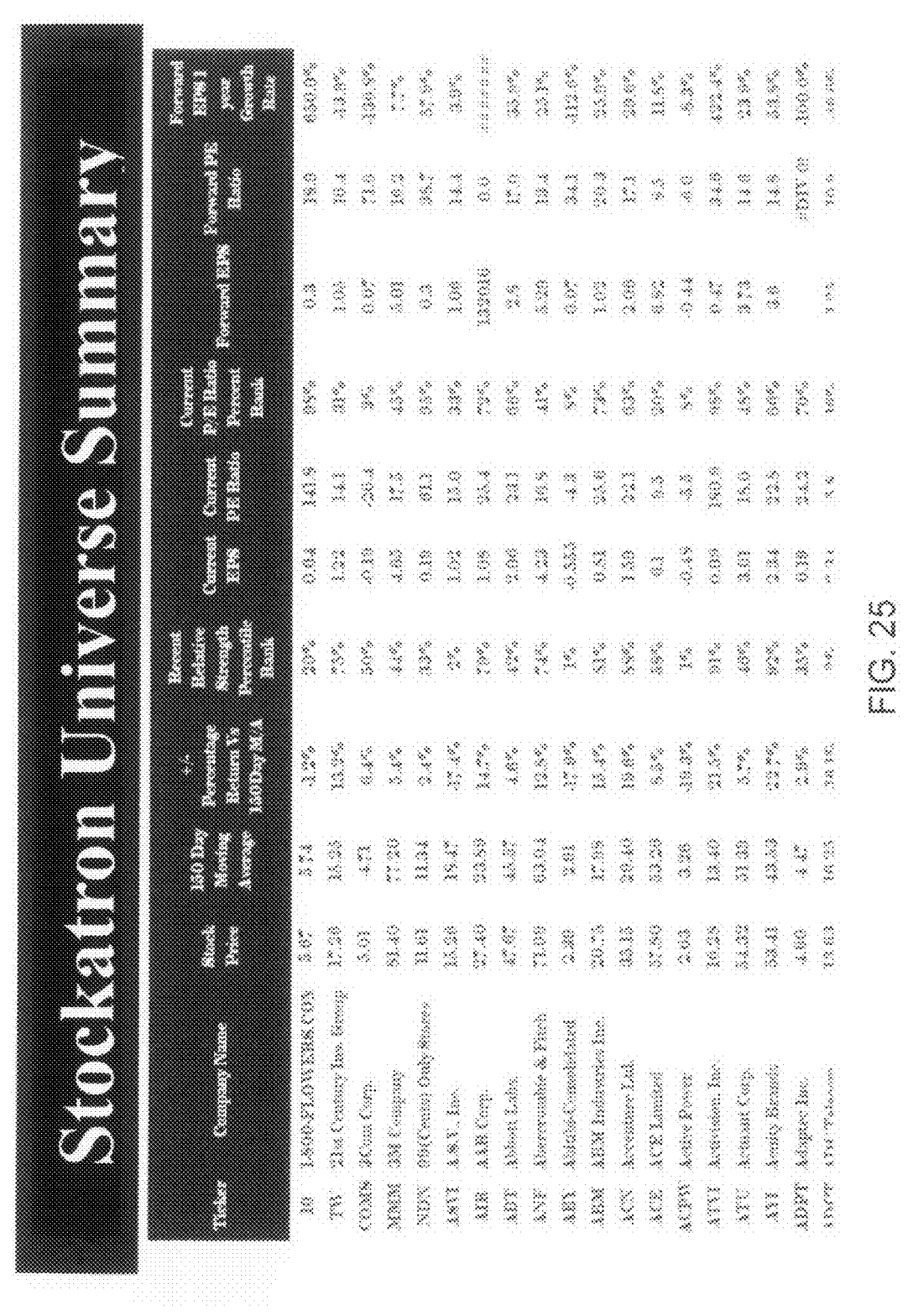

1. The user can simply type a portfolio of any number of symbols into the template to evaluate and a preformatted Stockatron Constellation Universe summary spreadsheet report is automatically generated via lookup features which itemize the detail of key operating fundamental variables, technical indicators, ratios, performance characteristics, and other useful information. FIG. 24 is a labeled graphical presentation of the Stockatron Constellation Universe Summary spreadsheet functions and FIG. 25 is a typical graphical presentation of the Stockatron Constellation Universe Summary spreadsheet report format.

2 & 3. In a substantive advancement of the art for financial marketplace graphs, for the first time the user can view or print a series of scatter gram Stockatron Constellation Universe Comparison Charts which enable the user to visualize combinations of key variables expressed in table form as well as charted on two X/Y scales at once in support of a relative value assessment for a single company, index, exchange traded fund or mutual fund.

Figure 26:
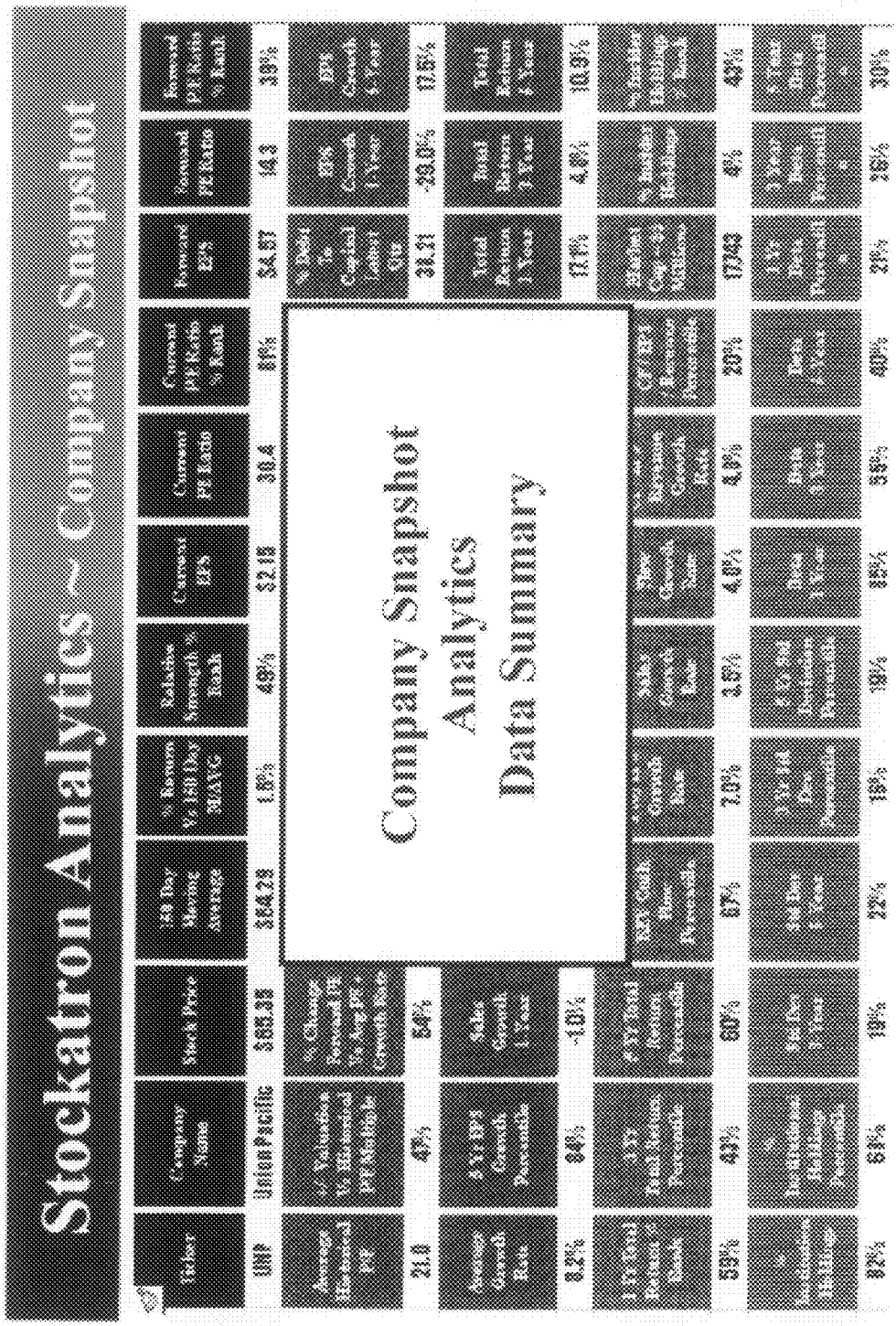
FIG. 26 is a typical graph of "Stockatron Analytics—Company Snapshot" illustrating an in-depth company specific snapshot summary page of a large number of investment and performance measures.
Figure 27:
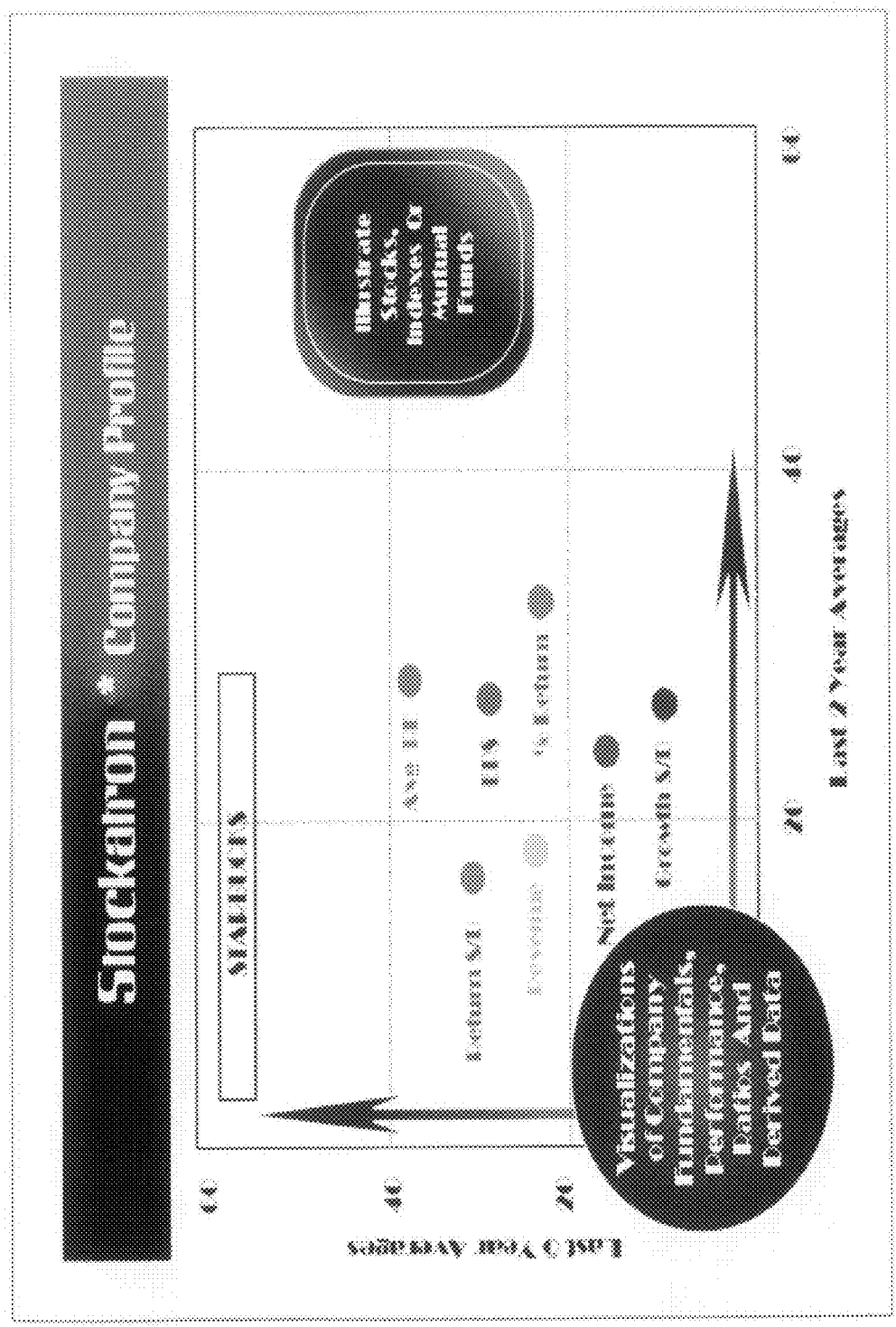
FIG. 27 is a typical graph of "Stockatron Analytics—Company Profile" illustrating a company profile with a summary with labeled key functions of the "Stockatron Analytics—Company Profile" scatter gram summary illustration report.
Figure 28:
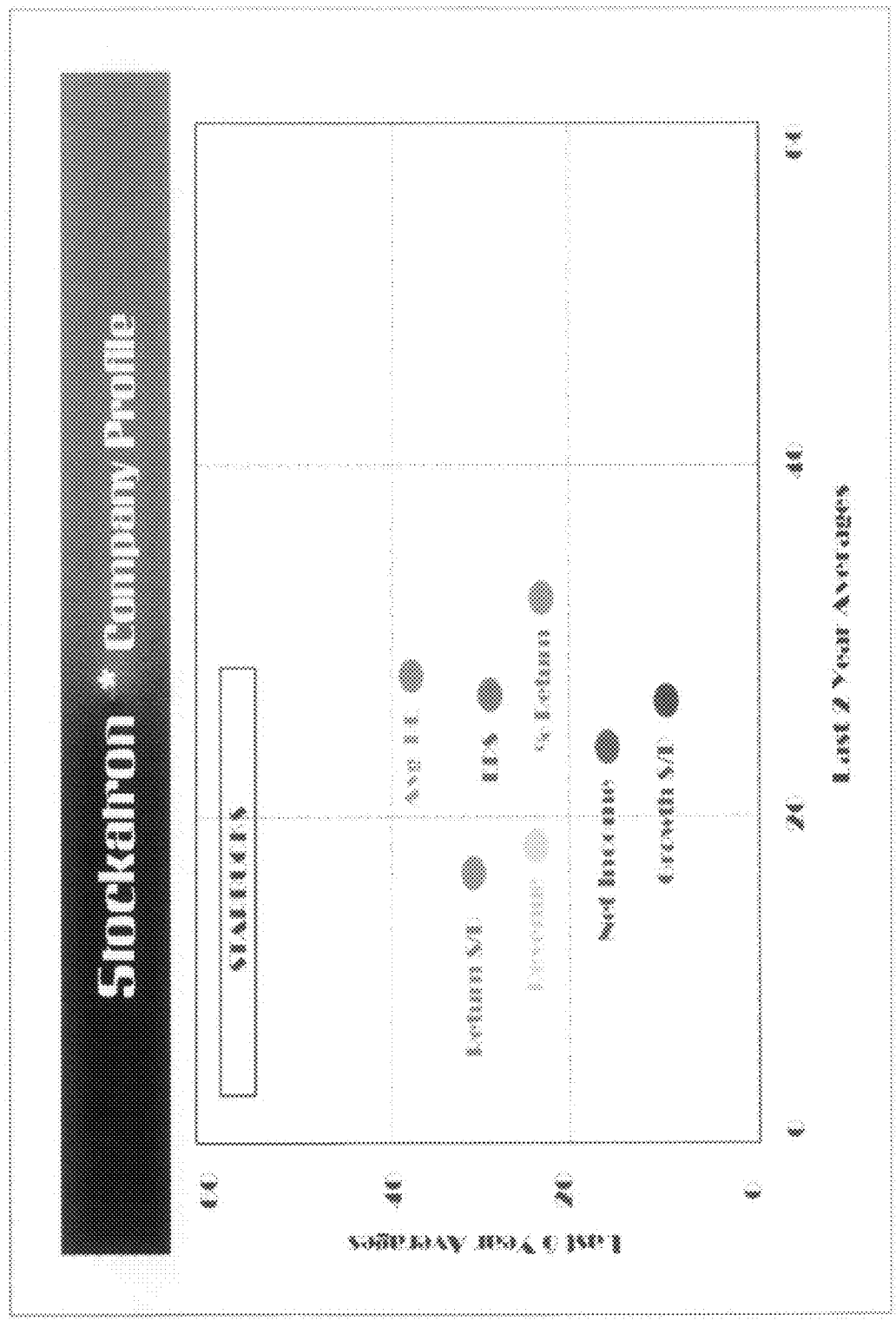
FIG. 28 is a typical graph of "Stockatron Company Profile" illustrating a company specific scatter gram illustration comparison of combinations of key variable measures.

FIG. 26 is a sample graph of Stockatron Analytics—Company Snapshot, which illustrates a typical graphical presentation of database information expressed in table form in a company, index or fund specific snapshot summary page. The user can key in a security symbol and the program will create a Stockatron Snapshot single page analysis as well as the accompanying Stockatron Profile scatter gram illustrating key variables in support of a valuation assessment for a single company. FIG. 27 is a labeled illustration of some key advancement features of the Stockatron Profile and FIG. 28 is a typical graphical presentation of the Stockatron Profile scatter gram illustrating the key variables in support of a valuation assessment for a single company, employing the Stockatron Constellation Universe graph series X/Y scale scatter gram visual format.

Figure 29:
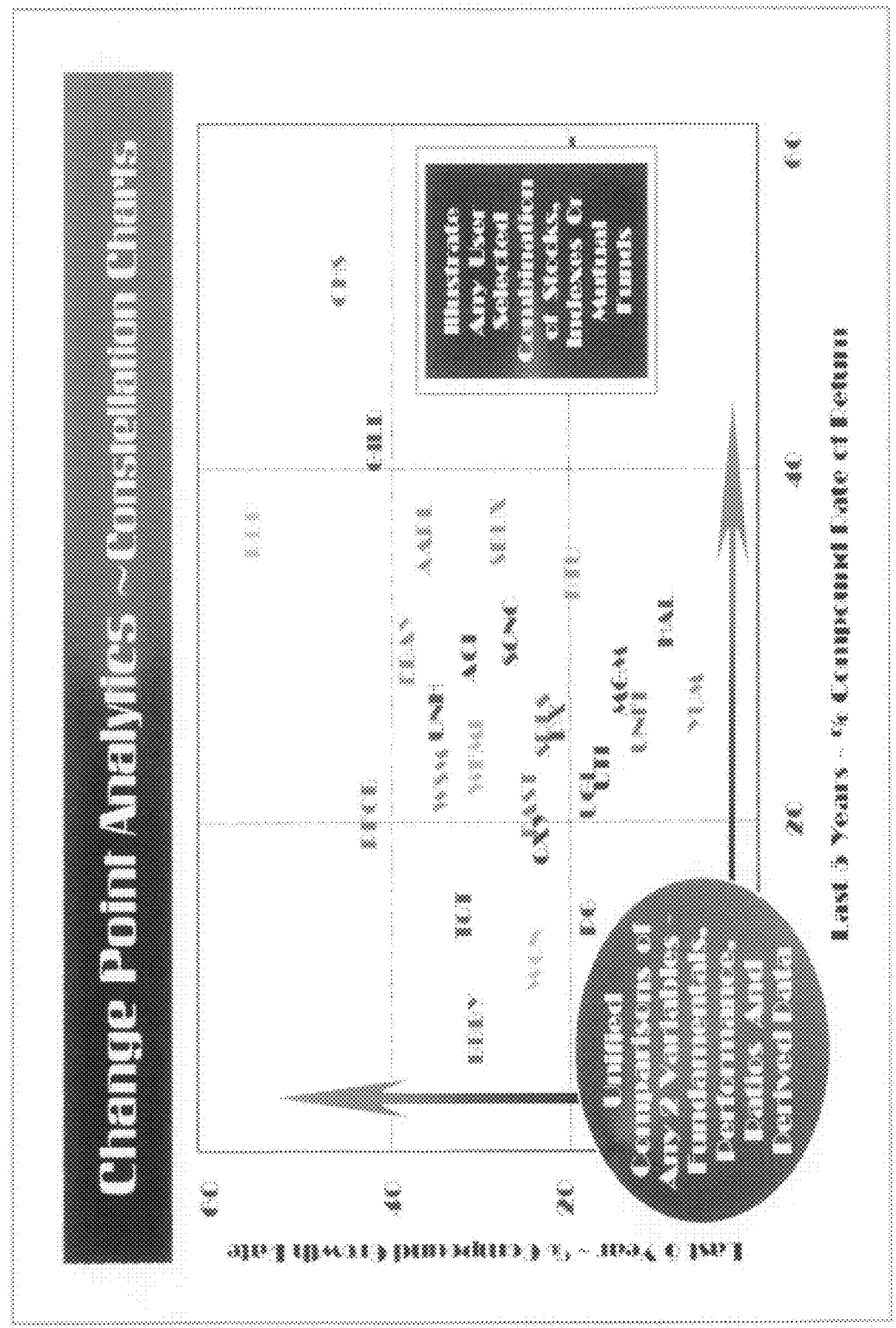
FIG. 29 is a typical graph of "Stockatron Constellation Charts" illustrating a summary of labeled key functions of the Stockatron Constellation Chart scatter gram summary illustration report series.
Figure 30:
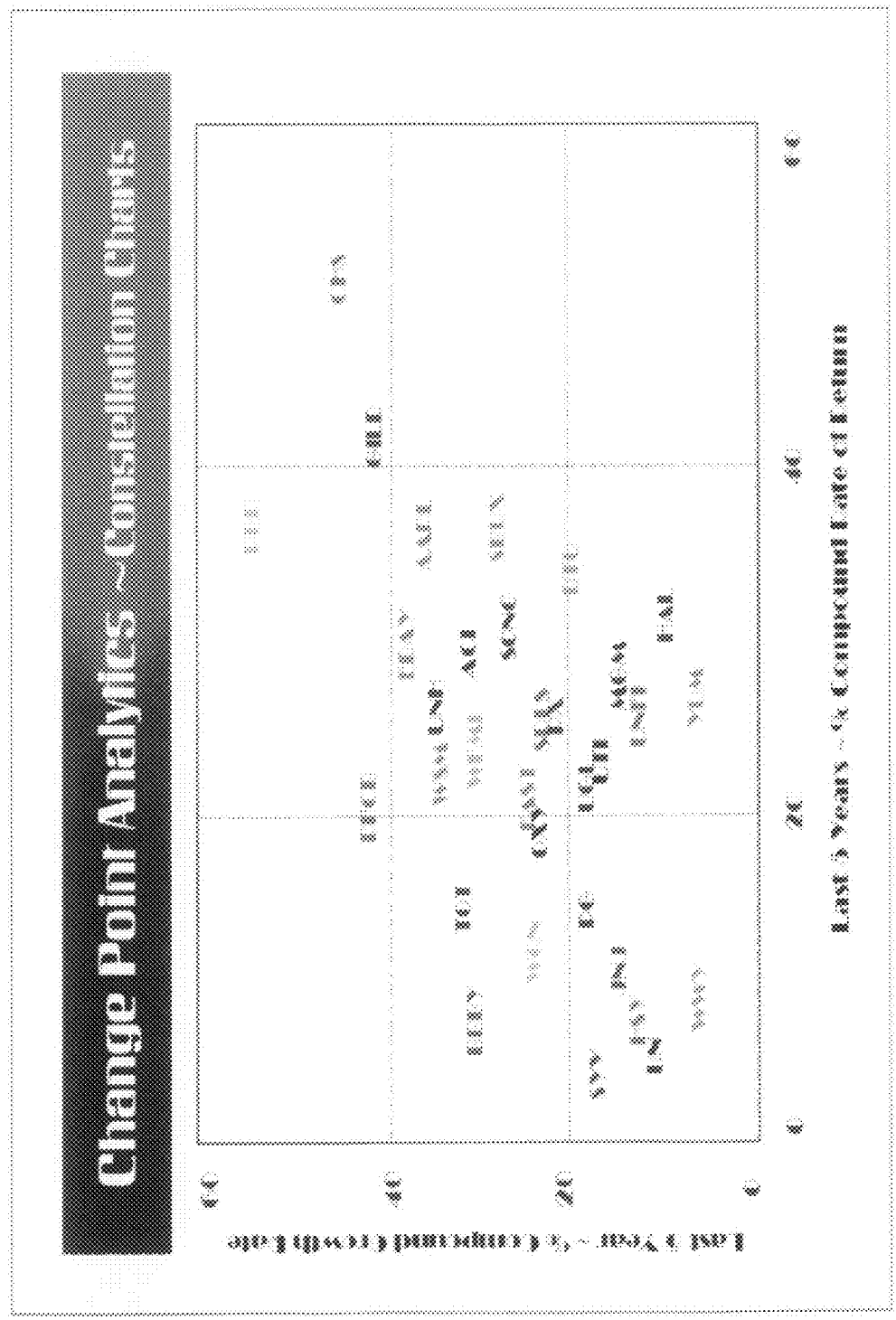
FIGS. 30-35 are multiple-page graphs of "Stockatron Constellation Charts" illustrating pre-selected combinations of key variable comparisons contained in the Stockatron database for a universe of companies.
Figure 31:
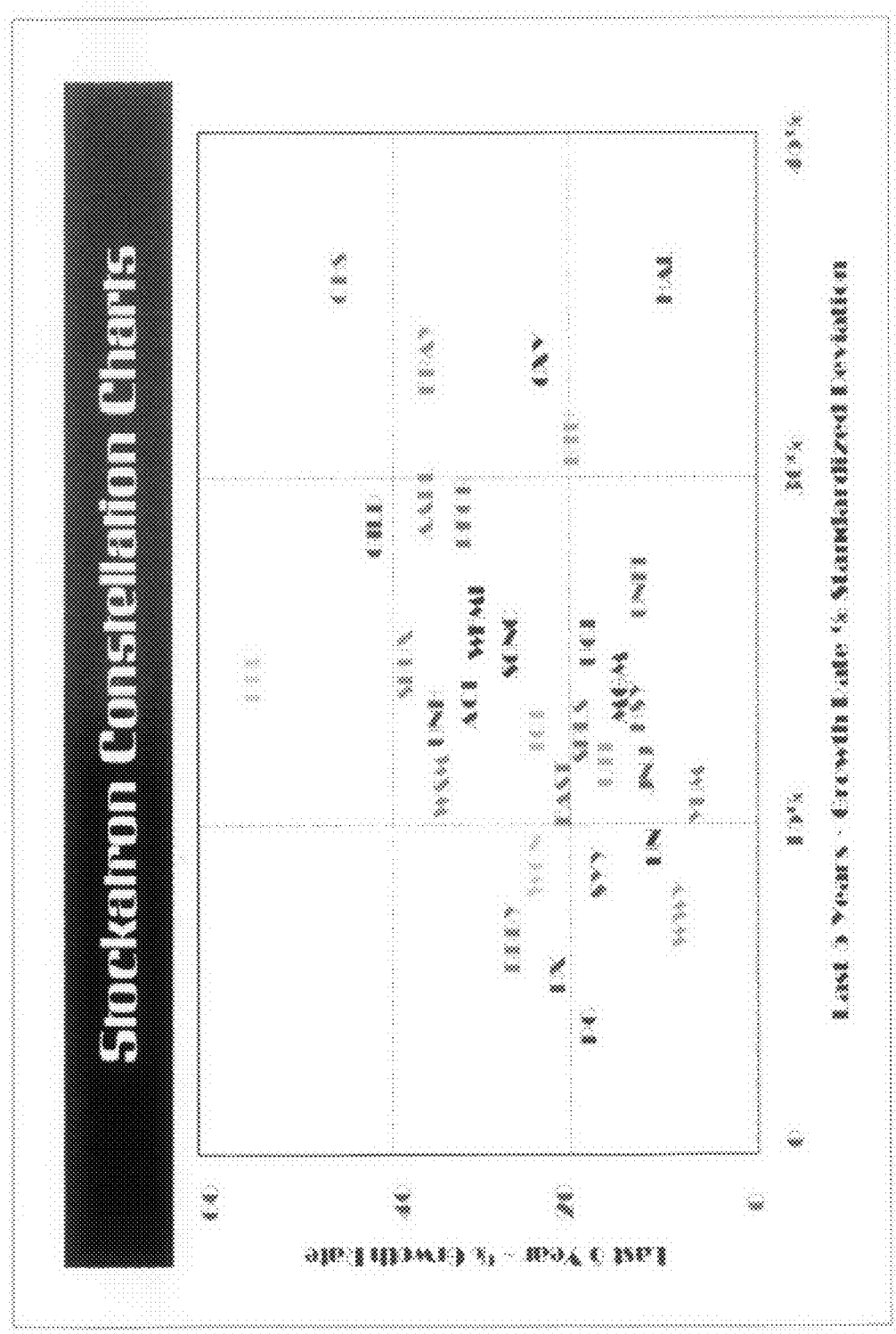
Figure 32:
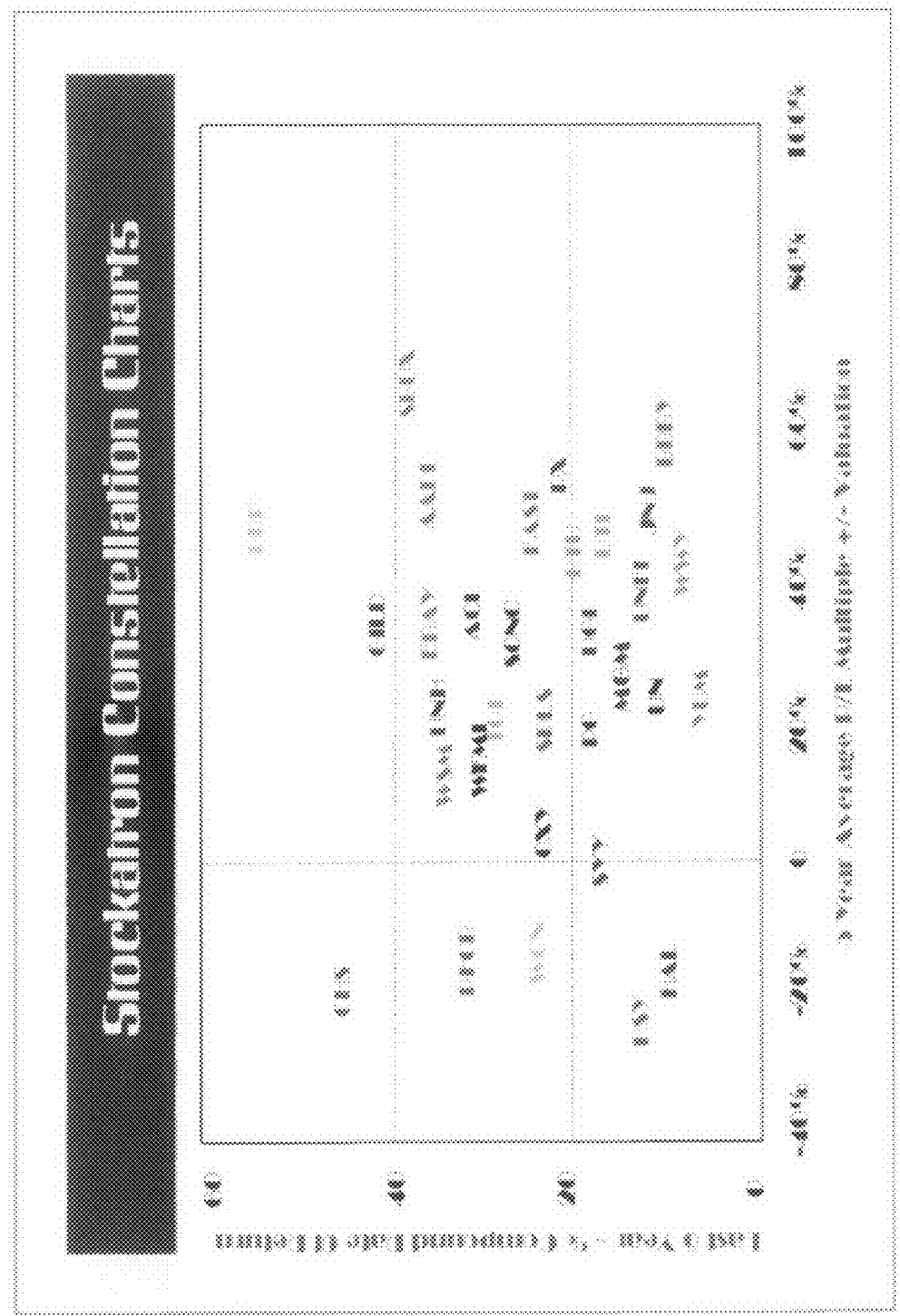
Figure 33:
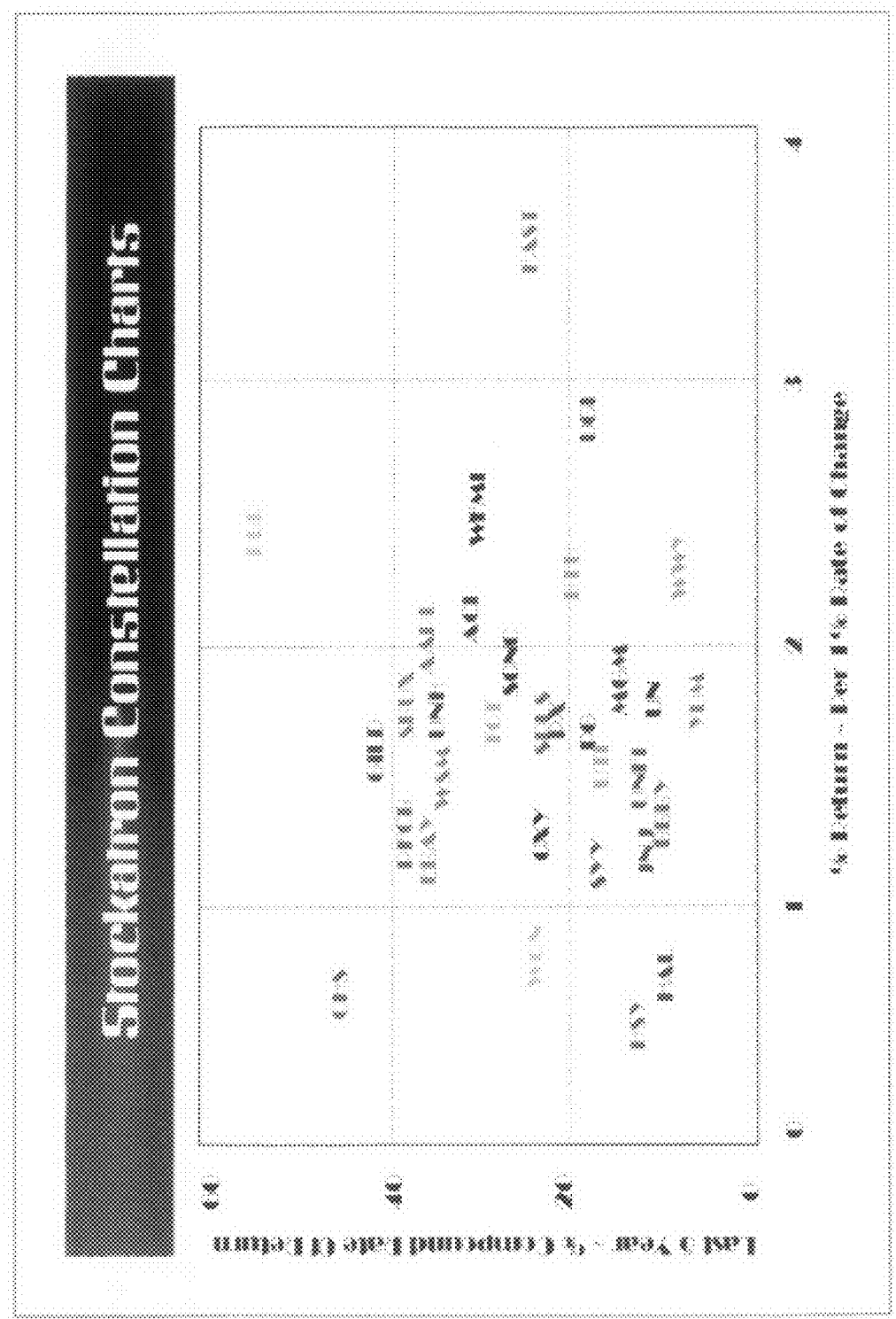
Figure 34:
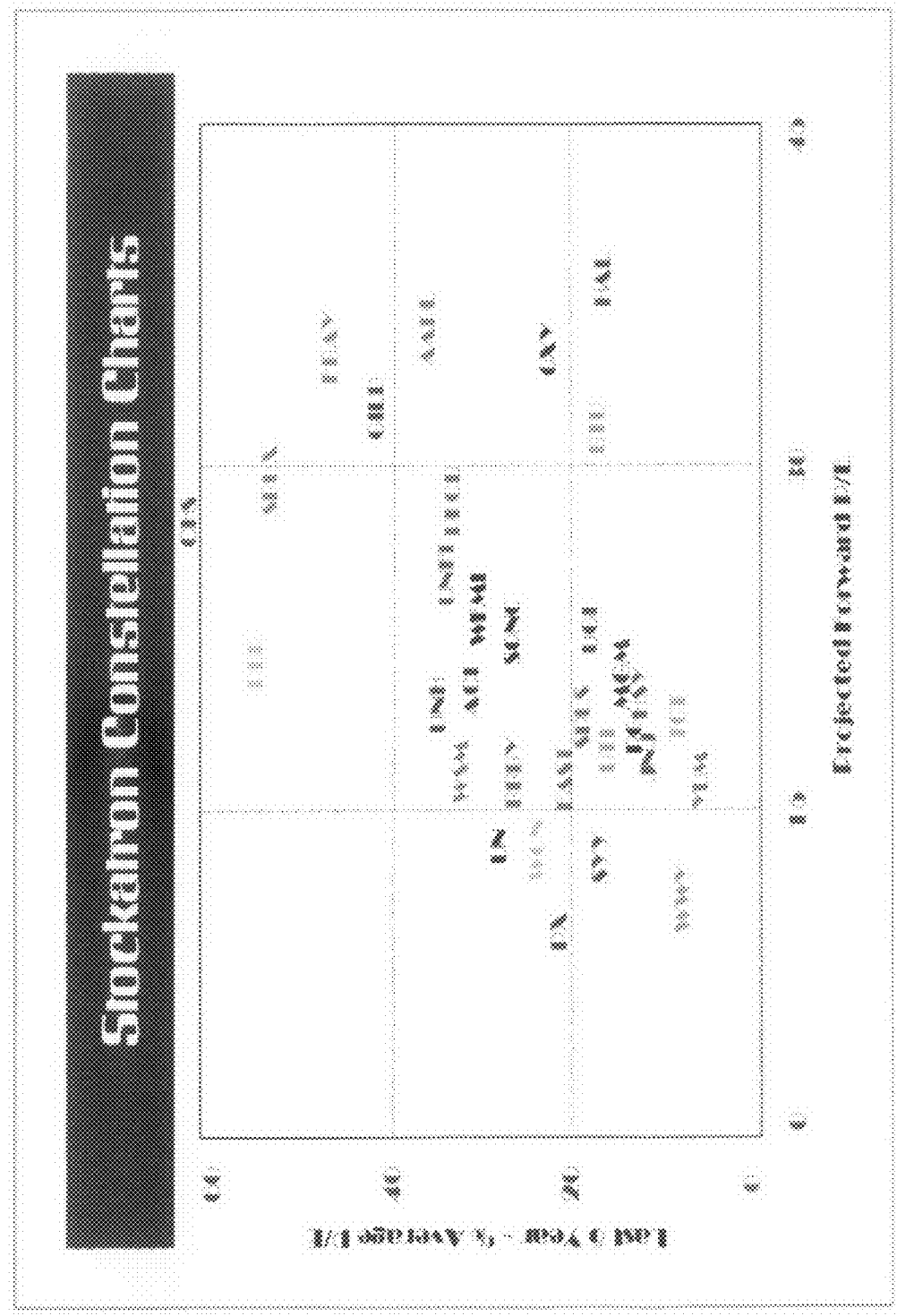
Figure 35:
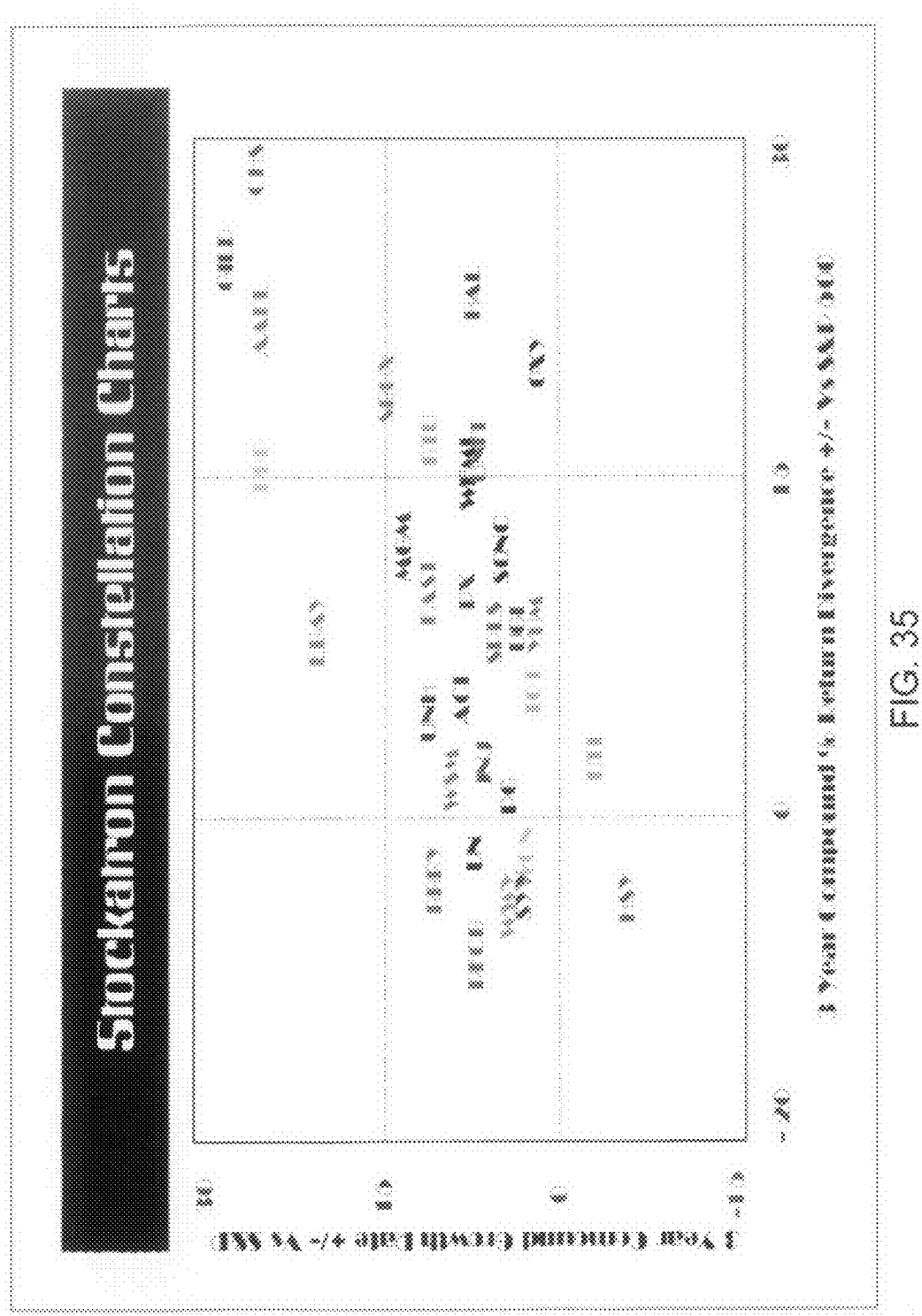

FIG. 29 is a labeled illustration of a Stockatron Constellation Universe Chart in which some key advancements of the Constellation Universe Chart X/Y scale scatter gram visual format are highlighted.

3. The user can choose to view any pre-selected or custom combination of two or more variables in the database for a universe of user selected companies, employing the Stockatron Constellation Universe Chart formats. FIGS. 30-35 illustrate typical graphical presentations of pre-selected combinations of variables in the database which are available for a universe of companies, as illustrated employing the Stockatron Constellation Universe graph series X/Y scale scatter gram visual format.

Users can also "drill down" the data comparisons by illustrating two different levels of analysis methods for indexes, exchange traded funds and mutual funds. Level one illustrates the underlying assets which collectively compose the individual index or fund as illustrated in FIG. 38, and level two enables the user to compare a universe of any combination of user selected individual companies, indexes, exchange traded funds and mutual funds employing the Stockatron Constellation Universe Chart formats as Illustrated in example visualizations FIGS. 30-35 and FIG. 46.

Figure 36:
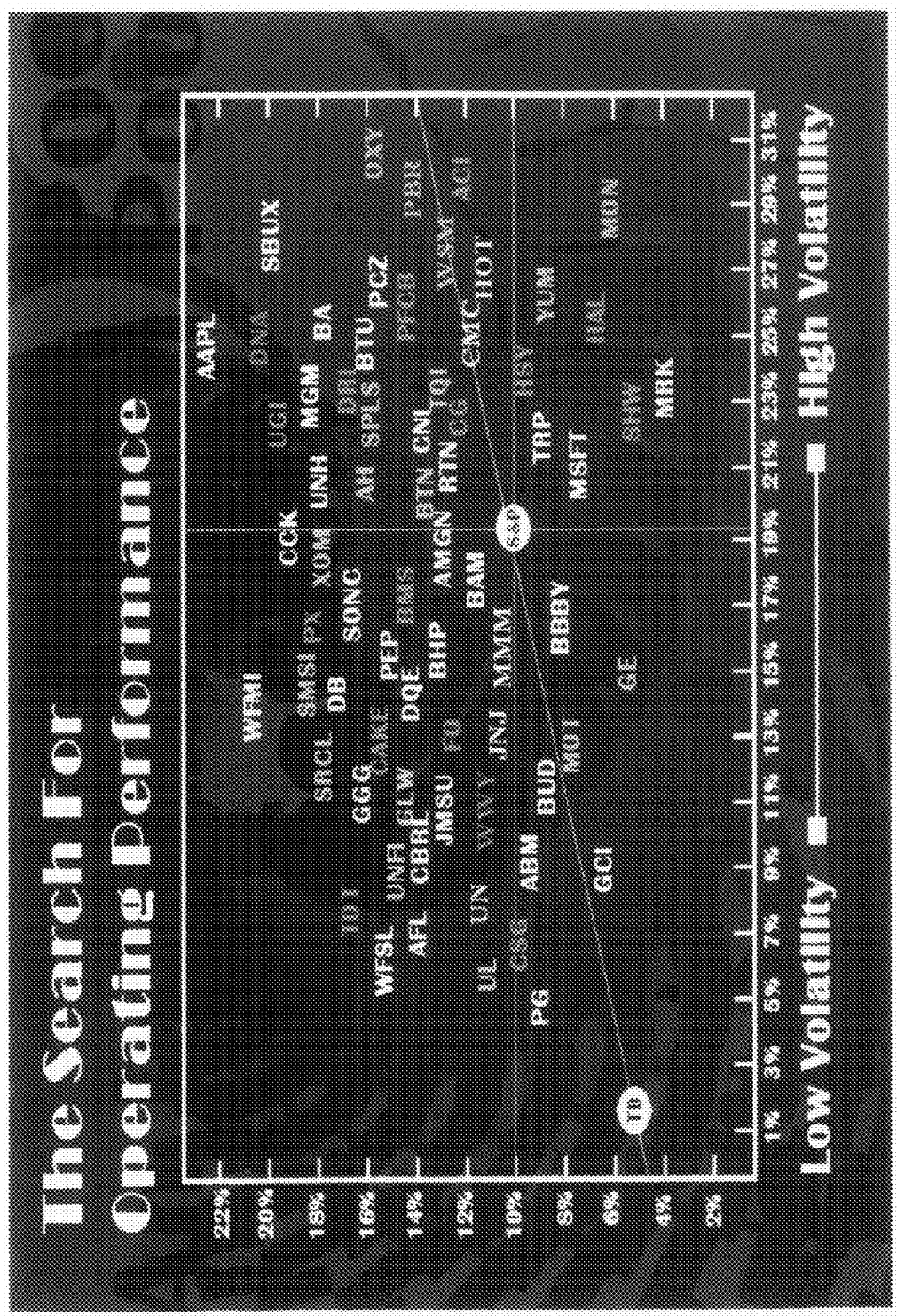
FIG. 36 is a typical graph of "Database Portfolio Management Tools" illustrating the data-point indicator using stock symbols, names or variables as dot points.
Figure 37:
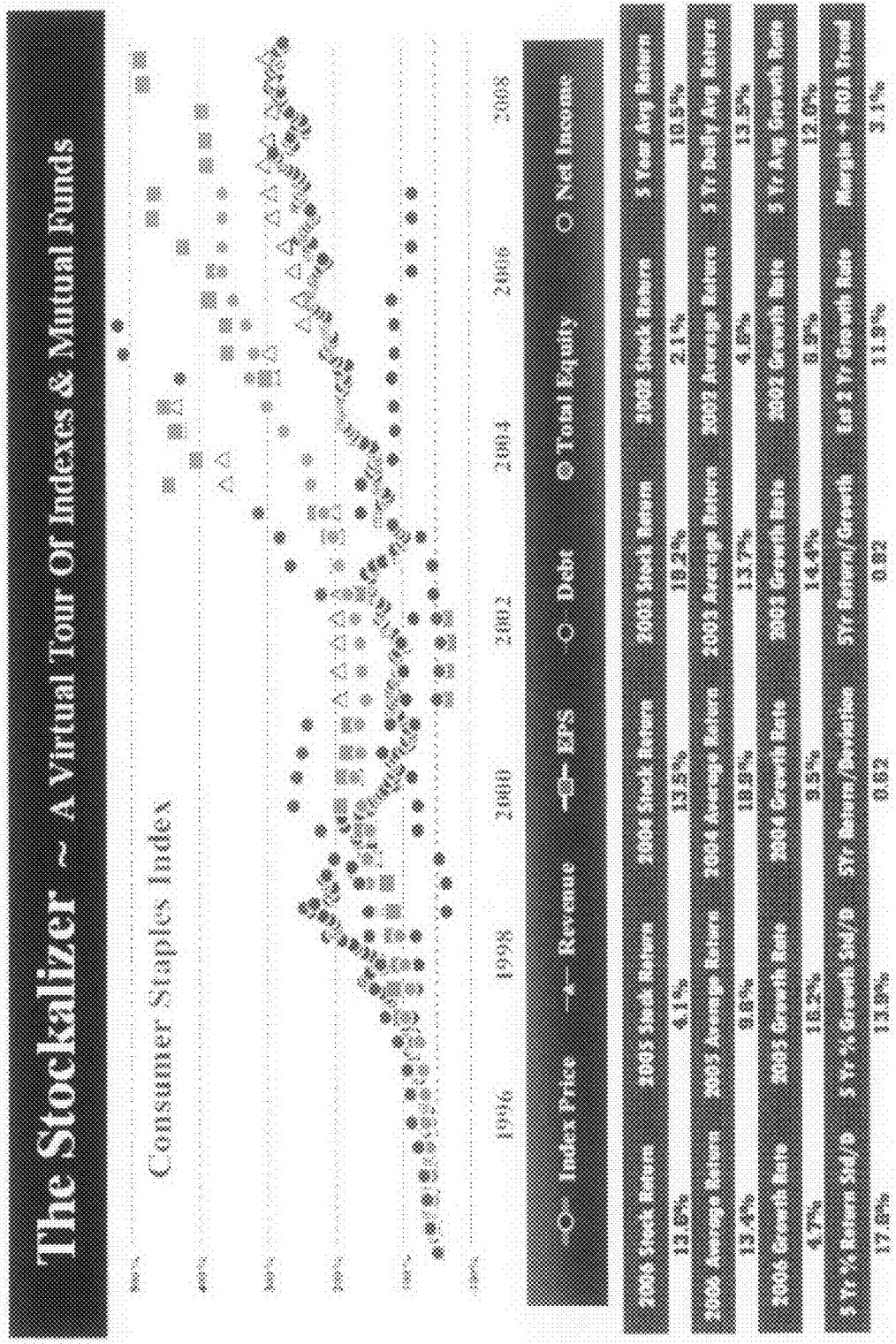
FIG. 37 is a typical graph of "The Stockatron Universe—A Virtual Tour of Indexes & Mutual Funds" illustrating one of the "Stockalizer Series" formats which are also available to illustrate index and mutual fund composite synthetic securities employing the entire array of the already described "Stockalizer Series" formats.

4. Another useful advancement of the art distinguishing characteristic feature of the Stockatron Constellation Universe Variable Comparison graphics format and the Stockatron Company Profile formats employed is the use for the first time in a financial comparison graph of the stock symbol, or name or variable criteria, as the data point indicator, which makes it easier to identify and measure the performance of a specific stock or variable in question on two axis scales (measuring two variables at once), and also makes it possible to easily identify and evaluate the relative performance of a large group universe of individual stocks in relationship to each other. FIGS. 27,29 & 36 illustrate typical graphical presentations for using stock symbols, names or variables as the data-point indicator dot points.

Referring back to FIGS. 24-35, the user can make use of the database array as they choose, sorting or selecting data in typical spreadsheet fashion (i.e. select according to variable, high to low value, by specified value range, etc.), and can view or print the newly sorted data report.

Stockatron Stock Snapshots, Profiles and Stockatron Change Point Analytics Constellation Universe Variable Comparison Charts depend on the creation of a new database array of information, the development of a new higher level of a comprehensively complete database universe of publicly traded companies, invention of new proprietary derived data measurements, refinements in the protocol of existing industry standard measurements, and the successful new invention of proprietary new illustration formats, all of which advance the art of meaningful graphic presentation within financial graphs. They have overcome previously perceived obstacles to allow the viewer for purposes of evaluation, display and printing for the first time to juxtapose (overlay and superimpose) stock movement, ratios, primary and secondary corporate operating fundamentals and performance comparison statistics within the same X-Y style scatter gram double scale graphic format design.

The Stockatron Constellation Universe specific combinations of unique database array, proprietary automatic population density analysis algorithms and variable control choices of scaling and phasing of data, and the characteristic qualities of proprietary illustration graphic format design employed, are linked and preformatted to create a new genre of high level Stockatron Stock Profile and Stockatron Constellation Universe Comparison Stock Market Graphs.

It is specifically the combination of the invention of an entirely new genre of data expression—the creation of Stockatron Stock Profile Comparison and Stockatron Constellation Universe Comparison Stock Market Graphs, when combined with more advanced database development technology, which enables the viewer for the first time to correlate and observe in a new way, the interrelated progression of market valuation characteristics, stock performance measurements, and ongoing change of corporate operating results.

This has not been successfully done before. These are new function concepts. Because of perceived, stated and presumed difficulties combining the functions and utility of creating and updating a database of all publicly held companies, automatic population density issues and perceived limitations in the process of deriving and unifying data to a common scale and time period, perceived limitations of usefulness and deficiencies in the potential of current state of the art graphic design formats applicable to illustrating X-Y scatter gram stock graphs, current and previous state of the art financial individual company profiles and stock universe comparison graphs do not exist in the market at the present time.

Further significance of the invention of a new genre of decision making and portfolio management Stockatron Universe Summary, Stockatron Analytics Company Snapshot, Stockatron Company Profile and Stockatron Constellation Universe Comparison Stock Market Graph tool set, is that the use of the Stockatron Comparison Graphing Program is an intuitive tool set—a learnable skill which offers high speed pattern recognition, easy assimilation and logarithmically enlarged observation skills over short time periods.

Platform Three Introduction: The Stockalizer Index and Synthetic Securities Platform Series Phase three of database and application development ~ the Stockalizer™ Index and Mutual Fund Series, builds off of the momentum and natural advantages of the database development which we have created to evaluate individual stocks within the Stockalizer™ Series, and user selected universes of stocks employing the Stockatron Constellation Universe™ Series visual platform.

Now, for the first time investors can view the calculated composite numerical results, and clearly visualize and correlate price movement with the underlying historical composite performance measurements and underlying fundamental business composite operating trends for indexes, mutual funds and any synthetic blend of securities.

Index, ETF and Mutual Fund investing is the fastest growing component of the investing universe, and the unmet universal demand for an intuitive high level synthetic database platform linked to a new series of creative visualization tools which successfully express the fundamental fair market value metrics of the rapidly growing universe of stock market indexes and Mutual Funds, is at an all-time high.

The problem is that investors have had no fundamental method of evaluating the fair market value of indexes of any type. For any and all indexes, ETF's and Mutual Funds, no composite earnings reports, revenue projections, current I historical income, balance sheet or cash flow representations, and therefore also no price/value metrics have existed. Something as basic as a price earnings ratio has not been available.

Investors have literally been shooting in the dark from a fair market value analysis standpoint ~ and this has been an astounding lack of absolutely crucial fundamental evaluation investment information.

So How Does Phase Three Technology Work?

In phase three of database and application development, the Stockalizer Series™ individual company database array files are used as building blocks and combined into a third level of database array to form the basis for a new and higher level expression of database management functioning—The Stockalizer™ Index, Mutual Fund and Portfolio Analysis securities platform series.

The user enters a list of symbols that make up the portfolio, or enters the symbol of an index or mutual fund into the Stockalizer Portfolio Analysis template, and the database array is accessed to form a new file which is a composite array of all of the Stockalizer™ information required to form the new synthetic security.

The basis of the developed intelligence required to enable investors to be able to create synthetically manufactured calculations of composite data values and view graphical illustrations of the composite characteristics of a portfolio. Exchange Traded Fund, Index or Mutual Fund, is derived from the universe of all companies held in the developed database; and which contains database information which is composed of:
- pro-rata % contributions of current and historical stock price data: and
- pro-rata % contributions of current and historical stock performance analytics data, ratios and measures; and
- pro-rata % contributions of current and historical stock technical analysis data, ratios and measures: and
- pro-rata % contributions of current, historical and estimated future underlying operating corporate balance sheet and income statement fundamental data, ratios and measures; and
- pro-rata % contributions of current, historical and estimated future micro economic data, ratios and measures, and
- pro-rata % contributions of derived corporate fundamental, operating, technical, stock performance, and stock analysis data, ratios and measures;

Examples: Typical examples of information stored, calculated, derived and employed by the Stockalizer™ and Stockatron™ System, are the following types of standardized and custom derived data, measures and related sub-categories which are commonly expressed as Ratios, Synthetic Combinations of Any One Ratio or Combinations of Variables to Another Single Ratio or Combination of Variables. Growth Rates, Reporting Histories, Since Inception, Daily, Weekly, Monthly, Quarterly, Calendar Year Measurements, Annualized Rolling Averages, Moving Average, Compound, Totals, Year Over Year and variously stated time periods, Cost of, Pre Tax, After Tax, Accrued, Estimated, Adjusted, Current. Long Term, Short Term, Historical, Gross, Net, Pre Tax, After Tax, Per Share, Quarterly, Year Over Year and variously stated time periods, Record Dates. Including and Excluding Extraordinary Items, and other measures:

Cash and Equivalents; Assets; Loans; Depreciation; Inventory: Receivables; Book Value; Liabilities; Debt: Shareholder Equity; Total Debt to Capital; Free Cash Flow, Depreciation; Depreciation Expense; Dividends: Fiscal Quarterly Reporting Dates: Date for Preliminary Updates; Asset Turnover, Inventory Turnover, Net Income/Employee, Receivables Turnover, Revenue/Employee, Current Ratio, Debt Service to EPS, Interest coverage, LT Debt/Assets, LT Debt/Total Capital, Payout ratio: Quick ratio, Reinvestment Rate; Total debt/total assets; Total Debt/Total Capital; Total Debt/Total Equity: Working Capital, Enterprise Value (EV) Earnings Before Interest Taxes and Depreciation (EBITDA)/EV, EBITDA to EV Ratio, EV/EBITDA; EV/Revenue, Working Capital per share/Price: Dividends: EPS: Net Income; Revenue: Cash Flow, Capital Spending: Profit Margin, Operating Margin, Cash from Operating Activities; Cost of Goods Sold: Earnings Before Interest and Taxes (EBIT), and adding Depreciation (EBITD): Earnings before taxes, Earnings after taxes, Net Income available to common; Total Income; Net Income; excluding extraordinary items, business reinvestment, non recurring and discontinued operations, Research and Development Expense, # of Stores or Retail Square Footage, Taxes paid, Tax Rate, Insider shares bought, Insider trades, Ownership percent: Institutional shares purchased, sold, number of shares owned, percent held: number of shareholders, Return on Assets, Return on Equity, Return on investment, Free Cash Flow, Capital Spending, Beta, Alpha, Price, Volume, Relative Strength, Price to Sales: Price to Book; Price to Cash Flow; Price to Equity: Price to Growth Rate, Historical P/E, Historical Relative PE; SG&A expenses. Float; Market capitalization; Shares outstanding: Short Interest: Property, Plant & Equipment, Fixed Assets, Goodwill, Intangibles, Investments, and other related forms and subcategories of financial statement, microeconomic, and performance measures and data.

The Stockalizer™ Index and Synthetic Security database integration is designed to phase the data via proprietary algorithms and calculate the pro-rata percentage contribution each underlying security plays in the formation of the portfolio, index or mutual fund being evaluated.

The blended Stockalizer™ Index, Mutual Fund and Portfolio Analysis Series database calculated result information is phased and unified to a common scale, and a synthetic security file of comprehensive database results is ready to be illustrated employing the Stockalizer™ Series and Stockatron Constellation Universe™ proprietary graphic formats for analysis and visualization purposes, in the very same manner as any single company security as illustrated in FIGS. 37-44 & FIG. 46.

Once the new indexes, mutual funds etc. are entered into memory and held as discrete files, a blend of blended securities can also be created. In other words, a user can employ the Stockalizer Index and Mutual Fund Series/Portfolio Analysis System to illustrate any combination of stocks, mutual funds, and indexes for portfolio re-balancing, and "what if" scenario planning and portfolio selection purposes.

These are entirely "new function" concepts with powerful results.

The Creation Steps of The Stockalizer Index and Mutual Fund Series™ Application Development:

The method of unique database and visual expression is achieved through the series of creation steps of a typical embodiment of phase three of application development process ~ the Stockalizer™ Index and Mutual Fund Series:

A. Design and standardize a template module to manufacture and access the desired data
  1. Create user interactive template module to allow the user to identify and select the desired custom portfolio of stock symbols, Index, ETF or Mutual Fund.
  2. Create new module to reference, fetch, assemble, store, organize and calculate a new multi company synthetic security layer of database information which references the data contained from the already stored master database of all companies stored and combines it in the appropriate pro-rata fashion to build the composite information.
  3. Fetch the basic and improved data contained within the individual company files for each component company required to assemble the desired prorate combination of companies file for calculation purposes contained within the Portfolio, Index, ETF or Mutual Fund and insert into the synthetic security master template file
  4. Hotlink the cells so that auto refresh occurs with changes to the underlying individual e. Include a Portfolio, Index. Industry, ETF or Mutual Fund Summary description.

B. Design the module to create the new synthetic security file
  1. Calculate the prorata % contribution of each component contained in the Portfolio, Index, ETF or Mutual Fund security,
  2. Apply proprietary pro-rata blending and phasing algorithms to standardize the selected database information.
  3. Calculate the newly constructed summary file which has assembled the required simulated security data for the composite representation
  4. Save the file as a new composite security C. Further refine the company specific database to create a new phased array higher level of database function:
  1. Apply custom algorithm formulas to derive new industry standard ratios and additional measurement function data
  2. Apply newly improved financial measurement standards D. Apply custom calculation and phasing algorithms to unify daily, weekly, monthly and quarterly time period data for illustration comparison purposes E. Apply custom algorithms to unify the scaling of data to enable the data to be superimposed within a single scale graph F. Multiply phase the company specific database to unify the database, and enlarge the usefulness of the data to allow for real time shifts of historical, current and forward looking stock perspectives for fair market value evaluation purposes G. Design the look and feel, and details of design for the relative size and scale, coloring, shading, textures, shapes and the relative positioning of planned design elements for a series of new genre high impact graphic formats designed to convey substantially more data within the confines of a single optimized graph for fundamental analysis visualization purposes.

H. Apply custom algorithms to solve vertical and horizontal scaling issues to automatically create optimal size and scale of element spacing and data concentration, and is custom tuned to convey a high level of content and graphic perspective for each company in the database.

I. Develop digital handshake to automatically import data into the proprietary vector graphics engine application program, which is pre-programmed as described above.

J. Define and locate each element within its own layer to enable independent animation effects. Program animation effects employing SWF vector graphics to enhance pattern recognition of complex tabular data when distributed over an ultrafast, small data packet size, high resolution custom developed vector graphics powered network applications.

K. Develop a graphic creation engine module to interpolate loaded template data and construct preformatted custom format charts and graphs per proprietary graphical standards to create pattern recognition higher level visual language of expression of images and print functions within a range of low to high level language PC and network application outputs.

L. Create an interface module to provide user with interactive access and application controls.

M. Distribute over a local PC application, via a network computer or as an internet based application.

Distinguishing Advancement of the Art Features and Functions of the Stockalizer™ Index and Mutual Fund Series:

1. Now, for the first time investors can view the calculated composite numerical results, and clearly visualize and correlate index price movement with the underlying historical composite performance measurements and emerging underlying fundamental business operating trends for indexes, exchange traded funds, mutual funds and any synthetic blend of securities.

2. Once defined and calculated, any listed index, industry group, exchange traded fund, mutual fund, or portfolio combination of common stocks can be stored in memory to be analyzed and illustrated with continuously updated data on demand, in the same manner, and in the same combination of illustration formats as any common stock, or combination of stocks.

3. The Stockalizer™ Index and Mutual Fund Series design function is to calculate, analyze and illustrate synthetic combinations of securities such as individual portfolios, Indexes, exchange traded funds, industry groups, and mutual funds employing the Stockalizer™, CycleGraph™, Compound Datatron™, Cycle Analytics™, Momentum Matrix™, and Stockalizer™ Individual Portfolio Trend Analysis Series of illustrations, as well as view results within the Constellation Universe™ XIY scatter gram variable comparison graph series.

4. Employing the Stockalizer™ Index and Mutual Fund Series system, investors can intuitively visualize a far more comprehensive operating/performance momentum based composite representation of the inherent interrelationships contained within a comprehensive fundamental data package of such variables as the PE Multiple, Relative Strength, EPS, Revenue, Net Income, Debt, Cash Flow, ERBITDA, Profit Margins, Total Equity, and large number of other forms of Capitalization, Operating Ratios and Performance Measures, and be able to superimpose and easily compare the progression of these factors with the corresponding index I stock price movement, over the same time period and within the same single scale Stockalizer Series™ graphic format image.

5. Employing the Stockalizer™ Index and Mutual Fund Series system, investors can also intuitively visualize a far more comprehensive qualitatively based cause and effect expression of utilization and marginal theories of value as characterized within custom visualizations illustrating composite measures of capitalization, quality of earnings, revenue and related growth rates which are revealed by virtue of custom algorithms for calculation, phasing, unified scaling, and the ability to superimpose various combinations of micro economic components contained within the comprehensive fundamental data package, which includes variables and their related subcategories such as: EPS, Revenue, Net Income, Cash Flow, ERBITDA, Debt, Taxes, Liquid and Fixed Assets, Labor, Administrative Overhead, Cost of Sales, Inventory I Turnover, Accrued Expenses, Operating Margins, Capacity Utilization and other measures and categorized data.

Again, investors are now able to superimpose and easily compare the progression of combinations of these factors with or without the corresponding index/stock price movement, over the same time period and within the same single scale graph.

6. Employing the Stockatron Constellation Universe™ Index and Mutual Fund Series system, investors can also enter in a universe of user selected Indexes, Exchange Traded Funds or Mutual Funds and compare the custom calculated results of combinations of performance measures; ratios and fundamental variables and visualize the results employing the dual axis X/Y scattergram variable comparison charts for any combination variables contained within the database.

Dual Comparison X/Y Scattergram Index and Mutual Fund Series system chart illustrations can include any combination of two fundamental, analytic, technical, or performance measures, ratios and comparisons for variables contained within the database. As an example the user could choose to illustrate composite correlation measures of variables related to Earnings, Revenue, Net Income, Debt, Cash Flow, ERBITDA, Profit Margins, Total Equity and other related measures of growth rates: performance measures such as stock performance return and stock movement volatility as measured over various user selected time periods: Ratio measures such as the composite PE Ratio or relative strength, and other relevant correlation comparisons for any two variables contained within the database.

7. For the purpose of new invention, the Stockalizer™ Index and Mutual Fund Series system has been developed featuring a new database structure and design, using new algorithms to derive custom data and a phased array of financial database information, to calculate and solve financial data phasing and scaling issues, and to present a series of new genre defining pattern recognition graphic illustration formats which are specifically designed to create a new higher level of intuitive securities analysis for Indexes, Exchange Traded Funds and Mutual Funds.

The Stockalizer Series™, Stockatron Constellation Universe™ and the Stockalizer Index and Mutual Fund Series™ Analysis Graph Series The Stockalizer, Stockatron Universe, Stockatron Constellation Universe Charts and Stockalizer Analysis System of portfolio, index and mutual fund stock market series graphs, are each uniquely new higher level expressions of an unheard of level of far more comprehensive financial data, and represent a historically new genre in documented stock market graph illustration technology.

These are new function concepts, and there are no other graphical presentations in the market which illustrate the correlation and interrelated progression of market valuation characteristics, stock performance measures, and ongoing change of corporate operating results within the same graph, for an individual company, a universe of companies, or a synthetic blend of securities either by design or by function.

Because of perceived, stated and presumed difficulties combining the functions and utility of creating and updating a database of all publicly held companies, deriving and unifying data to a common scale and time period, perceived limitations of usefulness and deficiencies in the potential of current state of the art graphic design formats applicable to illustrating indexes, mutual fund and synthetic securities, current and previous state of the art index and mutual fund stock market comparison graphs are limited to text box descriptions and discussion, style and strategy illustration box charts, price movement graphs of indexes and mutual funds, and simplistic price movement/standardized deviation performance comparisons of indexes, mutual funds, and professional money managers.

While one or more embodiments of the present invention have been illustrated in detail, the skilled artisan will appreciate that modifications and adaptations to those embodiments may be made without departing from the scope and spirit of the present invention as set forth in the following claims.

The invention claimed is:

1. A computerized system for calculating, multiply arraying and transforming into graphical illustrations a population universe of privately held and publicly traded database information, the system comprising:

at least one database configured to receive information, said information consisting of: current and historical stock price data; current and historical stock performance analytics data, ratios and measures; current and historical stock technical analysis data, ratios and measures; current, historical and estimated future underlying operating corporate balance sheet and income statement fundamental data, ratios and measures; current, historical and estimated future micro economic data, ratios and measures; and, derived corporate fundamental, operating, technical, stock performance, and stock analysis data, ratios and measures;

at least one computer, or one server computer, and at least one client computer operably coupled to said at least one server computer via a network or the Internet;

at least one database organized into a custom proprietary database template structure configured to store, identify, organize, calculate and phase stocks/securities data;

an interactive manual method module for entering required financial data into a proprietary custom database template to provide the data required to build the library of initial company specific financial database information for each publicly or privately held company to be stored, accessed and analyzed within the database;

an automated script method module for remotely accessing required data via a data mining/handshake data capture and automated entry method which automatically populates the proprietary custom template required to build the library of initial company specific financial database information from publicly or privately available sources, or from outside data providers for each publicly or privately held company to be stored, accessed, calculated, synthesized, extrapolated, and analyzed within the database;

at least one matrix module for proprietary calculating, synthesizing, extrapolating additional custom data, and phasing variable database information for analytical purposes pursuant to a set of preset standards;

at least one module for calculating a set of selectable data, visualization and performance parameters pursuant to a set of preset standards;

at least one graphical interface handshake module to fetch and load selected multiply arrayed database information into a proprietary graphic image formation engine;

at least one graphic engine handshake module template for transforming calculation results of said calculation module into an array suitable to be transformed into custom generated graphical illustrations;

at least one graphic creation engine module to interpolate loaded template data and construct preformatted custom format charts and graphs per proprietary graphical standards to create pattern recognition higher level visual language of expression images within a wide variety of low to high level language distributable screen, print and network application outputs;

a graphic engine module to define and locate each element within its own layer expressed within the graphic engine module;

at least one advanced programming module to enable independently animated layer specific characteristics, such as color schemes, textures, symbols, font size, line strength and interrelated visual effects within the construct of a wide variety of low to high level language distributable screen, print and network application outputs;

a complex programming module to solve vertical and horizontal size and scaling, element spacing and data density perspective issues employing proprietary algorithms to optimally calculate and convey multiply arrayed database information within the construct of a branded newer higher level pattern recognition graphical visual language model designed to optimally illustrate superimposed combinations of fundamental analysis stock market analytics variables, operating and performance measures, and stock price movement within a single graphic image;

a custom programming module to calculate, multiply phase and enable user activated controls to manually adjust length of time period as well as to enable independent element based phasing/vertical and horizontal/data density perspective relationship adjustments contained within each variable layer as expressed within the construct of a wide variety of low to high level language distributable screen, print and network application outputs;

at least one automated periodic fetch and refresh, update and replace company specific data module;

at least one graphical user interface module from which a user may send an inquiry to said at least one server computer and be returned with a set of graphical illustrations on inquired stock performance analytics;

at least one module for user controls;

at least one module for interactive use dialogue logic loop of applications;

wherein said stocks data is available to be juxtaposed and graphed;

wherein said at least one database is operative to extrapolate additional data required to synchronize variably expressed time periods;

wherein said inquiry is one or more symbols, each of which being representative of a unique stock.

2. The system of claim 1, wherein said stocks data comprises:
historical and current stock price;
categorized data of balance sheet;
categorized data of income sheet;
categorized data of operating and performance ratios and analytics; and
categorized custom derived data.

3. The system of claim 1, wherein said set of preset standards comprises:
stock performance and analytics of an individual company;
comparison of stock performances and analytics of a number of selected companies;
comparison of stock performances and analytics of a selected industry, index, and portfolio grouping.

4. The system of claim 3, wherein said selectable data, visualization and performance parameters comprises:
cumulative growth comparisons;
quarterly rates of change;
variable period continuous rates of change;
50-year, since inception, or custom selected period of continuous market change;
continuous and/or periodic compound rate of growth;
continuous and/or periodic dynamic range of movement;
stock, index, mutual fund or portfolio summary report;
stock universe spreadsheet summary;
company specific snapshot summary;
single company, index, mutual fund or portfolio two-dimensional scatter gram of combinations of key variables; and
preselected custom combinations of variables of two more companies stored in said at least one database.

5. The system of claim 1, wherein set of graphical illustrations comprises:
a progression of data points which superimposes combinations of key variables over a single vertical cumulative percentage scale and a horizontal time scale;
a continuous line which superimposes combinations of key variables over a single vertical cumulative percentage scale and a horizontal time scale;
a progression of data points which superimposes key continuous, year over year quarterly or periodic expression of variables over a single vertical cumulative percentage scale and a horizontal time scale;
a continuous line which superimposes key continuous, year over year quarterly expression of variables over a single vertical cumulative percentage scale and a horizontal time scale;

a continuous line which superimposes key continuous, year over year quarterly of expression of variables which can be stated variously pursuant to the user selected data series;

a continuous line of data points custom horizontal line graph which plots index year over year price comparison of market movement over long time periods;

a continuous line of data points custom compounded rate of growth horizontal line graph which superimposes continuous and quarter end compounded values of key variables;

a continuous line of data points custom dynamic range of movement variable period rate of change horizontal line graph which superimposes key continuous and year over year quarterly expression of variables;

a color coded horizontal line graph chart which indicates short and intermediate term price movement; and X/Y scattergram chart pattern graphs with color coded x/y vector data point scattergram labels which can be expressed as alphabetical stock symbol labels such as IBM or variable acronym labels such as P/E or EPS for single company, index, mutual fund or portfolio two-dimensional scatter gram of combinations of key variables; and company specific multiple page composite report containing preformatted elements of text, data tables and graphs in pre-selected combinations featuring the proprietary custom graphic illustrations.

6. A computerized system for creating an additional layer of synthesized database development for calculating, multiply arraying, storing, and transforming into graphical illustrations a population universe of privately held and publicly traded database information, the system comprising:

at least one computer, or one server computer, or at least one client computer operably coupled to said at least one server computer via a network or the Internet;

at least one database organized into a custom proprietary database template structure suitable for storing, identifying, organizing, calculating, and phasing pro-rata composite combinations of stocks/securities data;

at least one database template module to manufacture and access the desired data;

at least one interactive template module to allow the user to identify and select the desired custom portfolio of stock symbols, index, exchange traded fund or mutual fund;

at least one module to reference, fetch, assemble, store, organize and calculate a new multi-company synthetic security layer of database information which references the data contained from the already stored master database of all companies stored;

at least one assembly module to fetch the selected basic and improved data contained within the individual company files for each component company required and assemble the desired prorate combination of companies file for calculation purposes contained within the portfolio, index, exchange traded fund or mutual fund into a synthetic security master template file;

at least one module to hotlink the cells so that auto refresh occurs with changes to the underlying individual companies include in the selected portfolio, index, industry, exchange traded fund or mutual fund summary description;

at least one module to create the required new synthetic security file which calculates the pro-rata percentage contribution of each component contained in the portfolio, index, exchange traded fund or mutual fund security; applies proprietary pro-rata blending and phasing algorithms to standardize the selected database information; calculates the newly constructed summary file which has assembled the required simulated security data for the composite representation; and, saves the file as a new composite security;

an automated script method module for accessing the required data via data mining/handshake data capture and automated entry method which automatically populates the proprietary custom template required to build the library of specific financial database information of publicly or privately available sources, for each publicly or privately held company to be stored, accessed, calculated, synthesized, extrapolated, and analyzed within the database;

at least one matrix module for proprietary calculating, synthesizing, extrapolating additional custom data, and phasing variable database information for analytical purposes pursuant to a set of preset standards;

at least one module for calculating a set of selected performance parameters pursuant to a set of preset standards;

at least one graphical interface handshake module to fetch and load selected multiply arrayed database information into the proprietary graphic image formation engine;

at least one graphic engine handshake module template for transforming calculation results of said calculation module into an array suitable to be transformed into custom generated graphical illustrations;

at least one graphic creation engine module to interpolate loaded template data and construct preformatted custom format charts and graphs per proprietary graphical standards to create pattern recognition higher level visual language of expression images within a range low to high level language distributable screen, print and network application output;

a graphic engine module to define and locate each element within its own layer expressed within the graphic engine module;

an advanced programming graphic engine module to enable independently animate layer specific characteristics including colors schemes, textures, symbols, font size, line strength and related visual effects within the construct of a range of low to high level language distributable screen, print and network application output a complex programming module to solve vertical and horizontal size and scaling, and data density perspective issues employing proprietary algorithms to optimally calculate and multiply arrayed database information within the construct of a branded newer higher level pattern recognition graphical visual language model designed to best illustrate superimposed combinations of fundamental analysis stock market analytics variables, operating and performance measures, and stock price movement within a single graphic image;

a custom programming module to calculate, multiply phase and enable user activated controls to manually adjust length of time period as well as to enable independent element based phasing/vertical and horizontal/data density perspective relationship adjustments contained within each variable layer as expressed within the construct of a range of low to high level language distributable screen, print and network application output;

automated periodic fetch and refresh, update & replace company specific data module;

a graphical user interface module from which a user may send an inquiry to said at least one server computer and be returned with a set of graphical illustrations on inquired stock performance analytics;

a module for user controls;

a module for interactive use dialogue logic loop of the application;

wherein said stocks data is available to be juxtaposed and graphed; and wherein said at least one database is configured to extrapolate additional data required to synchronize variably expressed time periods;

wherein said inquiry is one or more symbols, each of which being representative of a unique stock, index, mutual fund, or exchange traded fund;

wherein said at least one database is updatable manually by the user; and an automated data mining script or graphical handshake module that interfaces with an outside data service that periodically updates said at least one database.

7. The system of claim 6, wherein said stocks data comprises:

historical and current stock price;
categorized data of balance sheet;
categorized data of income sheet;
categorized data of operating and performance ratios and analytics; and
categorized custom derived data.

8. The system of claim 6, wherein said set of preset standards comprises:

stock performance and analytics of an individual company;
comparison of stock performances and analytics of a number of selected companies;
comparison of stock performances and analytics of a selected industry, index, and portfolio grouping.

9. The system of claim 6, wherein said set of selectable data and visualization parameters comprises:

cumulative growth comparisons;
quarterly rates of change;
variable period continuous rates of change;
50-year, since inception, or custom selected period of continuous market change;
continuous and/or periodic compound rate of growth;
continuous and/or periodic dynamic range of movement;
stock, index, mutual fund or portfolio summary report;
stock universe spreadsheet summary;
company specific snapshot summary;
single company, index, mutual fund or portfolio two-dimensional scattergram of combinations of key variables; and
preselected or custom combinations of variables of two more companies stored in said at least one database.

10. The system of claim 6, wherein said set of graphical illustrations comprises:

a progression of data points which superimposes combinations of key variables over a single vertical cumulative percentage scale and a horizontal time scale;
a continuous line which superimposes combinations of key variables over a single vertical cumulative percentage scale and a horizontal time scale;
a progression of data points which superimposes key continuous, year over year quarterly or periodic expression of variables over a single vertical cumulative percentage scale and a horizontal time scale;
a continuous line which superimposes key continuous, year over year quarterly expression of variables over a single vertical cumulative percentage scale and a horizontal time scale;
a continuous line which superimposes key continuous, year over year quarterly of expression of variables which can be stated variously pursuant to the user selected data series;
a continuous line of data points custom horizontal line graph which plots index year over year price comparison of market movement over long time periods;
a continuous line of data points custom compounded rate of growth horizontal line graph which superimposes continuous and quarter end compounded values of key variables;
a continuous line of data points custom dynamic range of movement variable period rate of change horizontal line graph which superimposes key continuous and year over year quarterly expression of variables;
a color coded horizontal line graph chart which indicates short and intermediate term price movement;
X/Y scattergram chart pattern graphics with color coded x/y vector data point scattergram labels which can be expressed as alphabetical stock symbol labels such as IBM or variable acronym labels such as P/E or EPS for single company, index, mutual fund or portfolio two-dimensional scatter gram of combinations of key variables; and
company specific multiple page composite report containing preformatted elements of text, data tables and graphs in pre-selected combinations featuring the proprietary custom graphic illustrations.

11. A computer implemented method of calculating, multiply arraying and transforming into graphical illustrations a population universe of privately held and publicly traded database information, the method comprising:

at least one computer, or one server computer, or at least one client computer operably coupled to said at least one server computer via a network or the Internet;

at least one database organized into a custom proprietary database template structure configured for storing, identifying, organizing, calculating, and phasing pro-rata composite combinations of stocks/securities data;

at least one database template module to manufacture and access the desired data;

at least one module to create the required new synthetic security file;

accessing the required data via data mining/handshake data capture and automated entry method which automatically populates the proprietary custom template required to build the library of specific financial database information of publicly or privately available sources, for each publicly or privately held company to be stored, accessed, calculated, synthesized, extrapolated, and analyzed within the database;

calculating, synthesizing, extrapolating additional custom data, and phasing variable database information for analytical purposes pursuant to a set of preset standards;

calculating a set of selectable data, visualization and performance parameters pursuant to a set of preset standards;

retrieving and loading selected multiply arrayed database information into the proprietary graphic image formation engine;

transforming calculation results of said calculation module into an array suitable to be transformed into custom generated graphical illustrations;

interpolating loaded template data and constructing preformatted custom format charts and graphs per proprietary graphical standards to create pattern recognition higher level visual language of expression images within a range low to high level language distributable screen, print and network application output;

defining and locating each element within its own layer expressed within the graphic engine module;

enabling independently animate layer specific characteristics including colors schemes, textures, symbols, font size, line strength and related visual effects within the construct of a range of low to high level language distributable screen, print and network application output;

solving vertical and horizontal size and scaling, and data density perspective issues employing proprietary algorithms to optimally calculate and best convey multiply arrayed database information within the construct of a branded newer higher level pattern recognition graphical visual language model designed to best illustrate superimposed combinations of fundamental analysis stock market analytics variables, operating and performance measures, and stock price movement within a single graphic image;

calculating, multiply phasing and enabling user activated controls to manually adjust length of time period as well as to enable independent element based phasing/vertical and horizontal/data density perspective relationship adjustments contained within each variable layer as expressed within the construct of a range of low to high level language distributable screen, print and network application output;

automated periodic fetch and refresh, update & replace company specific data module;

a graphical user interface module from which a user may send an inquiry to said at least one server computer and be returned with a set of graphical illustrations on inquired stock performance analytics;

a module for user controls;

a module for interactive use dialogue logic loop of the application;

wherein said stocks data is available to be juxtaposed and graphed; and wherein said at least one database is operative to extrapolate additional data required to synchronize variably expressed time periods;

designing and standardizing a template module to manufacture and access desired data;

creating user interactive template module to allow the user to identify and select a desired custom portfolio of stock symbols, index, exchange traded fund or mutual fund;

creating a new module to reference, fetch, assemble, store, organize and calculate a new multi-company synthetic security layer of database information which references data contained from a master database of company information stored and combine it in the appropriate pro-rata fashion in order to build composite information;

retrieving basic and improved data contained within individual company files for each component company required to assemble the desired prorate combination of companies file for calculation purposes contained within a portfolio, index, exchange traded fund or mutual fund and insert into the synthetic security master template file;

hot-linking database cells containing data so that auto refresh occurs with changes to the underlying data;

creating a portfolio, index, industry, exchange traded fund or mutual fund summary description;

designing the module to create a new synthetic security file;

calculating the pro-rata % contribution of each component contained in the portfolio, index, exchange traded fund or mutual fund security;

applying proprietary pro-rata blending and phasing algorithms to standardize the selected database information;

calculating the newly constructed summary file which has assembled the required simulated security data for the composite representation;

saving the file as a new composite security;

refining the company specific database to create a new phased array higher level of database function;

applying custom algorithm formulas to derive industry standard ratios and additional measurement function data;

applying financial measurement standards;

applying custom calculation and phasing algorithms to unify daily, weekly, monthly and quarterly time period data for illustration comparison purposes;

applying custom algorithms to unify the scaling of data to enable the data to be superimposed within a single scale graph;

multiply phasing the company specific database to unify the database, to allow for real time shifts of historical, current and forward looking stock perspectives for fair market value evaluation purposes;

conveying data calculations and results within the confines of a single optimized graph for fundamental analysis visualization purposes;

applying custom algorithms to solve vertical and horizontal scaling issues to automatically create optimal size and scale of element spacing and data concentration, to convey a high level of content and graphic perspective for each company in the database;

developing a digital handshake to automatically import data into the pre-programmed vector graphics engine application program;

defining and locating each element within its own layer to enable independent animation effects;

employing vector graphics to enhance pattern recognition of complex tabular data;

developing a graphic creation engine module to interpolate loaded template data and construct preformatted custom format charts and graphs per proprietary graphical standards to create pattern recognition higher level visual language of expression of images and print functions within a range of low to high level language, for print and network distributable outputs;

creating an interface module to provide user with interactive access and application controls;

distributing over a local PC application, via a network computer or as an internet based application;

wherein said at least one database is updatable manually by the user; and an automated data mining script or graphical handshake module that interfaces with an outside data service that periodically updates said at least one database.

12. The method of claim 11, wherein said stocks data comprises:

historical and current stock price;

categorized data of balance sheet;

categorized data of income sheet;

categorized data of operating and performance ratios and analytics; and categorized custom derived data.

13. The method of claim 11, wherein said set of graphic illustrations comprises:
- a progression of data points which superimposes combinations of key variables over a single vertical cumulative percentage scale and a horizontal time scale;
- a continuous line which superimposes combinations of key variables over a single vertical cumulative percentage scale and a horizontal time scale;
- a progression of data points which superimposes key continuous, year over year quarterly or periodic expression of variables over a single vertical cumulative percentage scale and a horizontal time scale;
- a continuous line which superimposes key continuous, year over year quarterly expression of variables over a single vertical cumulative percentage scale and a horizontal time scale;
- a continuous line which superimposes key continuous, year over year quarterly of expression of variables which can be stated variously pursuant to the user selected data series;
- a continuous line of data points custom horizontal line graph which plots index year over year price comparison of market movement over long time periods;
- a continuous line of data points custom compounded rate of growth horizontal line graph which superimposes continuous and quarter end compounded values of key variables;
- a continuous line of data points custom dynamic range of movement variable period rate of change horizontal line graph which superimposes key continuous and year over year quarterly expression of variables;
- a color coded horizontal line graph chart which indicates short and intermediate term price movement; and
- X/Y scattergram chart pattern graphs with color coded x/y vector data point scattergram labels which can be expressed as alphabetical stock symbol labels such as IBM or variable acronym labels such as P/E or EPS for single company, index, mutual fund or portfolio two-dimensional scatter gram of combinations of key variables; and
- company specific multiple page composite report containing preformatted elements of text, data tables and graphs in pre-selected combinations featuring the proprietary custom graphic illustrations.

14. The method of claim 11, wherein said set of selectable data, and visualization parameters comprises:
- cumulative growth comparisons;
- quarterly rates of change;
- variable period continuous rates of change;
- 50-year, since inception, or custom selected period of continuous market change;
- continuous and/or periodic compound rate of growth;
- continuous and/or periodic dynamic range of movement;
- stock, index, mutual fund or portfolio summary report;
- stock universe spreadsheet summary;
- company specific snapshot summary;
- single company, index, mutual fund or portfolio two-dimensional scatter gram of combinations of key variables; and
- preselected custom combinations of variables of two more companies stored in said at least one database.

15. The method of claim 11, wherein said set of preset standards comprises:
- stock performance and analytics of an individual company;
- comparison of stock performances and analytics of a number of selected companies;
- comparison of stock performances and analytics of a selected industry, index, and portfolio grouping.

* * * * *